United States Patent
Cundiff et al.

(10) Patent No.: US 6,850,543 B2
(45) Date of Patent: Feb. 1, 2005

(54) MODE-LOCKED PULSED LASER SYSTEM AND METHOD

(75) Inventors: Steven T. Cundiff, Boulder, CO (US); John L. Hall, Boulder, CO (US); Scott A. Diddams, Louisville, CO (US); David J. Jones, Boulder, CO (US)

(73) Assignee: The United States of America as represented by the Secretary of Commerce, Washington, DC (US)

(*) Notice: Subject to any disclaimer, the term of this patent is extended or adjusted under 35 U.S.C. 154(b) by 172 days.

(21) Appl. No.: 10/240,380

(22) PCT Filed: Mar. 29, 2001

(86) PCT No.: PCT/US01/10554

§ 371 (c)(1),
(2), (4) Date: Sep. 27, 2002

(87) PCT Pub. No.: WO01/76026

PCT Pub. Date: Oct. 11, 2001

(65) Prior Publication Data

US 2004/0017833 A1 Jan. 29, 2004

Related U.S. Application Data

(60) Provisional application No. 60/193,287, filed on Mar. 30, 2000.

(51) Int. Cl.[7] .......................... H01S 3/098; H01S 3/10
(52) U.S. Cl. ............................................. 372/18; 372/25
(58) Field of Search ............................. 372/18–29.011

(56) References Cited

U.S. PATENT DOCUMENTS

| | | | | |
|---|---|---|---|---|
| 3,713,042 A | * | 1/1973 | Kinsel ......................... | 372/18 |
| 6,134,253 A | * | 10/2000 | Munks et al. ................. | 372/32 |
| 6,289,028 B1 | * | 9/2001 | Munks et al. ................. | 372/20 |
| 6,333,942 B1 | * | 12/2001 | Nakazawa et al. ............ | 372/25 |
| 6,516,014 B1 | * | 2/2003 | Sellin et al. .................. | 372/32 |

* cited by examiner

Primary Examiner—Don Wong
Assistant Examiner—Phillip Nguyen
(74) Attorney, Agent, or Firm—Cochran Freund & Young LLC

(57) ABSTRACT

Disclosed is a system and method for stabilizing the carrier-envelope phase of the pulses emitted by a femtosecond mode-locked laser by using the powerful tools of frequency-domain laser stabilization. Control of the pulse-to-pulse carrier-envelope phases was confirmed using temporal cross correlation. This phase stabilization locks the absolute frequencies emitted by the laser, which is used to perform absolute optical frequency measurements that were directly referenced to a stable microwave clock.

28 Claims, 27 Drawing Sheets

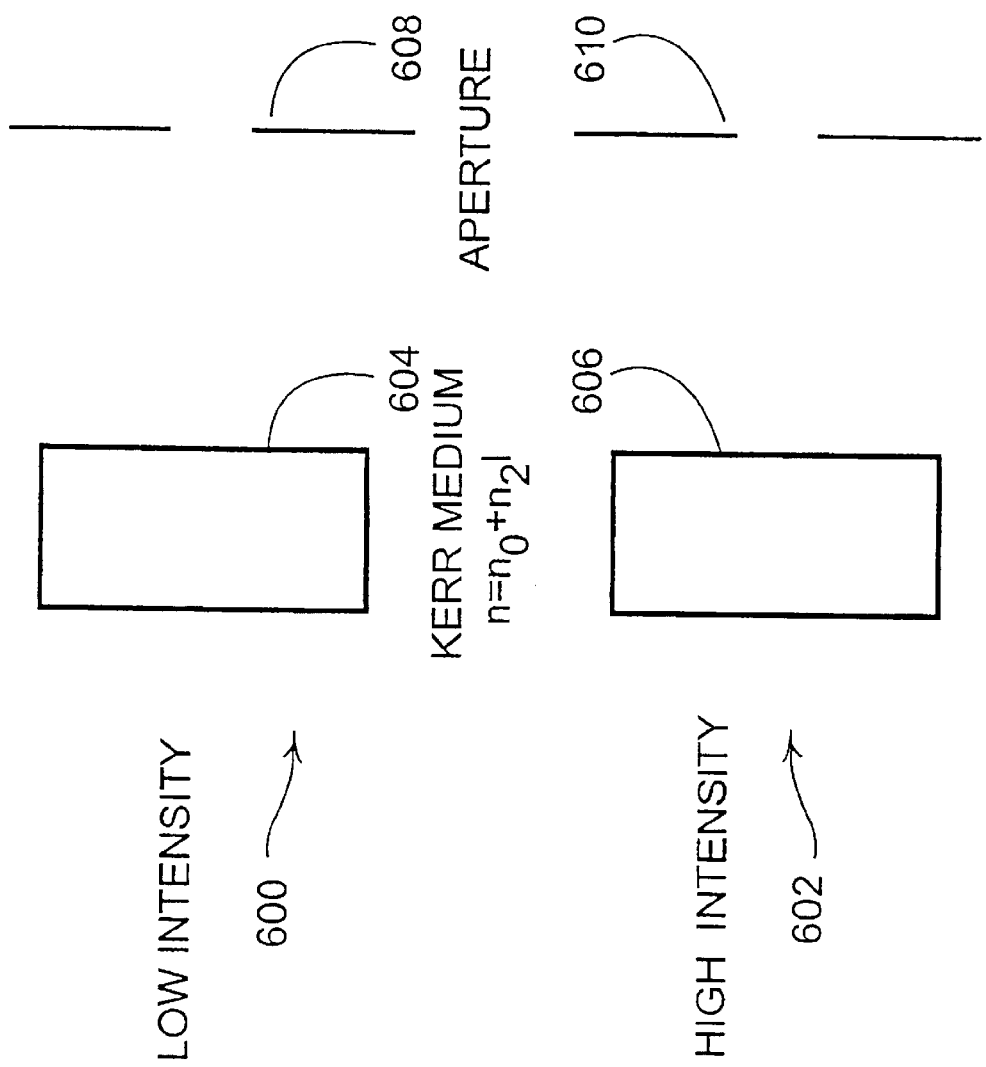

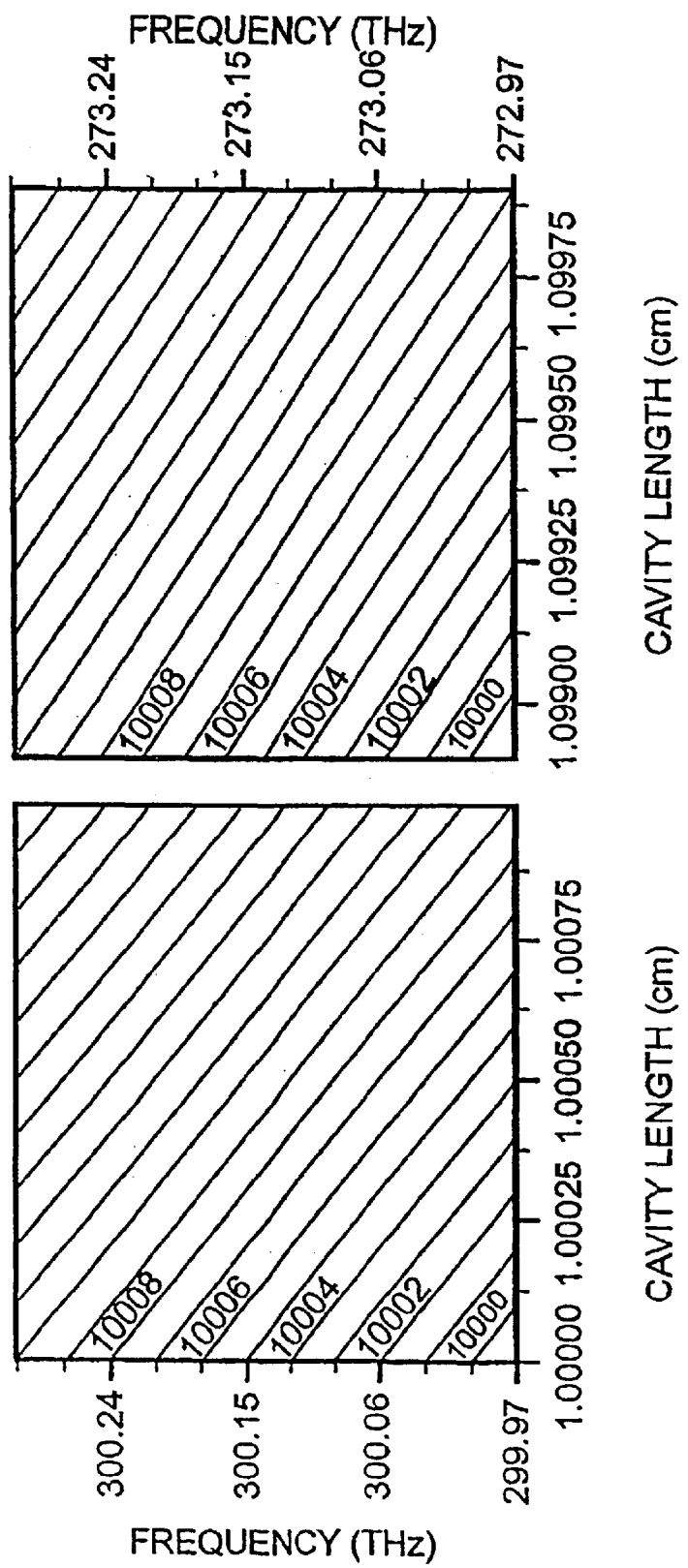

MODE-LOCKED PULSED LASER SYSTEM AND METHOD

CROSS REFERENCE TO RELATED APPLICATIONS

This application claims the benefit of U.S. Provisional application serial No. 60/193,287, filed Mar. 30, 2000, entitled "Direct Optical Synthesis and Phase Stabilization of Ultrashort Optical Pulses," by Steven T. Cundiff, Scott A. Diddams, John L. Hall, and David J. Jones, and PCT International Application No. PCT/US01/10554 filed Mar. 29, 2001 entitled "Mode-Locked Pulsed Laser System and Method," by Steven T. Cundiff, Scott A. Diddams, John L. Hall, and David J. Jones. These applications are specifically incorporated by reference herein for all that they disclose and teach.

BACKGROUND

A. Field

The present disclosure pertains generally to lasers and more particularly to ultrafast mode-locked pulsed lasers. In one aspect this disclosure discusses carrier-envelope phase control of femtosecond mode-locked lasers and direct optical frequency synthesis B. Background 1. Introduction. Progress in femtosecond pulse generation has made it possible to generate optical pulses that are only a few cycles in duration. [See G. Steinmeyer, D. H. Sutter, L. Gallmann, N. Matuschek, U. Keller, Science 286,1507 (1999); M. T. Asaki, C.-P. Huang, D. Garvey, J. Zhou, H. C. Kapteyn, M. M. Murnane, Opt. Lett. 18, 977 (1993); U. Morgner, F. X. Kartner, S. H. Cho, Y. Chen, H. A. Haus, J. G. Fujimoto, E. P. Ippen, V. Scheuer, G. Angelow, T. Tschudi, Opt. Lett. 24, 411 (1999); D. H. Sutter, G. Steinmeyer, L. Gallmann, N. Matuschek, F. Morier-Genoud, U. Keller, V. Scheuer, G. Angelow, T. Tschudi, Opt. Left. 24, 631 (1999)]. This has resulted in rapidly growing interest in controlling the phase of the underlying carrier wave with respect to the envelope. [See G. Steinmeyer, D. H. Sutter, L. Gallmann, N. Matuschek, U. Keller, Science 286,1507 (1999); L. Xu, Ch. Spielmann, A. Poppe, T. Brabec, F. Krausz, T. W. Hansch, Opt. Lett. 21, 2008 (1996); P. Dietrich, F. Krausz, P. B. Corkum, Opt. Lett. 25, 16 (2000); R. J. Jones, J.-C. Diels, J. Jasapara, W. Rudolph, Opt. Commun. 175,409 (2000)]. The "absolute" carrier phase is normally not important in optics; however, for such ultrashort pulses, it can have physical consequences. [See P. Dietrich, F. Krausz, P. B. Corkum, Opt. Lett. 25, 16 (2000); C. G. Durfee, A. Rundquist, S. Backus, C. Heme, M. M. Murname, H. C. Kapteyn, Phys. Rev. Lett. 83, 2187 (1999)]. Concurrently, mode-locked lasers, which generate a train of ultrashort pulses, have become an important tool in precision optical frequency measurement. [See T. Udem, J. Reichert, R. Holzwarth, T. W. Hänsch, Phys. Rev. Lett. 82, 3568 (1999); T. Udem, J. Reichert, R. Holzwarth, T. W. Hänsch, Opt. Lett. 24, 881 (1999); J. Reichert, R. Holzwarth, Th. Udem, T. W. Hänsch, Opt. Comm. 172, 59 (1999); S. A. Diddams, D. J. Jones, L.-S. Ma, S. T. Cundiff, J. L. Hall, Opt. Lett. 25, 186 (2000); S. A. Diddams, D. J. Jones, J. Ye, S. T. Cundiff, J. L. Hall, J. K. Ranka, R. S. Windeler, R. Holzwarth, T. Udem, T. W. Häsch, Phys. Rev. Lett. 84, 5102 (2000); Various schemes for using mode-locked lasers in optical frequency metrology were recently discussed in H. R. Telle, G. Steinmeyer, A. E. Dunlop, J. Stenger, D. H. Sutter, U. Keller, Appl. Phys. B 69, 327 (1999)]. There is a close connection between these two apparently disparate topics. This connection has been exploited in accordance with the present invention to develop a frequency domain technique that stabilizes the carrier phase with respect to the pulse envelope. Using the same technique, absolute optical frequency measurements were performed in accordance with the present invention using a single mode-locked laser with the only input being a stable microwave clock.

Mode-locked lasers generate a repetitive train of ultrashort optical pulses by fixing the relative phases of all of the lasing longitudinal modes. [See A. E. Siegman, Lasers, (University Science Books, Mill Valley Calif., 1986), p. 1041–1128]. Current mode-locking techniques are effective over such a large bandwidth that the resulting pulses can have a duration of 6 femtoseconds or shorter, i.e., approximately two optical cycles. [See M. T. Asaki, C.-P. Huang, D. Garvey, J. Zhou, H. C. Kapteyn, M. M. Murnane, Opt. Lett. 18, 977 (1993); U. Morgner, F. X. Kärtner, S. H. Cho, Y. Chen, H. A. Haus, J. G. Fujimoto, E. P. Ippen, V. Schenuer, G. Angelow, T. Tschudi, Opt. Lett. 24, 411 (1999); D. H. Sutter, G. Steinmeyer, L. Gallmann, N. Matuschek, F. Morier-Genoud, U. Keller V. Scheuer, G. Angelow, T. Tschudi, Opt. Lett. 24, 631 (1999)]. With such ultrashort pulses, the relative phase between the peak of the pulse envelope and the underlying electric-field carrier wave becomes relevant. In general, this phase is not constant from pulse-to-pulse because the group and phase velocities differ inside the laser cavity (see FIG. 7A). To date, techniques of phase control of femtosecond pulses have employed time domain methods. [See L. Xu, Ch. Spielmann, A. Poppe, T. Brabec, F. Krausz, T. W. Hänsch, Opt. Lett. 21, 2008 (1996)]. However, these techniques have not utilized active feedback, and rapid dephasing occurs because of pulse energy fluctuations and other perturbations inside the cavity. Active control of the relative carrier-envelope phase prepares a stable pulse-to-pulse phase relationship, as presented below, and will dramatically impact extreme nonlinear optics.

At the present, measurement of frequencies into the microwave regime (tens of gigahertz) is straightforward thanks to the availability of high frequency counters and synthesizers. Historically, this has not always been the case, with direct measurement being restricted to low frequencies. The current capability arose because an array of techniques was developed to make measurement of higher frequencies possible. [See G. E. Sterling and R. B. Monroe, The Radio Manual (Van Nostrand, New York, 1950)]. These techniques typically rely on heterodyning to produce an easily measured frequency difference (zero-beating being the limit). The difficulty lay in producing an accurately known frequency to beat an unknown frequency against.

Measurement of optical frequencies (hundreds of terahertz) has been in a similar primitive state until recently. This is because only few "known" frequencies have been available and it has been difficult to bridge the gap between a known frequency and an arbitrary unknown frequency of the gap exceeds tens of gigahertz (about 0.01% of the optical frequency). Furthermore, establishing known optical frequencies was itself difficult because an absolute measurement of frequency must be based on the time unit "second", which is defined in terms of the microwave frequency of a hyperfine transition of the cesium atom. This requires a complex "clockwork" to connect optical frequencies to those in the microwave region.

Optical frequencies have been used in measurement science since shortly after the invention of lasers. Comparison of a laser's frequency of $\sim 5 \times 10^{14}$ Hz with its ideal–milliHertz linewidth, produced by the fundamental phase diffusion of spontaneous emission, reveals a potential dynamic range of $10^{17}$ in resolution, offering one of the best tools for discovering new physics in "the next decimal place". Nearly forty years of vigorous research in the many diverse aspects of this field by a worldwide community have resulted in exciting discoveries in fundamental science and development of enabling technologies. Some of the ambitious long-term goals in optical frequency metrology are just coming to fruition owing to a number of recent spectacular technological advances, most notably, the use of mode-locked lasers for optical frequency synthesis. Other examples include laser frequency stabilization to one Hz and below [B. C. Young, F. C. Cruz, W. M. Itano, and J. C. Bergquist, Phys. Rev. Lett. 82, 3799–3802 (1999)], optical transitions observed at a few Hz linewidth (corresponding to a Q of $1.5 \times 10^{14}$) [R. J. Rafac, B. C. Young, J. A. Beall, W. M. Itano, D. J. Wineland, and J. C. Bergquist, Phys. Rev. Lett. 85, 2462–2465 (2000)] and steadily improving accuracy of optical standards with a potential target of $10^{-18}$ for cold atom/ion systems.

2. Optical Frequency Synthesis and Metrology. Optical frequency metrology broadly contributes to and profits from many areas in science and technology. At the core of this subject is the controlled and stable generation of coherent optical waves, i.e. optical frequency synthesis. This permits high precision and high resolution measurement of many physical quantities.

Below brief discussions are provided on these aspects of optical frequency metrology, with stable lasers and wide bandwidth optical frequency combs making up the two essential components in stable frequency generation and measurement.

a. Establishment of standards. In 1967, just a few years after the invention of the laser, the international standard of time/frequency was established, based on the $F=4$, $m_F=0$ — $F=3$, $m_F=0$ transition in the hyperfine structure of the ground state of $^{133}$Cs. [See N. F. Ramsey, Journal of Res. of NBS 88, 301–320 (1983)]. The transition frequency is defined to be 9,192,631,770 Hz. The resonance Q of $\sim 10^8$ is set by the limited coherent interaction time between matter and field. Much effort has been invested in extending the coherent atom-field interaction time and in controlling the first and second order Doppler shifts. Recent advances in the laser cooling and trapping technology have led to the practical use of laser-slowed atoms, and a hundred-fold resolution enhancement. With the reduced velocities, Doppler effects have also been greatly reduced. Cs clocks based on atomic fountains are now operational with reported accuracy of $3 \times 10^{-15}$ and short term stability of $1 \times 10^{-13}$ at 1 second, limited by the frequency noise of the local rf crystal oscillator. [See C. Santarelli, P. Laurent, P. Lemonde, A. Clairon, A. G. Mann, S. Chang, A. N. Luiten, and C. Salomon, Phys. Rev. Lett. 82, 4619–4622 (1999)]. Through similar technologies, single ions, laser-cooled and trapped in an electromagnetic field, are now also excellent candidates for radio frequency/microwave standards with a demonstrated frequency stability approaching $3 \times 10^{-13}$ at 1 second. [See Sullivan, D. B., J. C. Bergquist, J. J. Bollinger, R. E. Drullinger, W. M. Itano, S. R. Jefferts, W. D. Lee, D. Meekhof, T. E. Parker, F. L. Walls, D. J. Wineland, "Primary Atomic Frequency Standards at NIST", J. Res. NIST, 2001, 106(1) pp47–63; D. J. Berkeland, J. D. Miller, J. C. Berquist, W. M. Itano, and D. J. Wineland, Phys. Rev. Lett. 80, 2089–2092 (1998)]. More compact, less expensive, (and less accurate) atomic clocks use cesium or rubidium atoms in a glass cell, equipped with all essential clock mechanisms, including optical pumping (atom preparation), microwave circuitry for exciting the clock transition, and optical detection. The atomic hydrogen maser is another mature and practical device that uses the radiation emitted by atoms directly. [See H. M. Goldenberg, D. Kleppner, and N. F. Ramsey, Phys. Rev. Lett. 8, 361 (1960)]. Although it is less accurate than the cesium standard, a hydrogen maser can realize exceptional short-term stability.

The development of optical frequency standards has been an extremely active field since the invention of lasers, which provide the coherent radiation necessary for precision spectroscopy. The coherent interaction time, the determining factor of the spectral resolution in many cases, is in fact comparable in both optical and rf domains. The optical part of the electromagnetic spectrum provides higher operating frequencies. Therefore the quality factor, Q, of an optical clock transition is expected to be a few orders higher than that available in the microwave domain. A superior Q factor helps to improve all three essential characteristics of a frequency standard, namely accuracy, reproducibility and stability. Accuracy refers to the objective property of a standard to identify the frequency of a natural quantum transition, idealized to the case that the atoms or the molecules are at rest and free of any perturbation. Reproducibility measures the repeatability of a frequency standard for different realizations, signifying adequate modeling of observed operating parameters and independence from uncontrolled operating conditions. Stability indicates the degree to which the frequency stays constant after operation has started. Ideally, a stabilized laser can achieve a fractional frequency stability $$\frac{\delta \nu}{\nu} = \frac{1}{Q} \frac{1}{S/N} \frac{1}{\sqrt{\tau}},$$

where S/N is the recovered signal-to-noise ratio of the resonance information, and $\tau$ is the averaging time. Clearly it is desirable to enhance both the resolution and sensitivity of the detected resonance, as these control the time scale necessary for a given measurement precision. The reward is enormous: enhancing the Q (or S/N) by a factor of ten reduces the averaging time by a factor of 100.

The nonlinear nature of a quantum absorption process, while limiting the attainable S/N, permits sub-Doppler resolution. Special optical techniques invented in the 70's and 80's for sub-Doppler resolution include saturated absorption spectroscopy, two-photon spectroscopy, optical Ramsey fringes, optical double resonance, quantum beats and laser cooling and trapping. Cold samples offer the true possibility to observe the rest frame atomic frequency. Sensitive detection techniques, such as polarization spectroscopy, electron shelving (quantum jump), and frequency modulation optical heterodyne spectroscopy, were also invented during the same period, leading to an absorption sensitivity of $1 \times 10^{-8}$ and the ability to split a MHz scale linewidth typically by a factor of $10^4$–$10^5$, at an averaging time of $\sim 1$ s. All these technological advances paved the way for sub-Hertz stabilization of super-coherent optical local oscillators.

To effectively use a laser as a stable and accurate optical local oscillator, active frequency control is needed, owing to the strong coupling between the laser frequency and the laser parameters. The simultaneous use of quantum absorbers and an optical cavity offers an attractive laser stabilization system. A passive reference cavity brings the benefit of a linear response allowing use of sufficient power to achieve a high S/N. On one hand, a laser pre-stabilized by a cavity offers a long phase coherence time, reducing the need for frequent interrogations of the quantum absorber. In other words, the laser linewidth over a short time scale is narrower than the chose atomic transition width and thus the information of the natural resonance can be recovered with an optimal S/N and the long averaging time translates into a finer examination of the true line center. On the other hand, the quantum absorber's resonance basically eliminates inevitable drifts associated with material standards, such as a cavity. Frequency stability in the $10^{-16}$ domain has been measured with a cavity-stabilized laser. [See C. Salomon, D. Hils, and J. L. Hall, J. Opt. Soc. Am. B 5, 1576–1587 (1988)]. The use of frequency modulation for cavity/laser lock has become a standard laboratory practice. [See R. W. P. Drever, J. L. Hall, F. V. Kowalski, J. Hough, G. M. Ford, A. J. Munley, and H. Ward, App. Phys. B 31, 97–105 (1983)]. Tunability of such a cavity/laser system can be obtained by techniques such as the frequency-offset optical phase-locked-loop (PLL).

A broad spectrum of lasers have been stabilized, from early experiments with gas lasers (He—Ne, $CO_2$, $Ar^+$, etc.) to more recent tunable dye lasers, optically pumper solid-state lasers Ti:Sapphire, YAG, etc.) and diode lasers. Usually one or several atomic or molecular transitions are located within the tuning range of the laser to be stabilized. The use of molecular ro-vibrational lines for laser stabilization has been very successful in the infrared, using molecules such as $CH_4$, $CO_2$ and $OsO_4$. [See T. J. Quinn, Metrologia 36, 211–244 (1999)]. Their natural linewidths range below a kilohertz, as limited by molecular fluorescent decay. Useable linewidths are usually 10 kHz due to transit of molecules through the light beam. Transitions to higher levels of these fundamental ro-vibrational states, usually termed overtone bands, extend these ro-vibrational spectra well into the visible with similar ~kHz potential linewidths. Until recently, the rich spectra of the molecular overtone bands have not been adopted as suitable frequency references in the visible due to their small transition strengths. [See M. Delabachelerie, K. Nakagawa, and M. Ohstru, Opt. Lett. 19, 840–842 (1994)]. However, with one of the most sensitive absorption techniques, which combines frequency modulation with cavity enhancement, an excellent S/N for these weak but narrow overtone lines can be achieved [J. Ye, L. S. Ma, and J. L. Hall, J. Opt. Soc. Am. B 15, 6–15 (1998)], enabling the use of molecular overtones as standards in the visible. [See J. Ye, L. S. Ma, and J. L. Hall, IEEE Trans. Instrum. Meas. 46, 178–182 (1997); J. Ye, L. S. Ma, and J. L. Hall, J. Opt. Soc. Am. B 17, 927–931 (2000)].

Systems based on cold absorber samples potentially offer the highest quality optical frequency sources, mainly due to the drastic reductions of linewidth and velocity-related systematic errors. For example, a few Hz linewidth on the uv transition of $Hg^+$ was recently observed at NIST. [See R. J. Rafac, B. C. Young, J. A. Beall, W. M. Itano, D. J. Wineland, and J. C. Bergquist, Phys. Rev. Lett. 85, 2462–2465 (2000)]. Current activity on single ion systems includes $Sr^+$ [J. E. Bernard, A. A. Madej, L. Marmet, B. G. Whitford, K. J. Siemsen, and S. Cundy, Phys. Rev. Lett. 82, 3228–3231 (1999)] $Yb^+$ [M. Roberts, P. Taylor, G. P. Barwood, P. Gill, H. A. Klein, and W. R. C. Rowley, Phys. Rev. Lett. 78, 1876–1879 (1997)] and $In^+$, [E. Peik, J. Abel, T. Becker, J. von Zanthier, and H. Walther, Phys. Rev. A 60, 439–449 (1999)]. One of the early NIST proposals of using atomic fountains for optical frequency standards [J. L. Hall, M. Zhu, and P. Buch, J. Opt. Soc. Am. B 6, 2194–2205 (1989)] has resulted in investigation of the neutral atoms Mg, Ca, Sr, Ba, and Ag. These systems could offer ultimate frequency standards free from virtually all of the conventional shifts and broadenings, to the level of one part in $10^{16}$–$10^{18}$. Considerations of a practical system must always include its cost, size and degree of complexity. Compact and low cost systems can be competitive even though their performance may be 10-fold worse compared with the ultimate system. One such system is Nd:YAG laser stabilized on HCCD at 1064 nm or on $I_2$ (after frequency doubling) at 532 nm, with a demonstrated stability level of $4 \times 10^{-15}$ at 300-s averaging time. [See J. Ye, L. Robertsson, S. Picard, L. S. Ma, and J. L. Hall, IEEE Trans. Instrum. Meas. 48, 544–549 (1999); J. L. Hall, L. S. Ma, M. Taubman, B. Tiemann, F. L. Hong, O. Pfister, and J. Ye, IEEE Trans. Instrum. Meas. 48, 583–586 (1999)]. FIG. 1 summarizes some of the optical frequency standards 100 that are either established or under active development. Also indicated is the spectral width of currently available optical frequency combs 102 generated by mode-locked lasers.

Accurate knowledge of the center of the resonance is essential for establishing standards. Collisions, electromagnetic fringe fields, residual Doppler effects, probe field wave-front curvature, and probe power can all produce undesired center shifts and linewidth broadening. Other physical interactions, and even distortion in the modulation waveform, can produce asymmetry in the recovered signal line shape. For example, in frequency modulation spectroscopy, residual amplitude modulation introduces unwanted frequency shifts and instability and therefore needs to be controlled. [See J. L. Hall, J. Ye, L.-S. Ma, K. Vogel, and T. Dinneen, in *Laser Spectroscopy XIII*, edited by Z.-J. Wang, Z.-M. Zhang and Y.-Z. Wang (World Scientific, Sinagpore, 1998), p. 75–80]. These issues must be addressed carefully before one can be comfortable talking about accuracy. A more fundamental issue related to time dilation of the reference system (second order Doppler effect) can be solved in a controlled fashion, one simply knows the sample velocity accurately (for example, by velocity selective Raman process), or the velocity is brought down to a negligible level using cooling and trapping techniques.

b. Application of Standards. The technology of laser frequency stabilization has been refined and simplified over the years and has become an indispensable research tool in many modern laboratories involving optics. Research on laser stabilization has been and still is pushing the limits of measurement science. Indeed, a number of currently active research projects on fundamental physical principles greatly benefit from stable optical sources and need continued progress on laser stabilization. They include: laser test of fundamental principles [D. Hils and J. L. Hall, Phys. Rev. Lett. 64, 1697–1700 (1990)], gravitational wave detection [P. Fritschel, G. Gonzalez, B. Lantz, P. Saha, and M. Zucker, Phys. Rev. Lett. 80, 3181–3184 (1998)], quantum dynamics [H. Mabuchi, J. Ye, and H. J. Kimble, Appl. Phys. B 68, 1095–1108 (1999)], atomic and molecular structure, and many more. Recent experiments with hydrogen atoms have led to the best reported value for the Rydberg constant and 1S-Lamb shift. [See T. Udem, A. Huber, B. Gross, J. Reichert, M. Prevedelli, M. Weitz, and T. W. Hänsch, Phys. Rev. Lett. 79, 2646–2649 (1997); C. Schwob, L. Jozefowski, B. deBeauvoir, L. Hilico, F. Nez, L. Julien, F. Biraben, O. Acef, and A. Clairon, Phys. Rev. Lett. 82, 4960–4963 (1999)]. Fundamental physical constants such as the fine-structure constant, ratio of Planck's constant to electron mass, and the electron-to-proton mass ratio are also being determined with increasing precision using improved precision laser tools. [See A. Peters, K. Y. Chung, B. Young. J. Hensley, and S. Chu, Philos. Trans. R. Soc. Lond. Ser. A 335, 2223–2233 (1997)]. Using extremely stable phase-coherent optical sources, we are entering an exciting era when picometer resolution can be achieved over a million kilometer distance in space. In time-keeping, an optical frequency clock is expected eventually to replace the current microwave atomic clocks. In length metrology, the realization of the basic unit, the "metre", relies on stable optical frequencies. In communications, optical frequency metrology provides stable frequency/wavelength reference grids. [See T. Ikegami, S. Sudo, and Y. Sakai, *Frequency stabilization of semiconductor laser diodes* (Artech House, Norwood, 1995)].

A list of just a few examples of stabilized cw tunable lasers includes milliHertz linewidth stabilization (relative to a cavity) for diode-pumped solid state lasers, tens of milli-Hertz linewidth for Ti:Sapphire lasers and sub-Hertz linewidths for diode and dye lasers. Tight phase locking between different laser systems can be achieved [J. Ye and J. L. Hall, Opt. Lett. 24, 1838–1840 (1999)] even for diode lasers that have fast frequency noise.

c. Challenge of Opitical Frequency Measurement & Synthesis. Advances in optical frequency standards have resulted in the development of absolute and precise frequency measurement capability in the visible and near-infrared spectral regions. A frequency reference can be established only after it has been phase-coherently compared and linked with other standards. As mentioned above, until recently optical frequency metrology has been restricted to the limited set of "known" frequencies, due to the difficulty in bridging the gap between frequencies and the difficulty in establishing the "known" frequencies themselves.

The traditional frequency measurement takes a synthesis-by-harmonics approach. Such a synthesis chain is a complex system, involving several stages of stabilized transfer lasers, high-accuracy frequency references (in both optical and rf ranges), and nonlinear mixing elements. Phase-coherent optical frequency synthesis chains linked to the cesium primary standard include Cs—HeNe/$CH_4$ (3.9 $\mu$m) [K. M. Evenson, J. S. Wells, F. R. Petersen, B. L. Danielson, and G. W. Day, Appl. Phys. Lett. 22, 192 (1973); C. O. Weiss, G. Kramer, B. Lipphardt, and E. Garcia, IEEE J. Quantum Electron. 24, 1970–1972 (1988)] and Cs—$CO_2$/$OsO_4$ (10 $\mu$m). [See A. Clairon, B. Dahmani, A. Filimon, and J. Rutman, IEEE Trans. Instrum. Meas. 34, 265–268 (1985)]. Extension to HeNe/$I_2$ (576 nm) [C. R. Pollock, D. A. Jennings, F. R. Petersen, J. S. Wells, R. E. Drullinger, E. C. Beaty, and K. M. Evenson, Opt. Lett. 8, 133–135 (1983)] and HeNe/$I_2$ (633 nm) [D. A. Jennings, C. R. Pollock, F. R. Petersen, R. E. Drullinger, K. M. Evenson, J. S. Wells, J. L. Hall, and H. P. Layer, Opt. Lett. 8, 136–138 (1983); O. Acef, J. J. Zondy, M. Abed, D. G. Rovera, A. H. Gerard, A. Clairon, P. Laurent, Y. Millerioux, and P. Juncar, Opt. Commun. 97, 29–34 (1993)] lasers made use of one of these reference lasers (or the $CO_2$/$CO_2$ system [K. M. Evenson, J. S. Wells, F. R. Petersen, B. L. Danielson, and G. W. Day, Appl. Phys. Lett. 22, 192 (1973)]) as an intermediate. The first well-stabilized laser to be measured by a Cs-based frequency chain was the HeNe/$CH_4$ system at 88 THz. [See K. M. Evenson, J. S. Wells, F. R. Petersen, B. L. Danielson, and G. W. Day, Appl. Phys. Lett. 22, 192 (1973)]. With interferometric determination of the associated wavelength [R. L. Barger and J. L. Hall, Appl. Phys. Lett. 22, 196–199 (1973)] in terms of the existing wavelength standard based on krypton discharge, the work let to a definitive value for the speed of light, soon confirmed by other laboratories using many different approaches. Redefinition of the unit of length by adopting c=299,792,458 m/s became possible with the extension of the direct frequency measurements to 473 THz (HeNe/$I_2$ 633 nm system) 10 years later by a NIST 10-person team, creating a direct connection between the time and length units. More recently, with improved optical frequency standards based on cold atoms (Ca) [H. Schmatz, B. Lipphardt, J. Helmcke, F. Richle, and G. Zinner, Phys. Rev. Lett. 76, 18–21 (1996)] and single trapped ions ($Sr^+$) [J. E. Bernard, A. A. Madej, L. Marmet, B. G. Whitford, K. J. Siemsen, and S. Cundy, Phys. Rev. Lett. 82, 3228–3231 (1999)], these traditional frequency chains have demonstrated measurement uncertainties at the 100 Hz level.

Understandably, these frequency chains are large scale research efforts requiring resources that can be provided by only a few national laboratories. Furthermore, the frequency chain can only cover some discrete frequency marks in the optical spectrum. Difference frequencies of many THz could still remain between a target frequency and a known reference. These three issues have represented major obstacles to making optical frequency metrology a general laboratory tool. Several approaches have been proposed and tested as simple, reliable solutions for bridging large optical frequency gaps. Some popular schemes include: frequency interval bisection [H R. Telle, D. Meschede, and T. W. Hansch, Opt. Lett. 15, 532–534 (1990)], optical-parametric oscillators (OPO) [N. C. Wong, Opt. Lett. 15, 1129–1131 (1990)], optical comb generators [M. Kourogi, K. Nakagawa, and M. Ohtsu, IEEE J. Quantum Electron. 29, 2693–2701 (1993); L. R. Brothers, D. Lee, and N. C. Wong, Opt. Lett. 19, 245–247 (1994)], sum-and-difference generation in the near infrared [D. Van Baak and L. Hollberg, Opt. Lett. 19, 1586–1588 (1994)], frequency division by three [O. Pfister, M. Murtz, J. S. Wells, L. Hollberg, and J. T. Murray, Opt. Lett. 21, 1387–1389 (1996); P. T. Nee and N. C. Wong, Opt. Lett. 23, 46–48 (1998)] and four wave mixing in laser diodes. [See C. Koch and H. R. Telle, J. Opt. Soc. Am. B 13, 1666–1678 (1996)]. All of these techniques rely on the principle of difference-frequency synthesis, in contrast to the frequency harmonic generation method normally used in traditional frequency chains. In the next section we briefly summarize these techniques, their operating principles and applications. Generation of wide bandwidth optical frequency combs has provided the most direct and simple approach among these techniques, and it is the basis for the present invention.

3. Traditional Approaches to Optical Frequency Synthesis. Although the potential for using mode-locked lasers in optical frequency synthesis was recognized early [J. N. Eckstein, A. I. Ferguson, and T. W. Hänsch, Phys. Rev. Lett. 40, 847–850 (1978)], they did not provide the properties necessary for fulfilling this potential until recently. Consequently, an enormous effort has been invested over the last 40 years in "traditional" approaches, which typically involve phase coherently linked single frequency lasers. Traditional approaches to optical frequency measurement can be divided into two sub-categories, one is synthesis by harmonic generation, and the other is difference-frequency synthesis. The former method has a long history of success, at the expense of massive resources and system complexity. The later approach has been the focus of recent research, leading to systems that are more flexible, adaptive and efficient and is the subject of the present invention which involves the use of a wide bandwidth optical frequency comb generator.

a. Phase Coherent Chains (traditional frequency harmonic generation). The traditional frequency measurement takes a synthesis-by-harmonic approach. Harmonics, i.e., integer multiples, of a standard frequency are generated with a nonlinear element and the output signal of a higher-frequency oscillator is phase coherently linked to one of the harmonics. Tracking and counting of the beat note, or the use of a phase-locked loop (PLL), preserves the phase coherence at each stage. Such phase-coherent frequency multiplication process is continued to higher and higher frequencies until the measurement target in the optical spectrum is reached. In the frequency region of microwave to mid-infrared, a harmonic mixer can perform frequency multiplication and frequency mixing/phase comparison all by itself. "Cat's whisker" W—Si point contact microwave diodes, metal-insulator-metal (MIM) diodes and Schottky diodes have been used extensively for this purpose. In the near-infrared to the visible (<1.5 μm), the efficiency of MIM diodes decreases rapidly. Optical nonlinear crystals are better for harmonic generation in these spectral regions. Fast photodiodes perform frequency mixing (non-harmonic) and phase comparison. Such a synthesis chain is a complex system, involving several stages of stabilized transfer lasers, high-accuracy frequency references (in both optical and rf ranges), and nonlinear mixing elements. A important limitation is that each oscillator stage employs different lasing transitions and different laser technologies, so that reliable and cost effective designs are elusive.

1) Local Oscillators and Phase Locked Loops. The most important issue in frequency synthesis is the stability and accuracy associated with such frequency transfer processes. Successful implementation of a synthesis chain requires a set of stable local oscillators at various frequency stages. Maintaining phase coherence across the vast frequency gaps covered by the frequency chain demands that phase errors at each synthesis stage be eliminated or controlled. A more stable local oscillator offers a longer phase coherence time, making frequency/phase comparison more tractable and reducing phase errors accumulated before the servo can decisively express control. Owing to the intrinsic property of the harmonic synthesis process, there are two mechanisms for frequency/phase noise to enter the loop and limit the ultimate performance. The first is additive noise, where a noisy local oscillator compromises the information from a particular phase comparison step. The second, and more fundamental one, is the phase noise associated with the frequency (really phase) multiplication process: the phase angle noise increases as the multiplication factor, hence the phase noise spectral density of the output signal from a frequency multiplier increases as the square of the multiplication factor and so becomes progressively worse as the frequency increases in each stage of the chain. Low phase noise microwave and laser local oscillators are therefore important in all PLL frequency synthesis schemes.

The role of the local oscillator in each stage of the frequency synthesis chain is to take up the phase information from the lower frequency regions and pass it on to the next level, with appropriate noise filtering, and to reestablish a stable amplitude. The process of frequency/phase transfer typically involves phase-locked loops (PLLs). Sometimes, frequency comparison is carried out with a frequency counter measuring the difference in cycle numbers between two periodic signals, within a predetermined time period. As an intrinsic time domain device used to measure zero-crossings, a frequency counter is sensitive to signals—and noise—in a large bandwidth and so can easily accumulate counting errors owing to an insufficient signal-to-noise ratio. Even for a PLL, the possibility of cycle slipping is a serious issue. With a specified signal to noise ratio and control bandwidth, one can estimate the average time between successive cycle slips and thus know the expected frequency counting error. For example, a 100 kHz measurement bandwidth requires a signal-to-noise ratio of 11 dB to achieve a frequency error of 1 Hz (1 cycle slip per 1 s). [See J. L. Hall, M. Taubman, S. A. Diddams, B. Tiemann, J. Ye, L. S. Ma, D. J. Jones, and S. T. Cundiff, in *Laser Spectroscopy XIII*, edited by R. Blatt, J. Eschner, D. Leibfried and F. Schmidt-Kaler (World Scientific, Singapore, 1999), p. 51–60].

One function of PLLs is to regenerate a weak signal from a noisy background, providing spectral filtering and amplitude stabilization. This function is described as a "tracking filter." Within the correction bandwidth, the tracking filter frequency output follows the perceived rf input sinewave's frequency. A voltage-controlled-oscillator (VCO) provides the PLL's output constant amplitude, the variable output frequency is guided by the correction error generated from the phase comparison with the weak signal input. A tracking filter, consisting of a VCO under PLL control, is ordinarily essential for producing reliable frequency counting, with the regenerated signal able to support the unambiguous zero-crossing measurement for a frequency counter.

2) Measurements Made With Phase Coherent Chains. As described in the previous section, only a few phase-coherent optical frequency synthesis chains have ever been implemented. Typically, some important infrared standards, such as the 3.39 μm (HeNe/$CH_4$) system and the 10 μm ($CO_2$/$OsO_4$) system are connected to the Cs standard first. Once established, these references are then used to measure higher optical frequencies.

One of the first frequency chains was developed at NBS, connecting the frequency of a methane-stabilized HeNe laser to the Cs standard. [See K. M. Evenson, J. S. Wells, F. R. Petersen, B. L. Danielson, and G. W. Day, Appl. Phys. Lett. 22, 192 (1973)]. The chain started with a Cs-referenced Klystron oscillator at 10.6 GHz, with its 7th harmonic linked to a second Klystron oscillator at 74.2 GHz. A HCN laser at 0.89 THz was linked to the 12th harmonic of the second Klystron frequency. The 12th harmonic of the HCN laser was connected to a $H_2O$ laser, whose frequency was tripled to connect to a $CO_2$ laser at 32.13 THz. A second $CO_2$ laser frequency, at 29.44 THz, was linked to the difference between the 32.13 THz $CO_2$ laser and the third harmonic of the HCN laser. The third harmonic of this second $CO_2$ laser finally reached the HeNe/$CH_4$ frequency at 88.3762 THz. The measured value of HeNe/$CH_4$ frequency was later used in another experiment to determine the frequency of iodine-stabilized HeNe laser at 633 nm, bridging the gap between infrared and visible radiation. [See D. A. Jennings, C. R. Pollock, F. R. Peterson, R. E. Drullinger, K. M. Evenson, J. S. Wells, J. L. Hall, and H. P. Layer, Opt. Lett. 8, 136–138 (1983)].

The important 10 μm spectral region covered by $CO_2$ lasers has been the focus of several different frequency chains. [See C. O. Weiss, G. Kramer, B. Lipphardt, and E. Garcia, IEEE J. Quantum Electron. 24, 1970–1972 (1988); A. Clairon, B. Dahmani, A. Filimon, and J. Rutman, IEEE Trans. Instrum. Meas. 34, 265–268 (1985); B. G. Whitford, App. Phys. B 35, 119–122 (1984)]: It is worth noting that in the Whitford chain [B. G. Whitford, App. Phys. B 35, 119–122 (1984)] a substantial number of difference frequencies (generated between various $CO_2$ lasers) were used to bridge the intermediate frequency gaps, although the general principle of the chain itself is still based on harmonic synthesis. $CO_2$ lasers provided the starting point of most subsequent frequency chains that reached the visible frequency spectrum. [See C. R. Pollock, D. A. Jennings, F. R. Petersen, J. S. Wells, R. E. Drullinger, E. C. Beaty, and K. M. Evenson, Opt. Lett. 8, 133–135 (1983); O. Acef, J. J. Zondy, M. Abed, D. G. Rovera, A. H. Gerard, A. Clairon, P.

Laurent, Y. Millerioux, and P. Juncar, Opt. Commun 97, 29–34 (1993). F. Nez, M. D. Plimmer, S. Bourzeix, I. Julien, F. Birabert, R. Felder, O. Acef, J. J. Zondy, P. Laurent, A. Clairon, M. Abed, Y. Millerioux, and P. Juncar, Phys. Rev. Lett. 69, 2326–2329 (1992)]. As noted above, these frequency chains and measurements have led to the accurate knowledge of the speed of light, allowing international redefinition of the "Metre", and establishment of many absolute frequency/wavelength standards throughout the IR/visible spectrum. More recently, with improved optical frequency standards based on cold atoms (Ca) [H. Schnatz, B. Lipphardt, J. Helmcke, F. Riehle, and G. Zinner, Phys. Rev. Lett. 76, 18–21 (1996)] and single trapped ions ($Sr^+$) [J. E. Bernard, A. A. Madej, L. Marmet, B. G. Whitford, K. J. Siemsen, and S. Cundy, Phys. Rev. Lett. 82, 3228–3231 (1999)], these traditional frequency measurement techniques have demonstrated measurement uncertainties at the 100 Hz level, by directly linking the Cs standard to the visible radiation in a single frequency chain.

3) Shortcomings of this Traditional Approach. It is obvious that such harmonic synthesis systems require a significant investment of human and other resources. The systems need constant maintenance and can be afforded only by national laboratories. Perhaps the most unsatisfying aspect of harmonic chains is that they cover only a few discrete frequency marks in the optical spectrum. Therefore the systems work on coincidental overlaps in target frequencies and are difficult to adapt to different tasks. Another limitation is the rapid increase of phase noise (as $n^2$) with the harmonic synthesis order (n).

b. Difference Frequency Synthesis. The difference-frequency generation approach borrows many frequency measurement techniques developed for the harmonic synthesis chains. Perhaps the biggest advantage of difference frequency synthesis over the traditional harmonic generation is that the system can be more flexible and compact, and yet have access to more frequencies. Five recent approaches are disclosed below, with the frequency interval bisection and the optical comb generator being the most significant breakthroughs. The common theme of these techniques is the ability to subdivide a large optical frequency interval into smaller portions with a known relationship to the original frequency gap. The small frequency difference is then measured to yield the value of the original frequency gap.

1) Frequency Interval Bisection. Bisection of frequency intervals is one of the most important concepts in the difference frequency generation. Coherent bisection of optical frequency generates the arithmetic average of two laser frequencies $f_1$ and $f_2$ by phase locking the second harmonic of a third laser at frequency $f_3$ to the sum frequency of $f_1$ and $f_2$. These frequency-interval bisection stages can be cascaded to provide difference-frequency division by $2^{th}$. Therefore any target frequency can potentially be reached with a sufficient number of bisection stages. Currently the fastest commercial photodetectors can measure heterodyne beats of some tens of GHz. Thus, six to ten cascaded bisection stages are required to connect a few hundred THz wide frequency interval with a measurable microwave frequency. Therefore the capability of measuring a large beat frequency between two optical signals becomes ever more important, considering the number of bisection stages that can be saved with a direct measurement. A powerful combination is to have an optical comb generator capable of measuring a few THz optical frequency differences as the last stage of the interval bisection chain. It is worth noting that in a difference frequency measurement it is typical for all participating lasers to have their frequencies in a nearby frequency interval, thus simplifying system design. Many optical frequency measurement schemes have been proposed, and some realized, using interval bisection. The most notable achievement so far has been by Hänsch's group at the Max-Planck Institute for Quantum Optics (MPQ) in Garching, where the idea for bisection originated. They used a phase locked chain of five frequency bisection stages to bridge the gap between the hydrogen 1S–2S resonance frequency and the 28th harmonic of the HeNe/$CH_4$ standard at 3.39 μm, leading to the improved measurement of the Rydberg constant and the hydrogen ground state Lamb shift. [See T. Udem, A. Huber, B. Gross, J. Reichert, M. Prevedelli, M. Weitz, and T. W. Hänsch, Phys. Rev. Lett. 79, 2646–2649 (1997)]. The chain started with a interval divider between a 486 nm laser (one fourth of the frequency of the hydrogen 1S–2S resonance) and the HeNe/$CH_4$. The rest of the chain successively reduced the gap between this midpoint near 848 nm and the 4th harmonic of HeNe/$CH_4$, a convenient spectral region where similar diode laser systems can be employed, even though slightly different wavelengths are required.

2) Optical Parametric Oscillators. The use of optical parametric oscillators (OPOs) for frequency division relies on parametric down conversion to convert an input optical signal into two coherent subharmonic outputs, the signal and idler. These outputs are tunable and their linewidths are replicas of the input pump except for the quantum noise added during the down conversion process. The OPO output frequencies, or the original pump frequency, can be precisely determined by phase locking the difference frequency between the signal and idler to a known microwave or infrared frequency.

In Wong's original proposal, OPO divider stages configured in parallel or serial were shown to provide the needed multi-step frequency division. [See N. C. Wong, Opt. Lett. 15, 1129–1131 (1990)]. However, no such cascaded systems have been realized so far, owing in part to the difficulty of finding suitable nonlinear crystals for the OPO operation to work in different spectral regions, especially in the infrared. There is progress on the OPO-based optical frequency measurement schemes, most notably optical frequency division by 2 and 3 [S. Slyusarev, T. Ikegami, and S. Ohshima, Opt. Lett. 24, 1856–1858 (1999); A. Douillet, J. J. Zondy, A. Yelisseyev, S. Lobanov, and L. Isaenko, IEEE Trans. Ultrason. Ferroelectr. Freq. Control 47, 1127–1133 (2000)] that allow rapid reduction of a large frequency gap. Along with threshold-free difference frequency generations in nonlinear crystals (discussed next), the OPO system provides direct access to calibrated tunable frequency sources in the IR region (20–200 THz).

3) Nonlinear Crystal Optics. This same principle, i.e., phase-locking between the difference frequency while holding the sum frequency a constant, leads to frequency measurement in the near infrared using nonlinear crystals for the sum-and-difference frequency generation. The sum of two frequencies in the near infrared can be matched to a visible frequency standard while the difference matches to a stable reference in the mid infrared. Another important technique is optical frequency division by 3. This larger frequency ratio could simplify optical frequency chains while providing a convenient connection between visible lasers and infrared standards. An additional stage of mixing is needed to ensure the precise division ratio. [See O. Pfister, M. Murtz, J. S. Wells, L. Hollberg, and J. T. Murray, Opt. Lett. 21, 1387–1389 (1996)].

4) Four Wave Mixing In Laser Diodes. Another approach to difference frequency generation relies on four-wave mixing. The idea [C. Koch and H. R. Telle, J. Opt. Soc. Am. B 13, 1666–1678 (1996)] is to use a laser diode as both a light source and an efficient nonlinear receiver to allow a four-wave mixing process to generate phase-coherent bisection of a frequency interval of a few THz. The setup involved two external cavity diode lasers ($\omega_{LD1}$ and $\omega_{LD2}$), separated by 1–2 THz, that are optically injected into a third diode laser for frequency mixing. When the frequency of the third diode laser ($\omega_{LD3}$) was tuned near the interval center of $\omega_{LD1}$ and $\omega_{LD2}$, the injection locking mechanism became effective to lock $\omega_{LD3}$ on the four-wave mixing product, $\omega_{LD1}+\omega_{LD2}-\omega_{LD3}$, leading to the interval bisection condition: $\omega_{LD3}=(\omega_{Ld1}+\omega_{LD2})/2$. The bandwidth of this process is limited by phase matching in the mixing diode, and was found to be only a few THz. [See C. Koch and H. R. Telle, J. Opt. Soc. Am. B 13, 1666–1678 (1996)].

5) Optical Frequency Comb Generators. One of the most promising difference frequency synthesis techniques is the generation of multi-THz optical combs by placing an rf electro-optic modulator (EOM) in a low-loss optical cavity. [See M. Kourogi, K. Nakagawa, and M. Ohtsu, IEEE J. Quantum Electron. 29, 2693–2701 (1993)]. The optical cavity enhances modulation efficiency by resonating with the carrier frequency and all subsequently generated sidebands, leading to a spectral comb of frequency-calibrated lines spanning a few THz. The schematic of such an optical frequency comb generation process is shown in FIGS. 2A and 2B. The single frequency cw laser beam 200, as shown in FIG. 2A, is locked on one of the resonance modes of the EOM cavity, with the free-spectral-range frequency of the loaded cavity being an integer multiple of the EOM modulation frequency. The optical cavity comprises mirrors 208, 210. The optical cavity includes a resonant electro-optic modulator 204 that is driven by a modulator 202 having a modulation frequency $f_m$. The cavity output 206 produces a comb spectrum 212 shown in FIG. 2B with an intensity profile of $\exp\{-|k|\pi/\beta F\}$ [M. Kourogi, K. Nakagawa, and M. Ohtsu, IEEE J. Quantum Electron. 29, 2693–2701 (1993)], where k is the order of generated sideband from the original carrier, $\beta$ is the EOM phase modulation index, and F is the loaded cavity finesse. The uniformity of the comb frequency spacing was carefully verified. [See K. Imai, Y. Zhao, M. Kourogi, B. Widiyatmoko, and M. Ohtsu, Opt. Lett. 24, 214–216 (1999)]. These optical frequency comb generators (OFCG) have produced spectra extending a few tens of THz [K. Imai, M. Kourogi, and M. Ohtsu, IEEE J. Quantum Electron. 34, 54–60 (1998)] nearly 10% of the optical carrier frequency 214. A group at JILA, including the inventors, developed unique OFGCs, one with capability of single comb line selection [J. Ye, L. S. Ma, T. Day, and J. L. Hall, Opt. Lett. 22, 301–303 (1997)] and the other with efficiency enhancement via an integrated OPO/EOM system. [See S. A. Diddams, L. S. Ma, J. Ye, and J. L. Hall, Opt. Lett. 24, 1747–1749 (1999)].

OFCGs had an immediate impact on the field of optical frequency measurement. Kourogi and coworkers [K. Nakagawa, M. deLabachelerie, Y. Awaji, and M. Kourogi, J. Opt. Soc. Am. B 13, 2708–2714 (1996)] produced an optical frequency map (accurate to $10^{-9}$) in the telecommunication band near 1.5 $\mu$m, using an OFCG that produced a 2-THz wide comb in that wavelength region, connecting various molecular overtone transition bands of $C_2H_2$ and HCN. The absolute frequency of the Cs $D_2$ transition at 852 nm was measured against the fourth harmonic of the HeNe/$CH_4$ standard, with an OFCG bridging the remaining frequency gap of 1.78 THz. [See Udem, J. Reichert, T. W. Hansch, and M. Kourogi, Phys. Rev. A 62, 031801—031801—031801–031804 (2000)]. The JILA group used a OFCG to measure the absolute optical frequency of the iodine stabilized Nd:YAG frequency near 532 nm. [See J. L. Hall, L. S. Ma, M. Taubman, B. Tiemann, F. L. Hong, O. Pfister, and J. Ye, IEEE Trans. Instrum. Meas. 48, 583–586 (1999)]. The level scheme for the measurement 310 is shown in FIG. 3. The sum frequency 300 of a Ti:Sapphire laser stabilized on the Rb two photon transition at 778 nm 302 and the frequency doubled Nd:YAG laser 304 was compared against the frequency-doubled output of a diode laser 306 near 632 nm. The 660 GHz frequency gap between the red diode frequency doubled output 306 and the iodine-stabilized HeNe laser 308 at 633 nm was measured using the OFCG. [See J. Ye, L. S. Ma, T. Day, and J. L. Hall, Opt. Lett. 22, 301–303 (1997)].

An OFCG was also used in the measurement of the absolute frequency of a Ne transition ($1S_5$ $2P_8$) at 636.6 nm, relative to the HeNe/$I_2$ standard at 632.99 nm. [See P. Dubé, personal communication 1997; J. Ye, Ph.D Thesis, U. of Colorado (1997)]. The lower level of the transition is a metastable state. Therefore, the resonance can only be observed in a discharged neon cell. The resonance has a natural linewidth of 7.8 MHz. It can be easily broadened (due to unresolved magnetic sublevels) and its center frequency shifted by an external magnetic field. This line is therefore not a high quality reference standard. However, it does have the potential of becoming a low cost and compact frequency reference that offers a frequency calibration on the order of 100 kHz. A red diode laser probing and inexpensive neon lamp form such a system.

The frequency gap between the HeNe/$I_2$ standard and the neon transition is about 468 GHz, which can easily be measured with an OFCG. The HeNe laser, which is the carrier of the comb, is locked to the $^{127}I_2$ R(127) 11-5 component $a_{13}$. The neon $1S_5$ $2P_8$ transition frequency was determined to be 473,143,829.76 (0.10) MHz.

The results obtained using OFCGs made the advantages of larger bandwidth very clear. However the bandwidth achievable by a traditional OFCG is limited by cavity dispersion and modulation efficiency. To achieve even larger bandwidth, mode-locked lasers were introduced, thus triggering a true revolution in optical frequency measurement. Mode-locked lasers are employed in accordance with the present invention.

SUMMARY

The ability to generate wide-bandwidth optical frequency combs has recently provided truly revolutionary advances. This patent describes the implementation of a method and apparatus for stabilizing the carrier phase with respect to the envelope of the pulses emitted by a mode-locked laser. The method and apparatus employ frequency domain techniques which result in a series of regularly spaced frequencies that form a "comb" spanning the optical spectrum. The optical frequency comb is generated by a mode-locked laser. The comb spacing is such that any optical frequency can be easily measured by heterodyning that optical frequency with a nearby comb line. Furthermore, it is possible to directly reference the comb spacing and position to the microwave cesium time standard, thereby determining the absolute optical frequencies of all of the comb lines. This recent advance in the optical frequency measurement technology has facilitated the realization of the ultimate goal of a practical optical frequency synthesizer: it forms a phase-coherent network linking the entire optical spectrum to the microwave standard. This advance also forms the basis for realization of controllable optical waveforms which is important in ultrafast science.

Simple extension to use of other harmonically generated comb frequencies are specifically included in this invention. For example, 3 times the red spectral output can be heterodyned against 2 times the blue spectral output, yielding the frequency offset $f_o$ as desired, even though the necessary relative bandwidth of the laser system is now reduced to only a factor of 1.5. Similarly, optical harmonic factors of 4 and 3 can provide the offset frequency $f_o$, even when the comb bandwidth limits have a ratio of only 1.3:1. As disclosed above, use of a frequency shifter, such as an AOM, in either heterodyne arm will displace the beat frequency phase comparison frequency away from the awkward region near zero frequency, modulus the repetition rate.

The present invention may therefore comprise a method of stabilizing the phase of a carrier wave signal with respect to an envelope of the pulses emitted by a mode-locked pulsed laser comprising: obtaining an optical output from the pulsed laser that has a bandwidth that spans at least one octave; separating a first frequency output from the optical output having a first frequency; separating a second frequency output from the optical output, the second frequency output having a second frequency that is twice the frequency of the first frequency; frequency doubling the first frequency output of the pulsed laser to produce a frequency doubled first output; frequency shifting the second frequency output by a predetermined amount to produce a second frequency shifted output; combining the frequency doubled first output and the second frequency shifted output to obtain a beat frequency signal; detecting the beat frequency signal; using the beat frequency signal to phase coherently stabilize the phase of the carrier wave signal relative to the envelope of the pulsed laser.

The present invention may further comprise a method of stabilizing the phase of a carrier wave signal with respect to an envelope of the pulses emitted by a mode-locked pulsed laser comprising: obtaining an optical output from the pulsed laser that has a bandwidth that spans at least one octave; separating a first frequency output from the optical output having a first frequency; separating a second frequency output from the optical output, the second frequency output having a second frequency that is twice the frequency of the first frequency; frequency doubling the first frequency output of the pulsed laser to produce a frequency doubled first output; frequency shifting the frequency doubled first output by a predetermined amount to produce a frequency doubled and shifted first output; combining the second frequency output and the frequency doubled and shifted first output to obtain a beat frequency signal; detecting the beat frequency signal; using the beat frequency signal to phase coherently stabilize the phase of the carrier wave signal relative to the envelope of the pulsed laser.

The present invention may further comprise a method of stabilizing the phase of a carrier wave signal with respect to an envelope of the pulses emitted by a mode-locked pulsed laser comprising: obtaining an optical output from the pulsed laser that has a bandwidth that spans at least one octave; separating a first frequency output from the optical output having a first frequency; separating a second frequency output from the optical output, the second optical frequency output having a second frequency that is twice the frequency of the first frequency; frequency doubling the first frequency output of the pulsed laser to produce a frequency doubled first output; frequency shifting one of the frequency doubled first output and the second frequency output by a predetermined amount to produce a frequency shifted output; combining one of the frequency doubled first output and the second frequency output with the frequency shifted output to obtain a beat frequency signal; detecting the beat frequency signal; using the beat frequency signal to stabilize the phase of the carrier wave signal relative to the envelope of the pulsed laser.

The present invention may further comprise a method of stabilizing the phase of a carrier wave signal with respect to an envelope of the pulses emitted by a mode-locked pulsed laser comprising: obtaining an optical output from the pulsed laser that has a bandwidth that spans at least one octave; separating a first frequency output from the optical output having a first frequency; separating a second frequency output from the optical output, the second frequency output having a second frequency that is twice the frequency of the first frequency; frequency shifting the first frequency output by a predetermined amount to produce a frequency shifted first output; frequency doubling the frequency shifted first output of the pulsed laser to produce a frequency shifted and doubled first output; combining the second frequency output and the frequency shifted and doubled first output to obtain a beat frequency signal; detecting the beat frequency signal; using the beat frequency signal to phase coherently stabilize the phase of the carrier wave signal relative to the envelope of the pulsed laser.

The present invention may further comprise a method of stabilizing the phase of a carrier wave signal with respect to an envelope of the pulses emitted by a mode-locked pulsed laser comprising: obtaining an optical output from the pulsed laser that has a bandwidth that spans less than one octave; separating a first frequency output from the optical output having a first frequency; separating a second frequency output from the optical output having a second frequency; multiplying the first frequency output of the pulsed laser by an integer value N that is at least equal to 2 to produce a frequency multiplied first output; multiplying the second frequency output of the pulsed laser by N-1 to produce a frequency multiplied second output; frequency shifting the frequency multiplied second output by a predetermined amount to produce a frequency multiplied second frequency shifted output; combining the frequency multiplied first output and the frequency multiplied second frequency shifted output to obtain a beat frequency signal; detecting the beat frequency signal; using the beat frequency signal to phase coherently stabilize the phase of the carrier wave signal relative to the envelope of the pulsed laser.

The present invention may further comprise a mode-locked pulsed laser system that stabilizes the phase of a carrier wave signal with respect to an envelope of the pulses emitted by the mode-locked pulsed laser system comprising: a mode-locked pulsed laser that generates an optical output; a beam splitter that separates a first frequency signal from the optical output, having a first frequency, from a second frequency signal of the optical output, the second frequency signal having a second frequency; a first frequency multiplier aligned with the first frequency signal that multiplies said first frequency signal by an integer value N that is at least equal to 2 to produce a frequency multiplied first signal; a second frequency multiplier aligned with the second frequency signal that multiplies said second frequency signal by N-1 to produce a frequency multiplied second signal; a frequency shifter aligned with the frequency multiplied second frequency signal that frequency shifts the frequency multiplied second frequency signal by a predetermined amount to produce a frequency multiplied second frequency shifted signal; a beam combiner that combines the frequency multiplied first signal and the frequency multiplied second frequency shifted signal to obtain a beat frequency signal; a detector aligned to detect the beat frequency signal; a control signal generator that generates control signals in response to the beat frequency signal; a servo-controller that modifies an optical cavity of the pulsed laser in response to the control signals to change relative velocity of the envelope and the carrier wave signal in the optical cavity.

The advantages of the present invention are that a compact and relatively inexpensive laser system can be provided that locks the phase of the envelope of the pulses of a mode-locked pulsed laser to the phase of the carrier wave. In this fashion, the system can be used for metrology such that an inexpensive and highly accurate optical clocks can be produced. In addition, by controlling the relative phase between the envelope and the carrier wave, peak signals can be generated having high constant energy values. In this fashion, the pulse laser system will provide clear advantages in the field of extreme non-linear optics. These advantages include above-threshold ionization and high harmonic generation/x-ray generation with intense femtosecond pulses. As disclosed below, above-threshold ionization can be used to determine absolute phase using circularly polarized light. The measurement of the pulse-to-pulse phase can also be used to measure x-ray generation efficiency using the intense very short pulses of the device of the present invention.

BRIEF DESCRIPTION OF THE DRAWINGS

FIG. 6 is a schematic illustration showing the manner in which a non-linear Kerr-lens acts to focus high intensities that are transmitted through an aperture while low intensities experience losses.

FIG. 10A illustrates the optical spectrum of a mode-locked laser with modespacing Δ plus a single frequency laser at frequency $f_1$.

FIG. 10B illustrates the signals detected by a fast photo-diode. The signals illustrate an RF spectrum with equally spaced modes due to the mode-locked laser.

FIG. 10C illustrates the output in a typical experiment of the RF spectrum showing both the repetition beats and the heterodyne beats.

FIGS. 11A, 11B and 11C schematically illustrate the manner in which modes of a cavity depend on the cavity length (FIGS. 11A and 11B), and the manner in which the swivel angle of the mirror affects the frequency (FIG. 11C).

FIG. 15A shows a typical cross correlation between pulse i and pulse i+2 emitted from a laser along with the resulting envelope. The relative phase is extracted by measuring the difference between the peak of the envelope and the nearest fringe.

FIG. 15B is a plot of the relative phase versus the offset frequency divided by the repetition rate. The linear results show a slope of 4% with a small overall phase shift that is attributed to the correlator.

DETAILED DESCRIPTION OF THE INVENTION

The present invention is based on the use of mode-locked lasers. To understand the present invention, it is therefore important to have a thorough understanding of the operation of mode-locked lasers.

Figure 1:
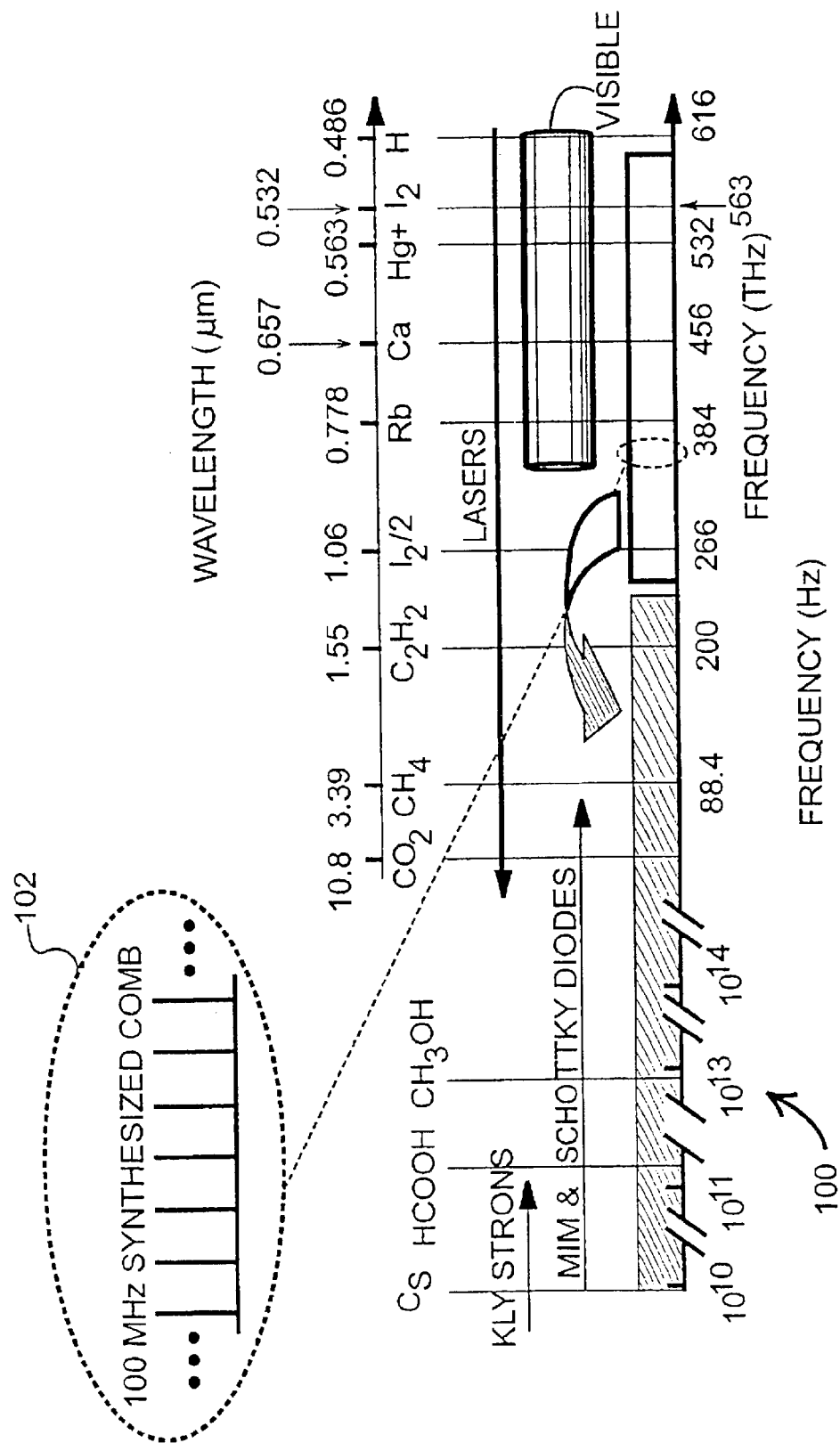
FIG. 1 is a map of a portion of the electromagnetic spectrum showing frequencies of several atomic and molecular reference transitions and the frequency ranges of various sources for generating those frequencies. The frequency comb generated by mode-locked femtosecond lasers spans the visible region and can be transferred to the infrared region by different frequency generation.
Figure 2A:
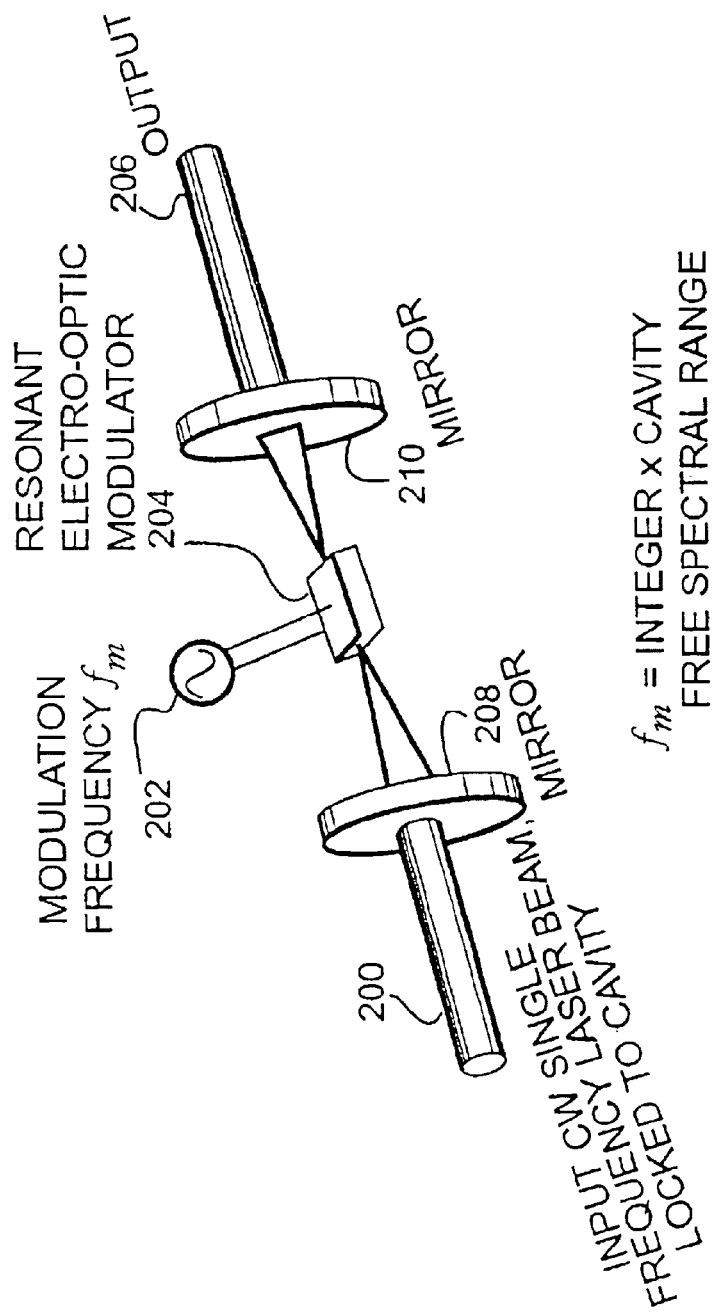
FIG. 2A is a schematic illustration of an optical frequency comb generator (OFCG) that utilizes an intracavity electro-optic modulator.
Figure 2B:
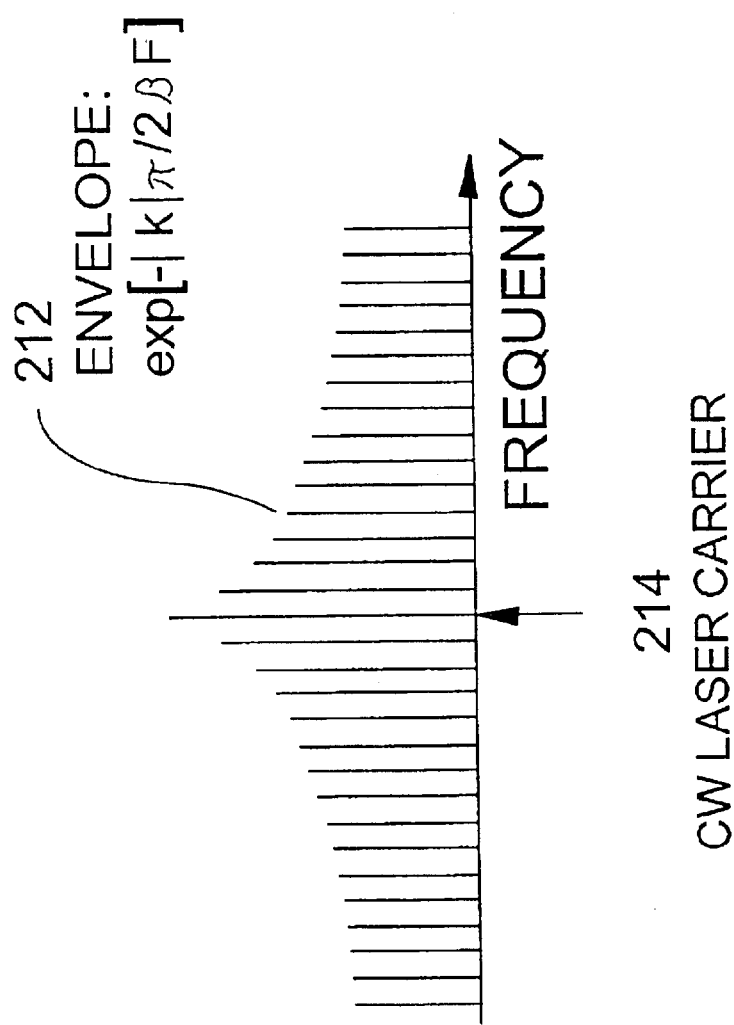
FIG. 2B is a graph of the optical frequency comb that is generated by the device of FIG. 2A.
Figure 3:
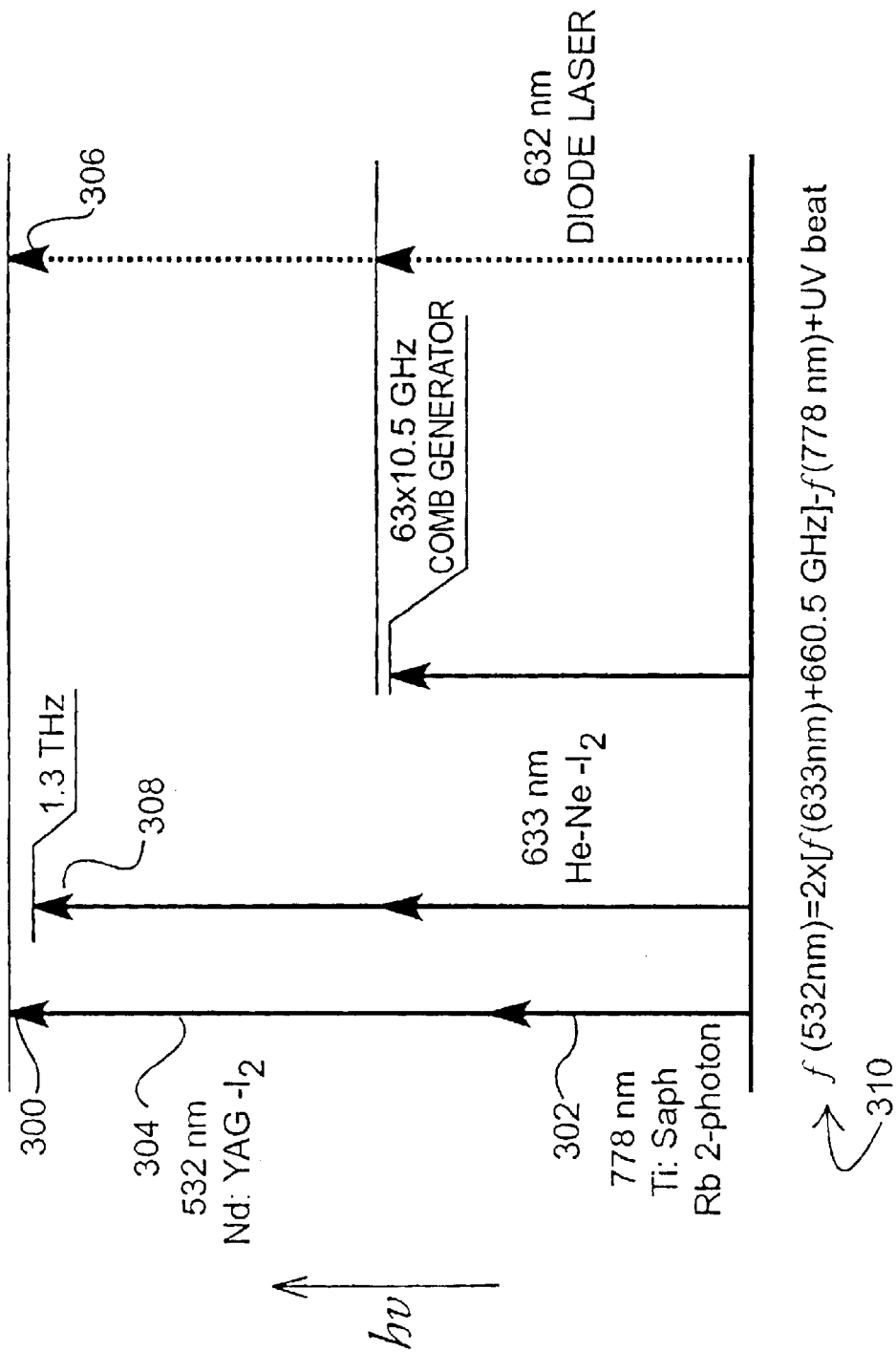
FIG. 3 is a schematic illustration of the manner in which an OFCG is used to measure the absolute frequency of an iodine stabilized in Nd:YAG frequency near 532 nm.
Figure 4:
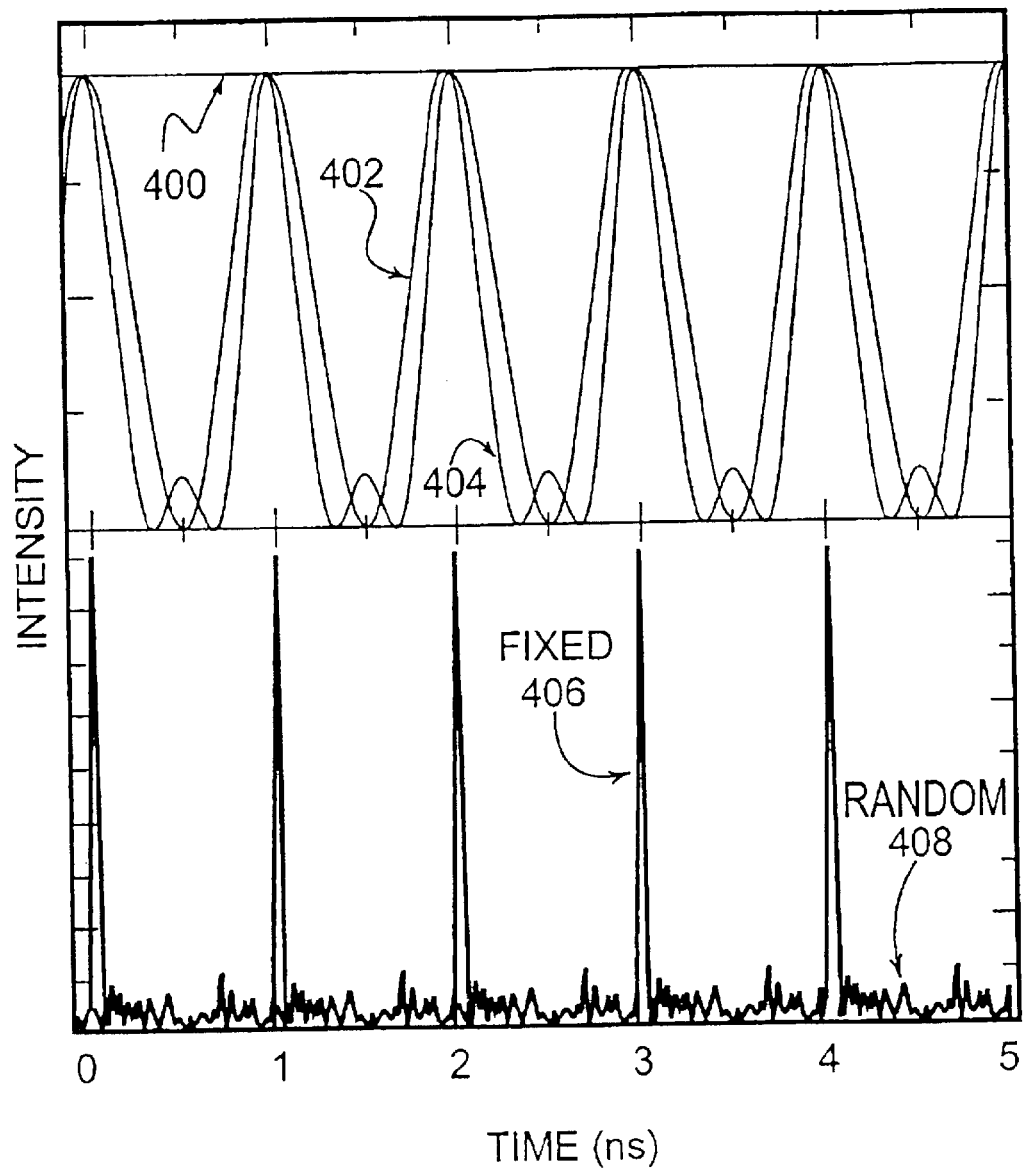
FIG. 4 is a diagram of laser intensity versus time that illustrates a pulse train that is generated by locking the phase of simultaneous locking modes.

Mode-locked Lasers. The OFCGs described above actually generate a train of short pulses. This is simply due to interference among modes with a fixed phase relationship and is depicted in FIG. 4. FIG. 4 also illustrates the pulse train generated by locking the phase of simultaneous oscillating modes. In the upper panel, the output intensity 400 is illustrated for one mode. In other words, the average intensity of one mode is constant. The intensity of two modes is shown at 402. The intensity of three modes is shown at 404. For a fixed phase relationship for 30 modes interference results in a pulse train 406. For random phases, the interference pattern 408 is illustrated. The mode spacing illustrated in FIG. 4 is 1 GHz.

The first OFCG was built to generate short optical pulses rather than for optical frequency synthesis or metrology. [See T. Kobayashi, T. Sueta, Y. Cho, and Y. Matsuo, App. Phys. Lett. 21, 341–343 (1972)]. Later work provided even shorter pulses from an OFCG. [See G M. Macfarlane, A. S. Bell, E. Riis, and A. I. Ferguson, Opt. Lett. 21, 534–536 (1996)].

A laser that can sustain simultaneous oscillation on multiple longitudinal modes can emit short pulses; it just requires a mechanism to lock the phases of all the modes, which occurs automatically in an OFCG due to the action of the EOM. Lasers that include such a mechanism are referred to as "mode-locked" (ML). While the term "mode-locking" comes from this frequency domain description, the actual processes that cause mode-locking are typically described in the time domain.

The inclusion of gain [S. A. Diddams, L. S. Ma, J. Ye, and J. L. Hall, Opt. Lett. 24, 1747–1749 (1999); K. P. Ho and J. M. Kahm, IEEE Photonics Technol. Lett 5, 721–725 (1993)] and dispersion compensation [L. R. Brothers and N. C. Wong, Opt. Lett. 22, 1015–1017 (1997)] in OFCGs brings them even closer to ML lasers. Indeed the use of ML lasers as optical comb generators has been developed in parallel with OFCG, starting with the realization that a regularly spaced train of pulses could excite narrow resonances because of the correspondence with a comb in the frequency domain. [See T. W. Hänsch, in *Tunable Lasers and Applications*, edited by A. Mooradain, T. Jaeger and P. Stokseth (Springer-Verlag, Berlin, 1976); E. V. Baklanov and V. P. chebotaev, Soviet Journal of Quantum Electronics 7, 1252–1255 (1977); R. Teets, J. Eckstein, and T. W. Hansch, Phys. Rev. Lett. 38, 760–764 (1977); M. M. Salour, Rev. Mod. Phys. 50, 667–681 (1978)]. Attention was quickly focused on ML lasers as the source of a train of short pulses. [See J. N. Eckstein, A. I. Ferguson, and T. W. Hänsch, Phys. Rev. Lett. 40, 847–850 (1978).; A. I. Ferguson and R. A. Taylor, Proc. SPIE 369, 366–373 (1983); S. R. Bramwell, D. M. Kane, and A. I. Ferguson, Opt. Commun. 56, 112–117 (1985); S. R. Bramwell, D. M. Kane, and A. I. Ferguson, J. Opt. Soc. Am. B 3, 208 (1986); S. R. Bramwell, A. I. Ferguson, and D. M. Kane, Opt Lett. 12, 666–668 (1987); D. J. Wineland, J. C. Bergquist, W. M. Itano, F. Diedrich, and C. S. Weimer, in *The Hydrogen Atom*, edited by G. F. Bassani, M. Inguscio and T. W. Hänsch (Springer-Verlag, Berlin, 1989), p. 123–133; H. R. Telle, G. Steinmeyer, A. E. Dunlop, J. Stenger, D. H. Sutter, and U. Keller, Appl. Phys. B 69, 327 (1999); T. Udem, J. Reichert, R. Holzwarth, and T. W. Hänsch, Opt. Lett. 24, 881–883 (1999); T. Udem, J. Reichert, R. Holzwarth, and T. W. Hänsch, Phys. Rev. Lett. 82, 3568–3571 (1999); J. Reichert, R. Holzwarth, T. Udem, and T. W. Hänsch, Opt. Commun. 172, 59–68 (1999); J. von Zanthier, J. Abel, T. Becker, M. Fries, E. Peik, H. Walther, R. Holzwarth, J. Reichert, T. Udem, T. W. Hänsch, A. Y. Nevsky, M. N. Skvortsov, and S. N. Bagayev, Opt. Commun. 166, 57–63 (1999); S. A. Diddams, D. J. Jones, L. S. Ma, S. T. Cundiff, and J. L. Hall, Opt. Lett. 25, 186–188 (2000); D. J. Jones, S. A. Diddams, J. K. Ranka, A. Stentz, R. S. Windeler, J. L. Hall, and S. T. Cundiff, Science 288, 635–639 (2000); D. J. Jones, S. A. Diddams, M. S. Taubman, S. T. Cundiff, L. S. Ma, and J. L. Hall, Opt. Lett. 25, 308–310 (2000); S. A. Diddams, D. J. Jones, J. Ye, T. Cundiff, J. L. Hall, J. K. Ranka, R. S. Windeler, R. Holzwarth, T. Udem, and T. W. Hansch, Phys. Rev. Lett. 84, 5102–5105 (2000); J. Reichert, M. Niering, R. Holzwarth, M. Weitz, T. Udem, and T. W. Hänsch, Phys. Rev. Lett. 84, 3232–3235 (2000); T. H. Yoon, A. Marian, J. L. Hall, and J. Ye, Phys. Rev. A 63, 011402 (2000)]. The recent explosion of measurements based on ML lasers has been largely due to development of the Kerr-lens-mode-locked (KLM) Ti:sapphire laser [D. K. Negus, L. Spinelli, N. Goldblatt, and G. Feugnet, in *Advanced Solid-State Lasers* (OSA, 1991), Vol. 10; D. E. Spence, P. N. Kean, and W. Sibbett, Opt. Lett. 16, 42–44 (1991); M. T. Asaki, C. P. Huang, D Garvey, J. P. Zhou, H. C. Kapteyn, and M. M. Murnane, Opt. Lett. 18, 977–979 (1993)] and its ability to generate pulses sufficiently short so that the spectral width approaches an optical octave. Many recent results have obtained a spectral width exceeding an octave by spectral broadening external to the laser cavity. [See D. J. Jones, S. A. Diddams, J. K. Ranka, A. Stentz, R. S. Windeler, J. L. Hall, and S. T. Cundiff, Science 288, 635–639 (2000); S. A. Diddams, D. J. Jones, J. Ye, T. Cundiff, J. L. Hall, J. K. Ranka, R. S. Windeler, R. Holzwarth, T. Udem, and T. W. Hansch, Phys. Rev. Lett. 84, 5102–5105 (2000); J. K. Ranka, R. S. Windeler, and A. J. Stentz, Opt. Lett. 25, 25–27 (2000)].

ML lasers have succeeded in generating much larger bandwidth than OFCGs, which is very attractive. In addition, they tend to be "self adjusting" in the sense that they do not require the active matching between cavity length and modulator frequency that an OFCG does. Although the spacing between the longitudinal modes is easily measured (it is just the repetition rate) and controlled, the absolute frequency positions of the modes is a more troublesome issue and requires some method of active control and stabilization. The incredible advantage of having spectral width in excess of an octave is that it allows the absolute optical frequencies to be determined directly from a cesium clock [H. R. Telle, G. Steinmeyer, A. E. Dunlop, J. Stenger, D. H. Sutter, and U. Keller, Appl. Phys. B 69, 327 (1999); D. J. Jones, S. A. Diddams, J. K. Ranka, A. Stentz, R. S. Windeler, J. L. Hall, and S. T. Cundiff, Science 288, 635–639 (2000); S. A. Diddams, D. J. Jones, J. Ye, T. Cundiff, J. L. Hall, J. K. Ranka, R. S. Windeler, R. Holzwarth, T. Udem, and T. W. Hansch, Phys. Rev. Lett. 84, 5102–5105 (2000)] without the need for intermediate local oscillators.

1. Introduction to Mode-locked Lasers. ML lasers generate short optical pulses by establishing a fixed phase relationship between all of the lasing longitudinal modes (see FIG. 4). [See J.-C. Diels and W. Rudolph, Ultrashort laser pulse phenomena: fundamentals, techniques, and applications on a femtosecond time scale (Academic Press, San Diego, 1996)]. Mode-locking requires a mechanism that results in higher net gain (gain minus loss) for a train of short pulses compared to CW operation. This can be done by an active element, such as an acousto-optic modulator, or passively due to saturable absorption (real or effective). Passive ML yields the shortest pulses because, up to a limit, the self-adjusting mechanism becomes more effective than active mode locking, which can no longer keep pace with the ultrashort time scale associated with shorter pulses. [See E. P. Ippen, Appl. Phys. B 58, 159–170 (1994)]. Real saturable absorption occurs in a material with a finite number of absorbers, for example a dye or semiconductor. Real saturable absorption usually has a finite response time associated with relaxation of the excited state. This typically limits the shortest pulse widths that can be obtained. Effective saturable absorption typically utilizes the nonlinear index of refraction of some material together with spatial effects or interference to produce higher net gain for more intense pulses. The ultimate limit on minimum pulse duration in a ML laser is due to an interplay between the ML mechanism (saturable absorption), group velocity dispersion (GVD), and net gain bandwidth.

Figure 5:
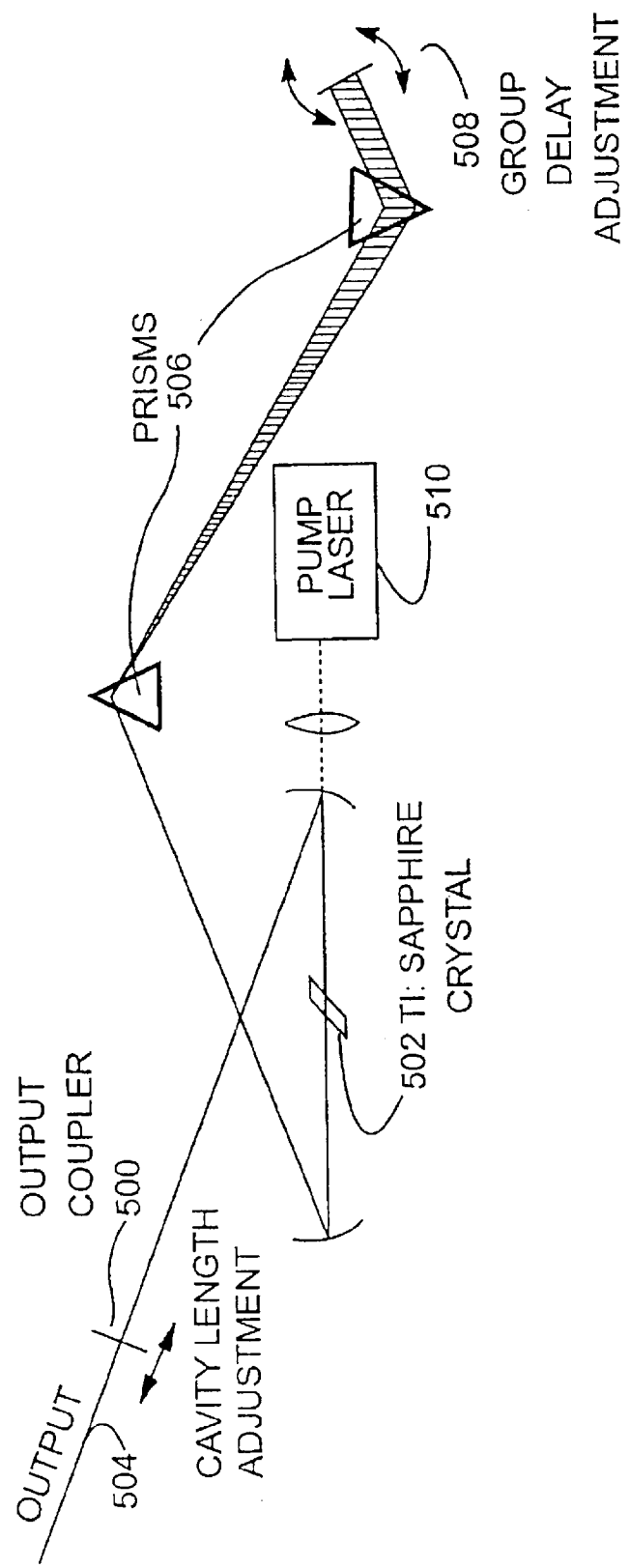
FIG. 5 is a diagram of a typical Kerr-lens mode-locked Ti:sapphire laser.

Because of its excellent performance and relative simplicity, the Kerr-lens mode-locked Ti:sapphire (KLM Ti:S) laser has become the dominant laser for generating ultrashort optical pulses. A diagram of a typical KLM Ti:S laser is shown in FIG. 5. The laser comprises an output coupler 500 which generates an output 504. The laser cavity is formed from the output coupler 500 and the adjustable mirror 508. The Ti:S crystal 502 is pumped by green light from a pump laser 510 such as either an $Ar^+$-ion laser (all lines or 514 nm) or a diode-pumped solid state (DPSS) laser emitting 532 nm. Ti:S absorbs 532 more efficiently, so 4–5 watts of pump light is typically used from a DPSS laser, while 6–8 W of light from an Ar⁺-ion laser is usually required. The Ti:S crystal 502 provides gain and serves as the nonlinear material for mode-locking. The prisms 506 compensate the GVD in the gain crystal. [See R. L. Fork, O. E. Martinez, and J. P. Gordon, Opt. Lett. 9, 150–152 (1984)]. Since the discovery of KLM [D. K. Negus, L. Spinelli, N. Goldblatt, and G. Feugnet, in *Advanced Solid-State Lasers* (OSA, 1991), Vol. 10; D. E. Spence, P. N. Kean, and W. Sibbett, Opt. Lett. 16, 42–44 (1991)], the pulse width obtained directly from the ML laser has been shortened by approximately an order of magnitude by first optimizing the intracavity dispersion [M. T. Asaki, C. P. Huang, D. Garvey, J. P. Zhou, H. C. Kapteyn, and M. M. Murnane, Opt. Lett. 18, 977–979 (1993)], and then using dispersion compensating mirrors [U. Morgner, F. X. Kartner, S. H. Cho, Y. Chen, H. A. Haus, J. G. Fujimoto, E. P. Ippen, V. Scheuer, G. Angelow, and T. Tschudi, Opt. Lett. 24, 411–413 (1999); D. H. Sutter, G. Steinmeyer, L. Gallmann, N. Matuschek, F. Morier-Genoud, U. Keller, V. Scheuer, G. Angelow, and T. Tschudi, Opt. Lett. 24, 631–633 (1999)] yielding pulses that are less than 6 fs in duration, i.e. less than two optical cycles. A brief review is provided as to how a KLM laser works. While there are other ML lasers and mode-locking techniques, those are not addressed because of the ubiquity of KLM lasers at the present time. Pulses of similar duration were achieved earlier [R. L. Fork, C. H. B. Cruz, P. C. Becker, and C. V. Shank, Opt. Lett. 12, 483–485 (1987)]; however, this relied on external amplification at a low repetition, with pulse broadening and compression, which does not preserve a suitable comb structure for optical frequency synthesis.

The primary reason for using Ti:S is its enormous gain bandwidth, which is necessary for supporting ultrashort pulses by the Fourier relationship. The gain band is typically quoted as extending from 700 to 1000 nm, although lasing can be achieved well beyond 1000 nm. If this entire bandwidth could be mode-locked as a hyperbolic secant of Gaussian pulse, the resulting pulse width would be 2.5–3 fs. While this much bandwidth has been mode-locked, the spectrum is far from smooth, leading to longer pulses.

The Ti:S crystal also provides the mode-locking mechanism in these lasers. This is due to the nonlinear index of refraction (Kerr effect), which is manifested as an increase of the index of refraction as the optical intensity increases. Because the intracavity beam's transverse intensity profile is Gaussian, a Gussian index profile is created in the Ti:S crystal. A Gaussian index profile is equivalent to a lens, hence the beam slightly focuses, with the focusing increasing with increasing optical intensity. Together with a correctly positioned effective aperture, the nonlinear (Kerr) lens 604, 606 can act as a saturable absorber, i.e. high intensities 602 are focused and hence transmit fully through the aperture 610 while low intensities 600 experience losses through aperture 610, as shown in FIG. 6. Since short pulses produce higher peak powers, they experience lower loss, making mode-locked operation favorable. While some KLM lasers include an explicit aperture, the small size of the gain region can act as one. This mode-locking mechanism has the advantage of being essentially instantaneous; no real excitation is created that needs to relax. It has the disadvantages of not being self-starting and requiring a critical misalignment from optimum CW operation.

Spectral dispersion in the Ti:S crystal due to the variation of the index of refraction with wavelength will result in spreading of the pulse each time it traverses the crystal. At these wavelengths, sapphire displays "normal" dispersion, where longer wavelengths travel faster the shorter ones. To counter-act this, a prism sequence is used in which the first prism spatially disperses the pulse, causing the long wavelength components to travel through more glass in the second prism than do the shorter wavelength components. [See R. L. Fork, O. E. Martinez, and J. P. Gordon, Opt. Lett. 9, 150–152 (1984)]. The net effect is to generate "anomalous" dispersion to counteract the normal dispersion in the Ti:S crystal. The spatial dispersion is undone by placing the prism pair at one end of the cavity so that the pulse retraces its path through the prisms. It is also possible to generate anomalous dispersion with dielectric mirrors [R. Szipocs, K. Ferencz, C. Spielmann, and F. Krausz, Opt. Lett. 19, 201–203 (1994)]; these are typically called "chirped mirrors." They have the advantage of allowing shorter cavity lengths but the disadvantage of less adjustability. Also, at present, they are still hard to obtain commercially.

2. Frequency Spectrum of Mode-locked Lasers. To successfully exploit ML lasers for the generation of frequency combs with known absolute frequencies, it is necessary to understand the spectrum emitted by a mode-locked laser, how it arises and how it can be controlled. While it is always possible to describe the operation of these lasers in either the time or frequency domain, the details of connecting the two are rarely presented. Unless sufficient care is taken, it is easy for misunderstandings to arise when attempting to convert understanding in one domain into the other.

a. Time Domain Description of Pulses Emitted by a Mode-locked Laser. Mode-locked lasers generate a repetitive train of ultrashort optical pulses by fixing the relative phases of all of the lasing longitudinal modes. [See A. E. Siegman, *Lasers*, (University Science Books, Mill Valley Calif., 1986), p. 1041–1128]. Current mode-locking techniques are effective over such a large bandwidth that the resulting pulses can have a duration of 6 femtoseconds or shorter, i.e., approximately two optical cycles. [See M. T. Asaki, C.-P. Huang, D. Garvey, J. Zhou, H. C. Kapteyn, M. M. Murnane, Opt. Lett. 18, 977 (1993); U. Morgner, F. X. K ärtner, S. H. Cho, Y. Chen, H. A. Haus, J. G. Fujimoto, E. P. Ippen, V. Scheuer, G. Angelow, T. Tschudi, Opt. Lett. 24, 411 (1999); D. H. Sutter, G. Steinmeyer, L. Gallmann, N. Matuschek, F. Morier-Genoud, U. Keller, V. Scheuer, G. Angelow, T. Tschudi, Opt. Lett. 24, 631 (1999)]. With such ultrashort pulses, the relative phase between peak of the pulse envelope and the underlying electric-field carrier wave becomes significant. In general, this phase is not constant from pulse-to-pulse because the group and phase velocities differ inside the laser cavity, as shown in the time domain diagram 700 of FIG. 7A. To date, techniques of phase control of fs pulses have employed time domain methods. [See L. Xu, Ch. Spielmann, A. Poppe, T. Brabec, F. Krausz, T. W. Hänsch, Opt. Lett. 21, 2008 (1996)]. However, these techniques have not utilized active feedback and rapid dephasing occurs due to pulse energy fluctuations and other perturbations inside the cavity. Active control of the relative carrier-envelope phase prepares a stable pulse-to-pulse phase relationship, as presented below and dramatically impacts extreme nonlinear optics.

Figure 7A:
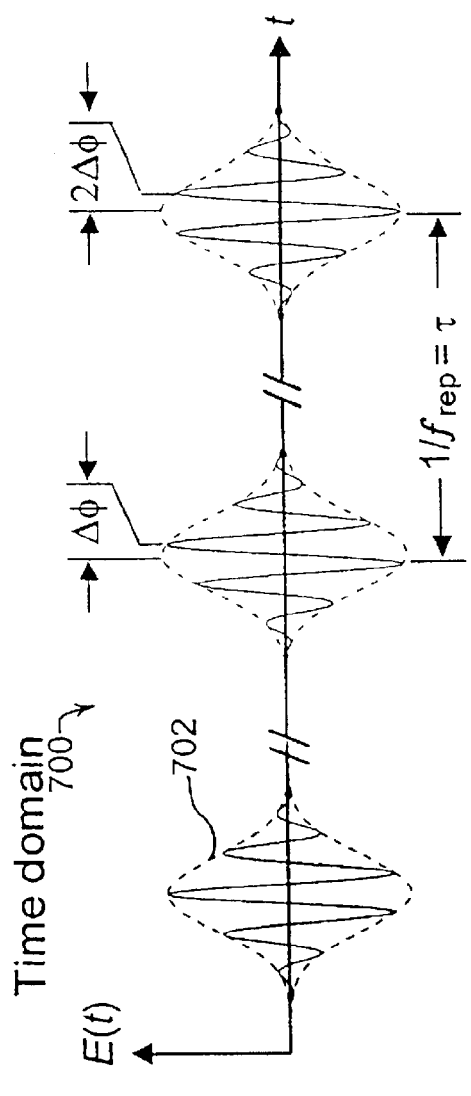
FIG. 7A is a time domain description of the pulses emitted by a mode-locked laser.

As shown in FIG. 7A, a mode-locked laser emits a pulse 702 every time the pulse circulating inside the cavity impinges on the output coupler. This results in a train of pulses separated by time $\tau = l_c/v_g$ where $l_c$ is the length of the cavity and $v_g$ is the net group velocity. Due to dispersion in the cavity, the group and phase velocities are not equal. This results in a phase shift of the "carrier" wave with respect to the peak of the envelope for each round trip. The shift between successive pulses is designated as $\Delta\phi$. It is given by $$\Delta\phi = \left(\frac{1}{v_g} - \frac{1}{v_p}\right) l_e \omega_e \bmod 2\pi$$

where $v_p$ is the intracavity phase velocity and $\omega_c$ is the carrier frequency. This pulse-to-pulse shift is shown in FIG. 7A. The overall carrier-envelope phase of a given pulse, which obviously changes from pulse-to-pulse if $\Delta\phi \neq 0$, includes an offset which does not affect the frequency spectrum. There is no concern with this offset phase, although it is a subject of current interest in the ultrafast community.

b. Frequency Domain Considerations

Figure 7B:
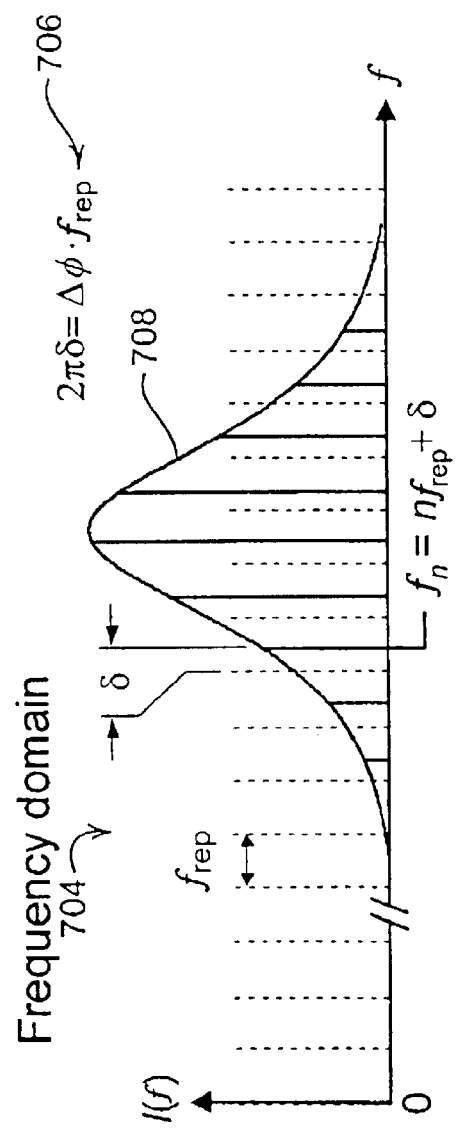
FIG. 7B illustrates the Gaussian distribution in the frequency domain of the comb lines that are generated by the pulsed laser of the present invention.
Figure 8A:
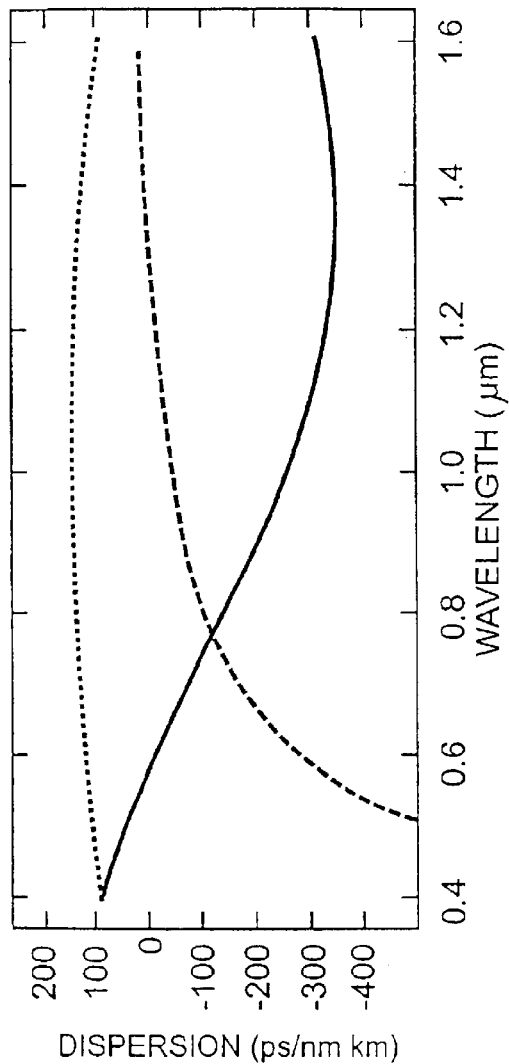
FIGS. 8a through 8d are graphs of wavelength versus dispersion illustrating the dispersion created by various optical fibers.
Figure 8B:
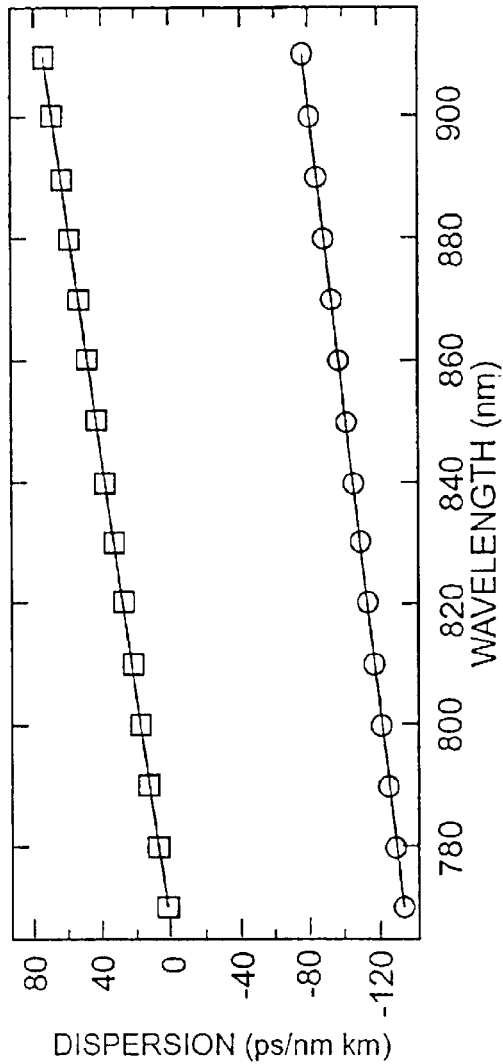
Figure 8C:
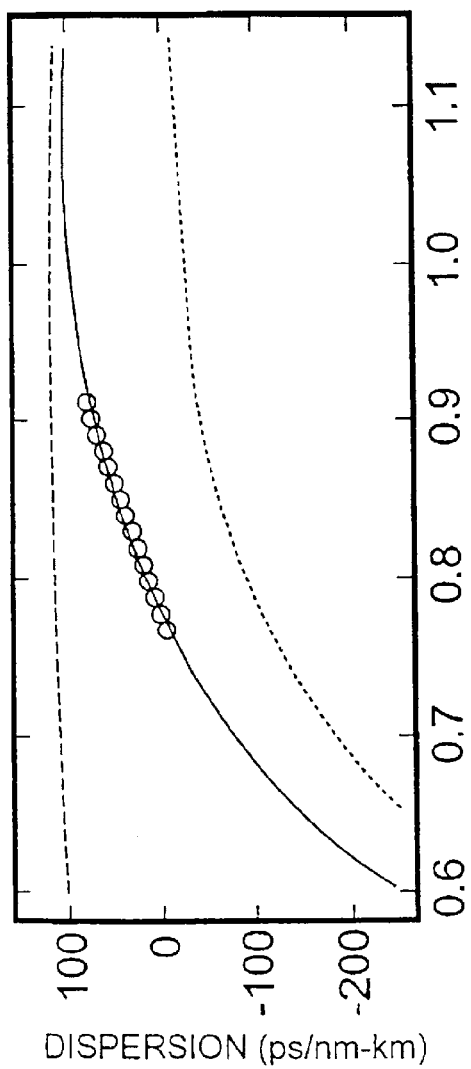
Figure 8D:
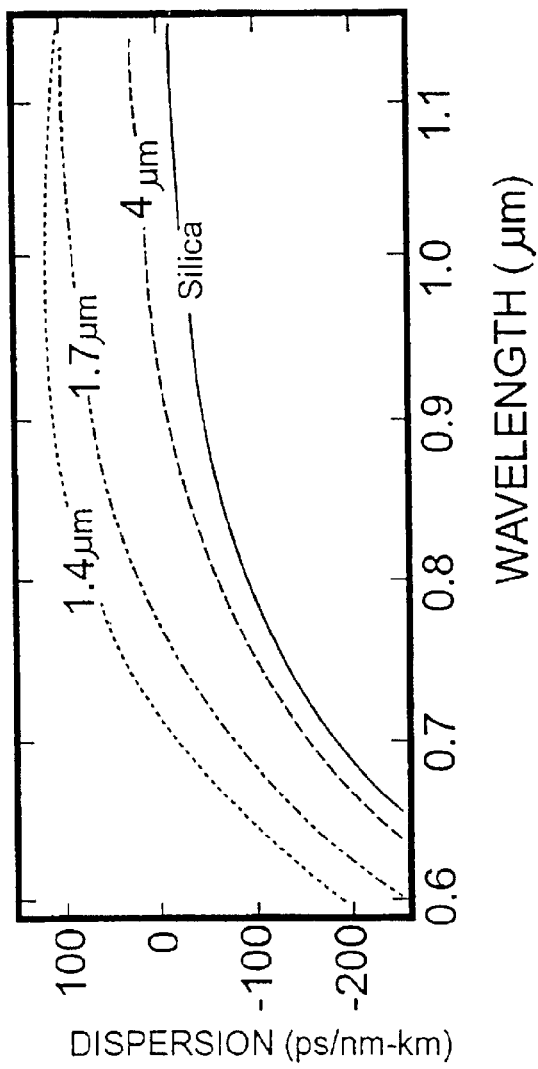

1) Comb Spacing. The frequency spectrum of the pulse train emitted by a ML laser consists of a comb of frequencies 700. The spacing of the comb lines shown in FIG. 7B is simply determined by the repetition rate of the laser. This is easily obtained by Fourier transforming a series of $\delta$-function-like pulses in time. The repetition rate is in turn determined by the group velocity and the length of the cavity.

2) Comb Position. If all of the pulses have the same phase relative to the envelope, i.e. $\Delta\phi = 0$, then the spectrum is simply a series of comb lines with frequencies that are integer multiples of the repetition rate. However this is not in general true, due to the difference between the group and phase velocities inside the cavity. To calculate the effect of a pulse-to-pulse phase shift on the spectrum, we write the electric field, E(t), of a pulse train. At a fixed spatial location, let the field of a single pulse be $E_1(t) = \hat{E}(t)e^{i(\omega_c t + \phi_0)}$. Then the field for train of pulses is:

$$E(t) = \sum_n \hat{E}(t - n\tau)e^{i(\omega_c t - n\omega_c \tau + n\Delta\phi + \phi_0)}$$

$$= \sum_n \hat{E}(t - n\tau)e^{i(\omega_c t + n(\Delta\phi - \omega_c \tau) + \phi_0)}$$

where $\hat{E}(t)$ is the envelope, $\omega_c$ is the "carrier" frequency, $\phi_0$ is the overall phase offset and $\tau$ is the time between pulses (for pulses emitted by a mode-locked laser $\tau = t_g$, where $t_g$ is the group roundtrip delay time of the laser cavity). Applying the Fourier transform, $$E(\omega) = \int \sum_n \hat{E}(t - n\tau)e^{i(\omega_c t + n(\Delta\phi - \omega_c \tau) + \phi_0)} e^{-i\omega x} dt$$

$$= \sum_n e^{i(n(\Delta\phi - \omega_c \tau) + \phi_0)} \int \hat{E}(t - n\tau) e^{-i[(\omega - \omega_c)t]} dt$$

letting $\tilde{E}(\omega) = \int \hat{E}(t) e^{-int} dt$ and recalling the identity:

$$\int f(x-a) e^{-la\alpha} dx = e^{-la\alpha} \int f(x) e^{-la\alpha} dx \text{ we obtain:}$$

$$E(\omega) = \sum_n e^{i(n(\Delta\phi - \omega_c \tau) + \phi_0)} e^{-in(\omega - \omega_c)\tau} \tilde{E}(\omega - \omega_e)$$

$$= e^{i\phi_0} \sum_n e^{i(n\Delta\phi - n\omega\tau)} \tilde{E}(\omega - \omega_c)$$

The significant components in the spectrum are the ones for which the exponential in the sum add coherently because the phase shift between pulse n and n+1 is a multiple of $2\pi$. Equivalently $\Delta\phi - \omega\tau = 2m\pi$. This yields a comb spectrum with frequencies:

$$\omega_m = \frac{\Delta\phi}{\tau} - \frac{2m\pi}{\tau}$$

or, converting from angular frequency, $f_m = mf_{rep} + \delta$ where $\delta = \Delta\phi \cdot f_{rep}/2\pi$ and $f_{rep} = 1/\tau$ is the repetition frequency. Hence, the position of the comb is offset from integer multiples of the repetition rate by a frequency $\delta$, which is determined by the pulse-to-pulse phase shift. This is shown schematically in FIG. 7B.

3. Frequency Control of the Spectrum. For the comb generated by a ML laser to be useful for synthesizing optical frequencies, control of its spectrum, i.e., the absolute position and spacing of the comb lines, is necessary. In terms of the above description of the output pulse train, this means control of the repetition rate, $f_{rep}$, and the pulse-to-pulse phase shift, $\Delta\phi$. Once the pulses have been emitted by the laser, $f_{rep}$ cannot be controlled. $\Delta\phi$ can be controlled by shifting the frequency of the comb, for example with an acousto-optic modulator. [See R. J. Jones, J. C. Diels, J. Jasapara, and W. Rudolph, Opt. Commun. 175, 409–418 (2000)]. However it is generally preferable to control both $f_{rep}$ and $\Delta\phi$ by making appropriate adjustments to the operating parameters of the laser itself. Some experiments only require control of the repetition rate, $f_{rep}$. This can easily be obtained by adjusting the cavity length.

Many experiments are simplified by locking both $f_{rep}$ and $\delta$. To do so, both the round trip group delay and the round trip phase delay must be controlled. Adjusting the cavity length changes both. If we rewrite $f_{rep}$ and $\delta$ in terms of round trip delays we find $$f_{rep} = \frac{1}{t_g}; \delta = \frac{\omega_c}{2\pi t_g}(t_g - t_p)$$

where $t_g = l_c/v_g$ is the round trip group delay and $t_p = l_c/v_p$ is the round trip phase delay. Both $t_g$ and $t_p$ depend on $l_c$, therefore another parameter must be used to control them independently. Methods for doing this will be discussed later. The equation for $\delta$ may seem unphysical because it depends on $\omega_c$, which is arbitrary, however there is an implicit dependence on $\omega_c$ that arises due to the dispersion in $v_p$ (and hence $t_p$) that cancels the explicit dependence. Note that $v_p$ must have dispersion for $v_p \neq v_g$ and that $v_g$ must be constant (dispersionless) for stable mode-locked operation.

4. Spectral Broadening. It is generally desirable to have a comb that spans the greatest possible bandwidth. At the most basic level, this is simply because it allows the measurement of the largest possible frequency intervals. Ultimately, when the output spectrum from a comb generator is sufficiently wide, it is possible to determine the absolute optical frequencies of the comb lines directly from a microwave clock, i.e. without relying on intermediate phase locked oscillators. The simplest of these techniques requires a spectrum that spans an octave, i.e. the high frequency components have twice the frequency of the low frequency components. In the transform limit and for a spectrum with a single peak, this bandwidth would correspond to a single cycle pulse, which has yet to be achieved. Thus it has been necessary to rely on external broadening of the spectrum. Fortunately, the optical heterodyne technique employed for detection of single comb components is very sensitive, therefore it is not necessary to have a 3 dB bandwidth of an octave. Detection is typically feasible even when the power at the octave points is 10 to 30 dB below the peak. As noted above, additional techniques allow our measurement control system to be used even when the comb frequency ratios are smaller than 2:1.

Self-phase modulation (SPM) occurs in a medium with a nonlinear index of refraction, i.e. a third order optical nonlinearity. It generates new frequencies, thereby broadening the spectrum of a pulse. This process occurs in the gain crystal of a ML laser and can result in output spectra that exceed the gain bandwidth. In the frequency domain it can be viewed as four-wave-mixing between the comb lines. The amount of broadening increases with the peak power per unit cross-sectional area of the pulse in the nonlinear medium. Consequently, optical fiber is often used as a nonlinear medium because it confines the optical power in a small area and results in an interaction length that is longer than could be obtained in a simple focus. While the small cross section can be maintained for very long distances, the high peak power in fact is typically only maintained for a rather short distance because of group velocity dispersion in the fiber, which stretches the pulse in time and reduces the peak power. Nevertheless, it has been possible to generate an octave of usable bandwidth with ordinary single spatial mode optical fiber by starting with very short and intense pulses from a low repetition rate laser.[See A. Apolonski, A. Poppe, G. Tempea, C. Spielmann, T. Udem, R. Holzwarth, T. W. Hänsch, and F. Krausz, Phys. Rev. Lett. 85, 740–743 (2000)]. The low repetition rate increases the energy per pulse despite limited average power, thereby increasing the broadening. The fiber was only 3 mm long. The pulses were pre-chirped before being launched into the fiber so that the dispersion in the fiber would recompress them.

The recent development of microstructured fiber has made it possible to easily achieve well in excess of an octave bandwidth using the output from an ordinary KLM Ti:S laser. [See J. K. Ranka, R. S. Windeler, and A. J. Stentz, Opt. Lett. 25, 25–27 (2000); J. K. Ranka, R. S. Windeler, and A. J. Stentz, Opt. Lett. 25, 796–798 (2000)]. Microstructured fibers consist of a fused silica core surrounded by air holes. This design yields a waveguide with a very high contrast of the effective index of refraction between the core and cladding. The resultant waveguiding provides a long interaction length with a minimum beam cross-section. In addition, the waveguiding permits designing of the zero-point of the group velocity dispersion to be within the operating spectrum of a Ti:S laser (for ordinary fiber the group-velocity-dispersion zero can only occur for wavelengths longer than 1.3 microns). FIGS. 8a–8d show the dispersion curves for several different core diameters. [See J. K. Ranka, R. S. Windeler, and A. J. Stentz, Opt. Lett. 25, 796–798 (2000)]. This property means that the pulse does not disperse and the nonlinear interaction occurs over a long distance (centimeters to meters, rather than millimeters in ordinary fiber).

Figure 9:
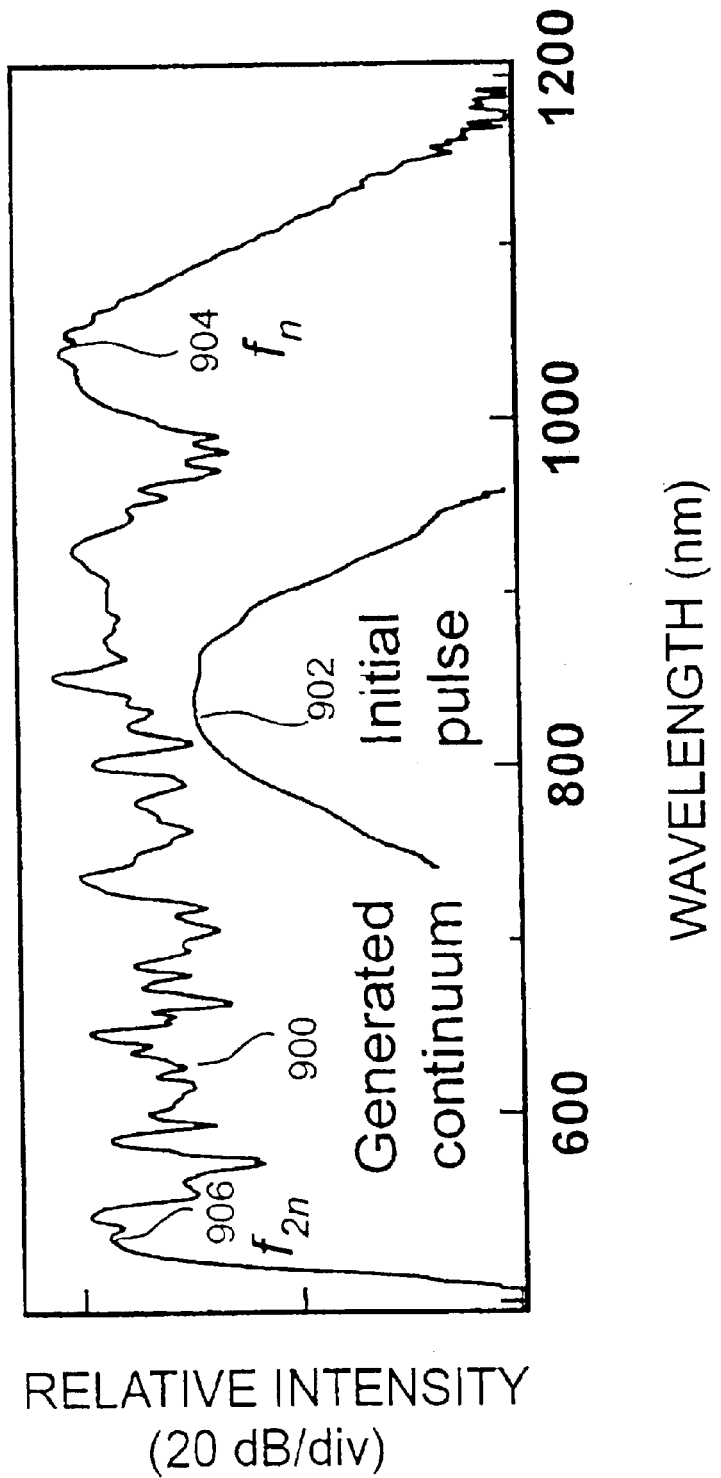
FIG. 9 illustrates the input and output spectra of an optic fiber that may be used in accordance with the present invention.

Typical input 902 and output 900 spectra are shown in FIG. 9. The output spectrum 900 is very sensitive to the launched power and polarization. It is also sensitive to the spectral position relative to the zero-GVD point and the chirp of the incident pulse 902. Because the fiber displays anomalous dispersion, pre-compensation of the dispersion is not required if the laser spectrum is centered to the long wavelength side of the zero-GVD point (i.e., in the anomalous dispersion region). Because the pulse 902 is tuned close to a zero-GVD point, the output phase profile is dominated by third-order dispersion. [See L. Xu, M. W. Kimmel, P. O'Shea, R. Trebino, J. K. Ranka, R. S. Windeler, and A. J. Stentz, in *XII International Conference on Ultrafast Phenomena*, edited by S. M. T. Elsacsser, M. M. Murnane and N. F. Scherer (Springer-Verlag, Charleston, S.C., 2000)].

Figure 10A:
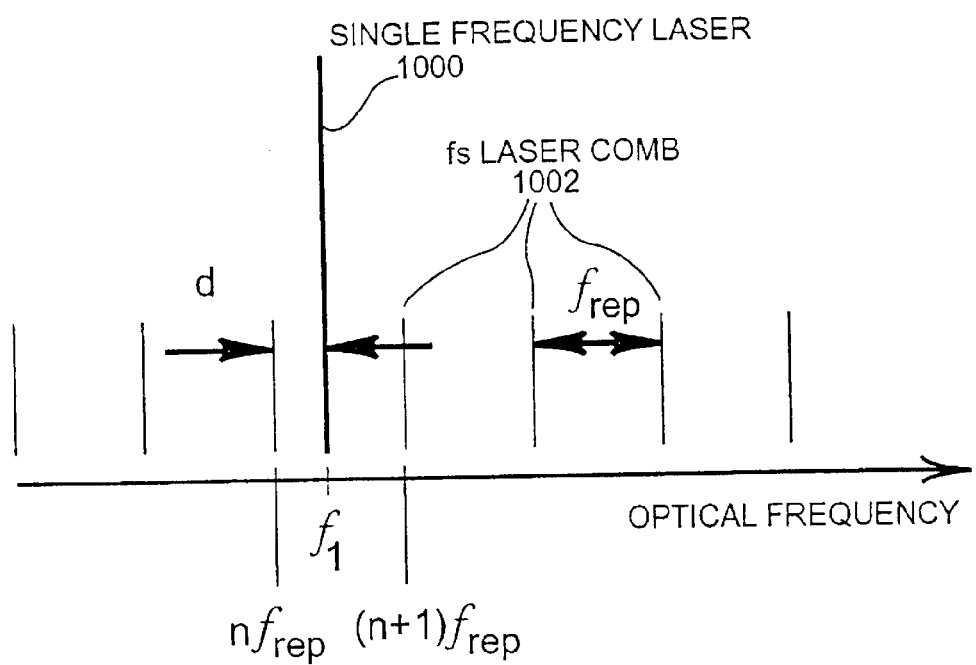
FIGS. 10A, 10B and 10C illustrate the correspondence between optical frequencies and heterodyne beats in the RF spectrum.
Figure 10B:
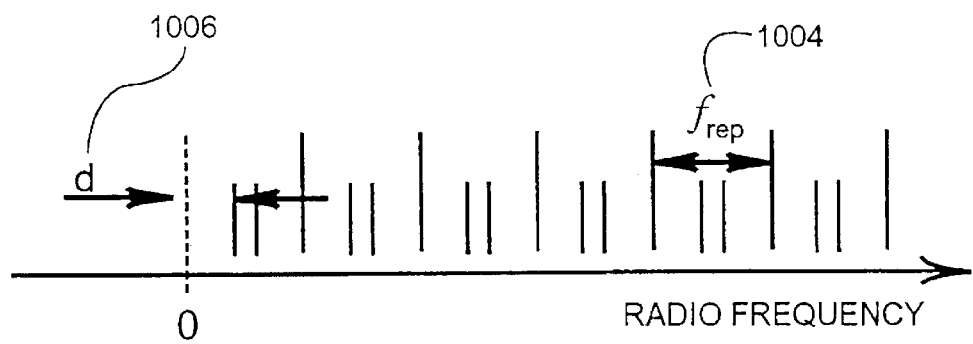

Nonlinear processes in the microstructure fiber also produce broadband noise in the radio-frequency spectrum of a photodiode that detects the pulse train 1002 as shown in FIGS. 10A and 10B. This has deleterious effects on the optical frequency measurements described below because the noise can mask the heterodyne beats 1010 and 1012 shown in FIG. 10C. The noise increases with increasing input pulse energy and appears to display a threshold behavior. This makes it preferable to use short input pulses as less broadening, and hence less input power is required. The exact origin of the noise is currently uncertain, it may be due to guided acoustic-wave Brillouin scattering. [See A. J. Poustie, Opt. Lett. 17, 574–576 (1992); A. J. Poustie, J. Opt. Soc. Am. B 10, 691–696 (1993)].

Figure 10C:
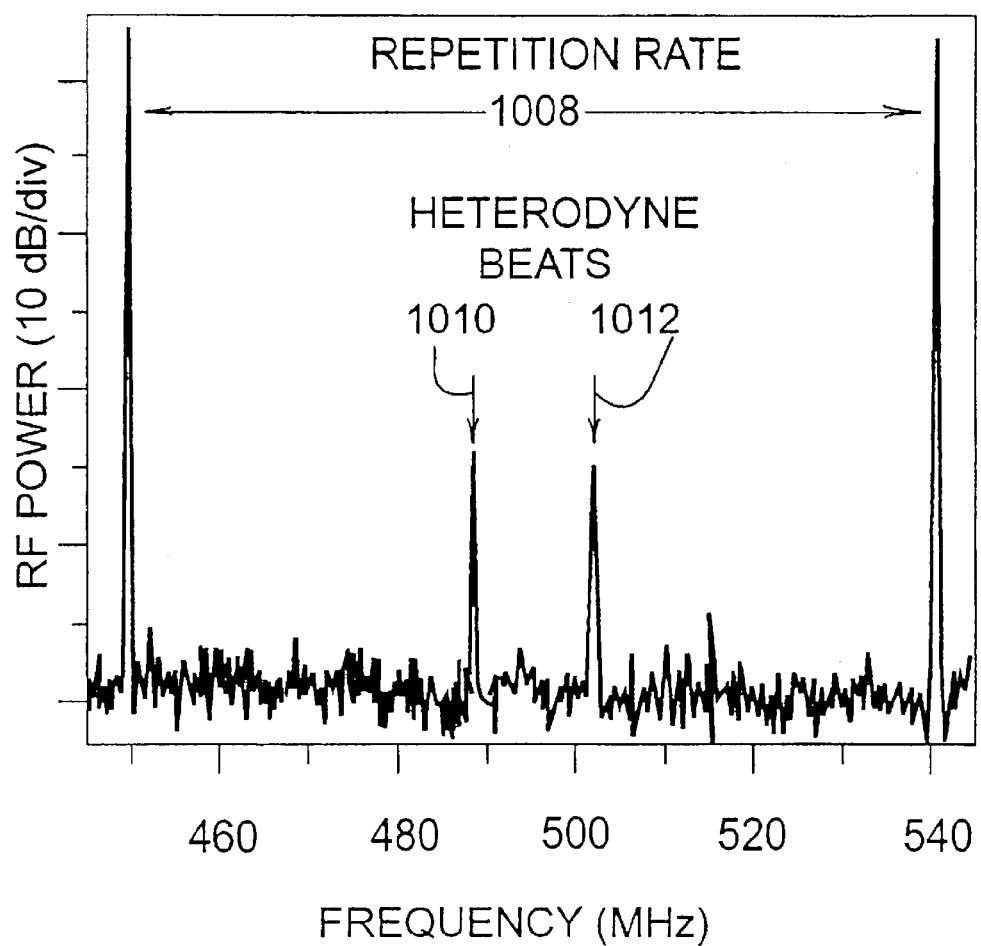

Optical Frequency Measurements Using Mode-locked Lasers. Optical frequency measurements are typically made to determine the absolute optical frequency of an atomic, molecular or ionic transition. Typically, a single frequency laser is locked to an isolated transition, which may be among a rich manifold of transitions, and then the frequency of the single frequency laser is measured. Mode-locked lasers are typically employed in the measurement of the frequency of the single frequency laser. This is performed by heterodyning the single frequency laser 1000 against nearby optical comb lines 1002 of the mode-locked laser as shown in FIG. 10A. The resulting heterodyne RF signal 1010 and 1012 that is shown in FIG. 10C contains beats at frequencies $f_b = |f_1 - nf_{rep} - \delta|$ where $f_1$ is the frequency of the single frequency laser 1000, $f_{rep}$ 1004 the repetition rate of the ML laser, n an integer and $\delta$ 1006 is the offset frequency of the ML laser (see previous section). This yields, in the rf output of a photodetector, a pair of beats within every RF frequency interval between m $f_{rep}$ and (m+1) $f_{rep}$. One member of the pair arises from comb lines with n $f_{rep} > f_1$ and the other from lines with n $f_{rep} < f_1$. Both, the beat frequencies and $f_{rep}$, can be easily measured with standard RF equipment. Typically, $f_{rep}$ itself is not measured, but rather one of its harmonics ($10^{th}$ to $100^{th}$ harmonic), to yield a more accurate measurement in a given measurement time as the measurement phase uncertainty is divided by the harmonic number. To map from these beat frequency measurements to the optical frequency $f_1$, we need to know n and $\delta$. Since n is an integer, it can be estimated using previous knowledge about $f_1$ to within $\pm f_{rep}/4$. Typically $f_{rep}$ is greater than 80 MHz, putting this requirement easily in the range of commercially available wavemeters, which have an accuracy of ~25 MHz. Thus, measurement of $\delta$ is the remaining problem. This can be done by comparison of the comb to an intermediate optical frequency standard, which is discussed below, or directly from the microwave cesium standard described herein. Several such techniques for direct links between microwave and optical frequencies are described in this patent.

1. Locking Techniques. Although measurement of $f_{rep}$ and $\delta$ are in principle sufficient to determine an absolute optical frequency, it is generally preferable to use the measurements in a feedback loop to actively stabilize or lock one or both of them to suitable values. If this is not done, then they must be measured simultaneously with each other and with $f_b$ to obtain meaningful results. The physical quantities in the laser that determine $f_{rep}$ and $\delta$ are described above. The technical details of adjusting these physical quantities are described below.

The cavity length is a key parameter for locking the comb spectrum. It is useful to examine a specific example of the sensitivity to the length. Consider a laser with a repetition rate of 100 MHz and a central wavelength of 790 nm (~380

THz). The repetition rate corresponds to a cavity length of 1.5 m which is 3.8 million wavelengths long (roundtrip). A length decrease of $\lambda/2$ gives an optical frequency shift of exactly one order, +100 MHz, for all of the optical frequency components. The corresponding shift of the 100 MHz repetition rate is (100 MHz)/(380 THz)=+2.63×10$^{-7}$ fractionally or +26.31 Hz. Since the cavity length is most sensitive to environmental perturbations in both fast (vibrations) and slow (temperature) timescales, good control of it warrants close attention. Furthermore, length variations have a much larger effect on the optical frequency of a given comb line than on the repetition rate.

a. Comb Spacing. The comb spacing is given by $f_{rep}=1/t_g=v_g/l_c$, where $v_g$ is the round trip group velocity and $l_c$ is the cavity length. The simplest way of locking $f_{rep}$ is by adjusting $l_c$. Mounting either end mirror in the laser cavity on a translating piezo-electric actuator as shown in FIG. 5 easily does this. The actuator is typically driven by a phase-locked loop that compares $f_{rep}$ or one of its harmonics to an external clock. For an environmentally isolated laser, the short time jitter in $f_{rep}$ is lower than most electronic oscillators, although $f_{rep}$ drifts over long times. Thus the locking circuit needs to be carefully designed for a sufficiently small bandwidth so that $f_{rep}$ does not have fast noise added while its slow drift is being eliminated.

Locking the comb spacing alone is sufficient for measurements that are not sensitive to the comb position such as measurement of the frequency difference between two lasers ($f_{L1}$ and $f_{L2}$). For example, suppose both frequencies of $f_{L1}$ and $f_{L2}$ are either higher or lower than their respective beating comb line. The difference of these two beats is taken using a double-balanced mixer and the resulting difference frequency is $f_s=f_{L1}-n\,f_{rep}-\delta-(f_{L2}-m\,f_{rep}-\delta)=(f_{L1}-f_{L2})-(m-n)f_{rep}$. Where n $f_{rep}+\delta<f_{L1}$ and m $f_{rep}+\delta>f_{L2}$, a minus sign arises due to the absolute value in determining the beat frequencies (see expression for $f_b$ above). If $f_{L1}$ and $f_{L2}$ are known with accuracy better than $f_{rep}/2$, then (m−n) can be determined and hence $f_{L1}-f_{L2}$ from $f_s$.

b. Comb Position. The frequency of a given comb line is given by $f_n=n\,f_{rep}+\delta$, where n is a large integer. Hence, simply changing the cavity length can control the frequency of comb lines. However, this also changes the comb spacing, which is undesirable if a measurement spans a large number of comb lines. Controlling $\delta$ instead of $f_{rep}$ allows a rigid shift of the comb positions, i.e. the frequency of all the lines can be changed without changing the spacing.

The comb position depends on the phase delay, $t_g$, and the group delay, $t_p$. Each delay in turn depends on the cavity length. In addition, the comb position depends on the "carrier" frequency, which is determined by the lasing spectrum. To obtain independent control of both the comb spacing and position, an additional parameter, besides the cavity length, must be adjusted.

A small rotation about a vertical axis (swivel) of the end mirror of the laser in the arm that contains the prisms produces a controllable group delay as disclosed in FIG. 5. This is because the different spectral components are spread out spatially across the mirror. The dispersion in the prisms results in a linear relationship between the spatial coordinate and wavelength. Hence, the mirror swivel provides a linear phase with frequency, which is equivalent to a group delay. [See K. F. Kwong, D. Yankelevich, K. C. Chu, J. P. Heritage, and A. Dienes, Opt. Lett. 18, 558–560 (1993)]. The group delay depends linearly on angle for small angles. If the pivot point for the mirror corresponds to the carrier frequency, then the effective cavity length does not change. The angle by which the mirror is swiveled is very small, approximately $10^{-4}$ rad. If we assume that swiveling the mirror only changes the group delay by an amount $\alpha\theta$, where $\theta$ is the angle of the mirror and $\alpha$ is a constant that depends on the spatial dispersion on the mirror and has units of s/rad, then we rewrite $$f_{rep} = \frac{1}{\frac{l_c}{v_g}+\alpha\theta}; \delta = \frac{\omega_c}{2\pi}\left(1 - \frac{\frac{l_c}{v_p}}{\frac{l_c}{v_g}+\alpha\theta}\right).$$

From these equations we can derive how the comb frequencies depend on the control parameters, $I_c$ and $\theta$. To do so we will need the total differentials $$df_{rep} = \frac{\partial f_{rep}}{\partial\theta}d\theta + \frac{\partial f_{rep}}{\partial l_c}dl_c$$

$$= -\frac{\alpha}{\left(\frac{l_c}{v_g}+\alpha\theta\right)^2}d\theta - \frac{\frac{1}{v_g}}{\left(\frac{l_c}{v_g}+\alpha\theta\right)^2}dl_c$$

$$\cong -\alpha\frac{v_g^2}{l_c^2}d\theta - \frac{v_g}{l_c^2}dl_c$$

$$d\delta = \frac{\omega_c}{2\pi}\frac{l_c\alpha}{v_p}\frac{1}{\left(\frac{l_c}{v_g}+\alpha\theta\right)^2}d\theta - \frac{\omega_c}{2\pi}\frac{\frac{\alpha\theta}{v_p}}{\left(\frac{l_c}{v_g}+\alpha\theta\right)^2}dl_c$$

$$\cong \frac{\omega_c}{2\pi}\frac{v_g^2\alpha}{v_p l_c}d\theta$$

where the final expressions are in the approximation that $$\alpha\theta \ll \frac{l_c}{v_g}.$$

From this, we see that $\delta$ is controlled solely by $\theta$. The concomitant change in $f_{rep}$ can be compensated by changes in the cavity length.

Figure 11C:
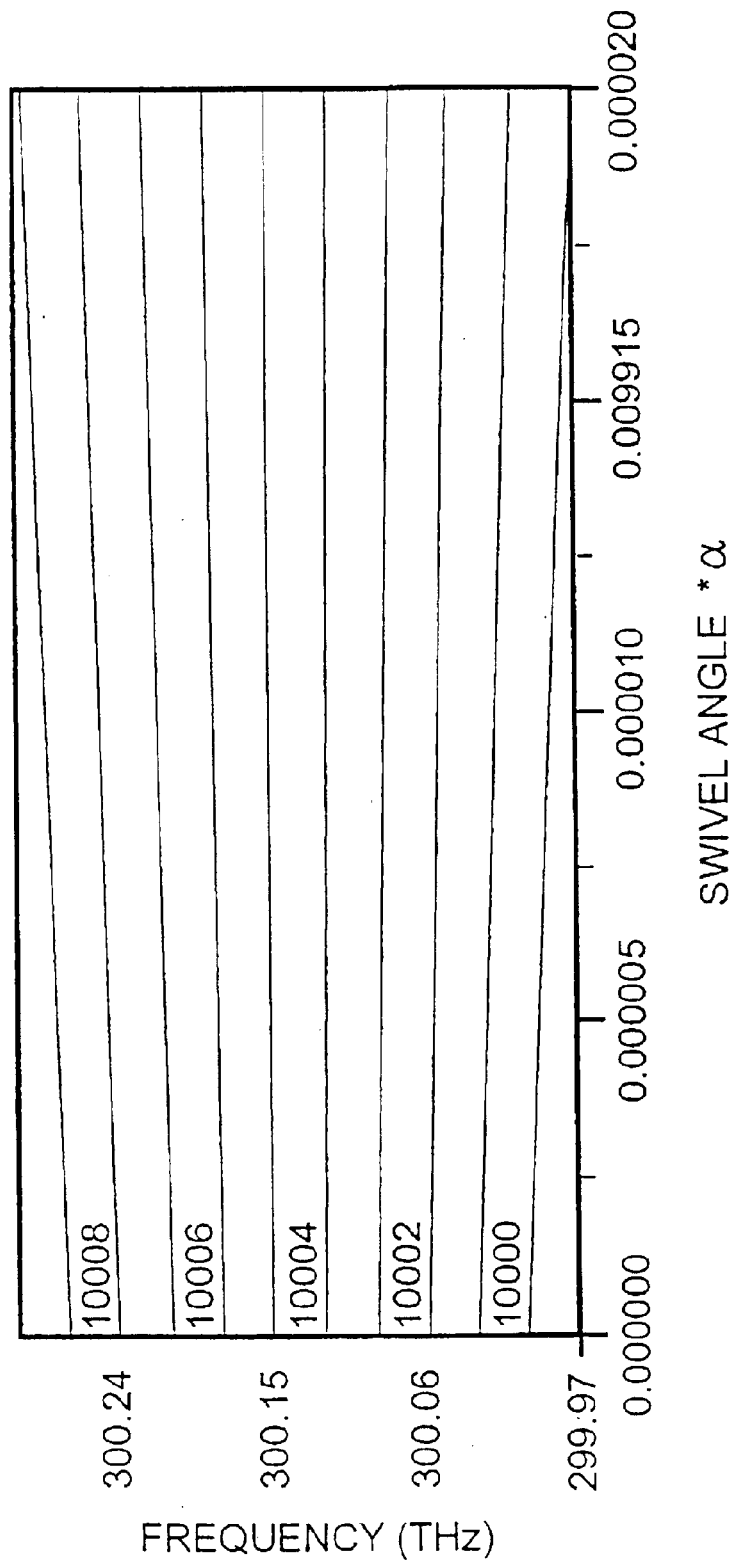

Physically, these relationships can be understood by considering how the optical frequencies of individual modes depend on the length and swivel angle. This is shown schematically in FIGS. 11A, 11B and 11C for an example of a 1 cm long cavity. From the upper part it is clear that the dominant effect of changing the cavity length is the position change of each optical mode, the repetition rate (spacing between modes) changes much less, by a ratio of the repetition rate/optical frequency. Thus the change in the repetition rate is only apparent for larger changes in the length as is apparent by comparing FIGS. 11A and 11B. This is because repetition rate is multiplied up by the mode number to reach the optical frequency. Swiveling the mirror does not change the frequency of the mode at the pivot point as is apparent from mode 10005 of FIG. 11, but causes the adjacent modes to move in opposite directions. This can be understood in terms of a frequency dependent cavity length, in this example it increases for decreasing frequencies.

c. Comb Position and Spacing. It is often desirable to simultaneously control/lock both the comb position and spacing, or an equivalent set of parameters, say the position of two comb lines. In an ideal situation, orthogonal control of $f_{rep}$ and $\delta$ may be desirable to allow the servo loops to operate independently. If this cannot be achieved one servo loop will have to correct for changes made by the other. This is not a problem if they have very different response speeds. If the responses are similar, interaction between loops can lend to problems, including oscillation. If necessary, orthogonalization can be achieved by either mechanical design in some cases, or by electronic means in all cases.

Note that it was earlier assumed that the pivot point of the tilting mirror corresponds to the carrier frequency. This is overly restrictive, as moving the pivot point will give an additional parameter that can be adjusted to help orthogonalize the parameters of interest. The treatment can be generalized to include an adjustable pivot point by allowing $l_c$ to depend on $\theta$. The resulting analysis shows that it is impossible to orthogonalize $\delta$ and $f_{rep}$ by simple choice of the pivot point. Further examination of FIG. 11C makes it clear why this must be so. The comb line at (or near) the pivot point does not change its frequency when the swivel angle changes. This is inconsistent with being able to control $\delta$ while holding $f_{rep}$ constant, which is equivalent to a rigid shift of all of the comb lines (none are constant, therefore there can be no pivot point).

Although $\delta$ and $f_{rep}$ cannot be orthogonalized by choosing a pivot, the analysis does show how to do so by electrical means. The length of the cavity merely needs to be made proportional to the swivel angle. This can be implemented electronically and amounts to inverting the linear matrix equation connecting $d\delta$ and $d\,f_{rep}$ to $d\theta$ and $dl_c$. An electronic remedy also addresses the practical issue that experimental error signals generated to control the comb often contain a mixture of two degrees of freedom. For example, the two error signals can correspond to the position of a single comb line (usually with respect to a nearby single frequency laser) and the comb spacing. A more interesting situation is when the error signals correspond to the position of two comb lines. Typically, this will be obtained by beating a comb line on the low frequency side of the spectrum with a single frequency laser and a comb line on the high frequency side with the second harmonic of the single frequency laser. In both of these cases, the error signals contain a mixture of $\delta$ and $f_{rep}$, which in turn are determined by a mixture of the control parameters $l_c$ and $\theta$.

As will be evident below, having a pair of error signals that correspond to the positions of two comb lines is the most interesting. [See J. Ye, J. L. Hall, and S. A. Diddams, Opt. Lett. 25, 1675 (2000)]. This is obtained by beating the two comb lines against two single frequency lasers with frequencies $f_{L1}$ and $f_{L2}$. The beat frequencies are given by $f_{bl}=f_{L1}-(n_l f_{rep}+\delta)$ with $l=1,2$ (for clarity we have assumed that $f_{L1}$ is above the nearest comb line with index $n_l$). Taking the differentials of these equations and inverting the result we obtain $$d f_{rep} = \frac{df_{b1} - df_{b2}}{n_2 - n_1} \rightarrow \frac{1}{n}(df_{b1} - df_{b2})$$

$$d\delta = \frac{\frac{n_1}{n_2}df_{b2} - df_{b1}}{1 - \frac{n_1}{n_2}} \rightarrow df_{b2} - 2df_{b1}$$

where the expressions after the arrows are for $f_{b2}=2f_{b1}$, i.e. we are using the fundamental and second harmonic of a single laser with n being the index of the laser comb mode just below the fundamental frequency of the external laser. These equations can be combined with those connecting $d\delta$ and $d\,f_{rep}$ to $d\theta$ and $dl_c$ to obtain $$d\theta = \frac{2\pi v_p l_e}{\omega_c v_g^2 \alpha}(df_{b2} - 2df_{b1})$$

$$dl_e = -\frac{l_e^2}{v_g n}((1 - 2An)df_{b1} + (An - 1)df_{b2})$$

$$A = \frac{2\pi v_p}{\omega_c l_c}.$$

These equations directly connect the observables with the control parameters for this configuration (note that the product An is of order 1). Equations of a similar form have been derived without determining the values of the coefficients. [See J. Ye, J. L. Hall, and S. A. Diddams, Opt. Lett. 25, 1675 (2000)].

It is desirable to design an electronic orthogonalization circuit that is completely general. Although expressions indicate what the coefficients connecting the observables and control parameters should be, typically the values of all of the parameters that appear in the coefficients are not known. Furthermore, there may be technical factors that cause unwanted mixing of the control parameters or error signals that must be compensated. Such a coupling arises, for example, because the two transducers have differing frequency response bandwidths. Finally, a general circuit can readily be adapted to experimental configurations other than the one discussed in detail above.

The electronic implementation depends on the actuator mechanisms. We employed a piezoelectric transducer (PZT) tube where an application of a transverse (between the inside and outside of the tube) voltage results in a change of the tube length. By utilizing a split outer electrode, the PZT tube can be made to bend in proportion to the voltage difference between the two outer electrodes. The common mode voltage, or the voltage applied to the inner electrode causes the PZT to change its length, which is designated as "piston" mode. Mounting the end mirror of the laser cavity on one end of the PZT tube, allows it to be both translated and swiveled, which correspond to changing the cavity length ($l_c$) and the mirror angle ($\theta$).

Figure 12:
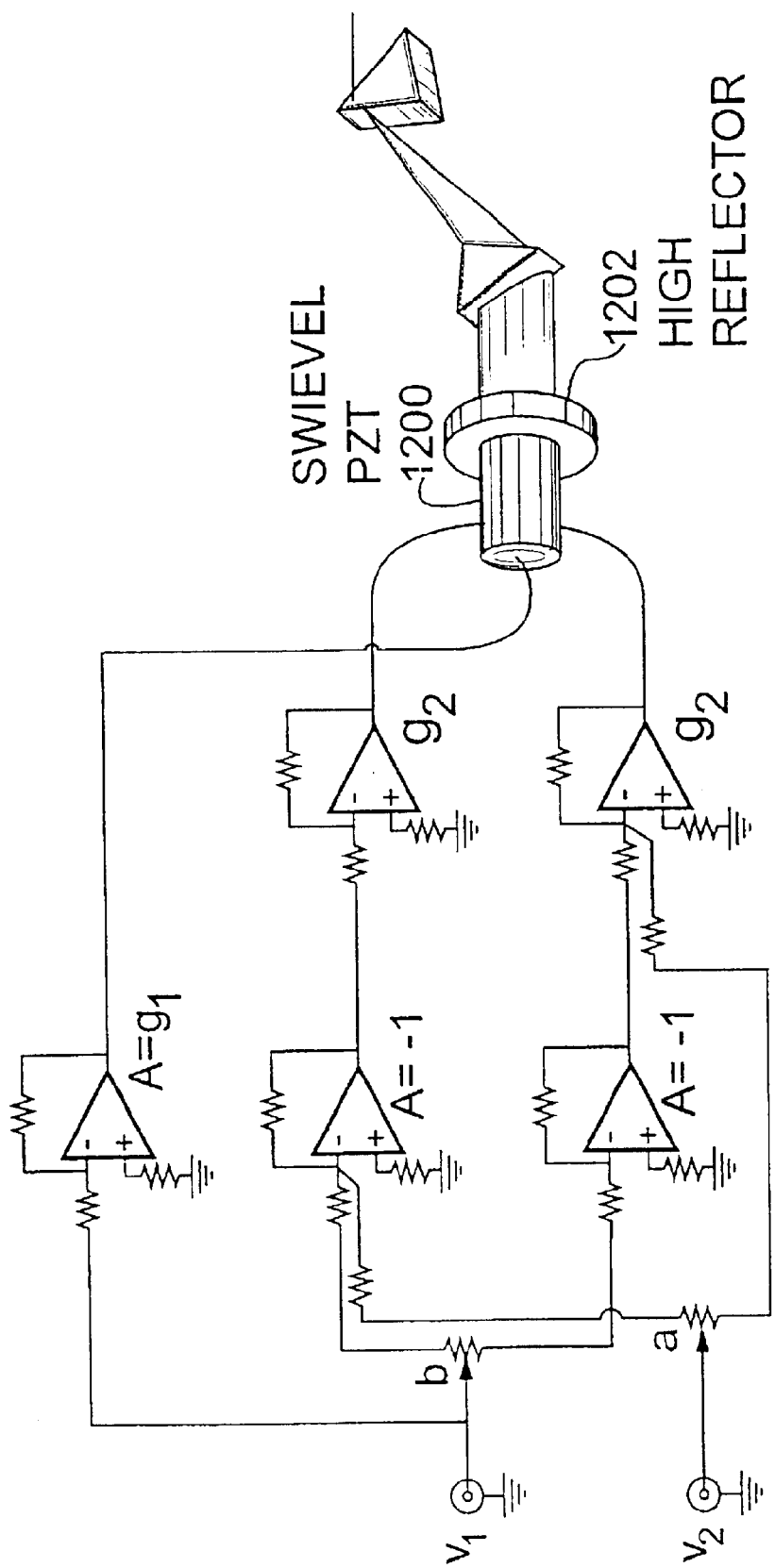
FIG. 12 is a schematic circuit diagram of a circuit that actuates a length-swivel PZT based on two error signal inputs ($V_1$ and $V_2$).

The circuit shown in FIG. 12 allows a mixture of two error inputs to be applied to both the piston and swivel modes 1200 of the mirror 1202. The coefficients a and b are adjusted via the potentiometers where the neutral midpoints correspond to a=b=0 and more generally $$a, b \propto \frac{R_{up} - R_{low}}{R_{up} + R_{low}}$$

where $R_1$ represents the resistance above or below the feedpoint. The gains of the amplifiers, $g_1$ and $g_2$, provide additional degrees of freedom. The length and swivel angle are related to the input voltages by $$l_c \propto g_1 V_1 + g_2 V_1 - g_2 a V_2$$
$$\theta \propto 2g_2(bV_1 + V_2) \quad -1 < a, b < 1.$$

Thus if a=b=0, then $l_c$ only responds to $V_1$ and $\theta$ only responds to $V_2$. By adjusting a, $l_c$ can be made to also respond to $V_2$, with either sign. Similarly for b and $V_1$.

d. Other Control Mechanisms. In addition to tilting the mirror after the prism sequences, the difference between the group and phase delays can also be adjusted by changing the amount of glass in the cavity [L. Xu, C. Spielmann, A. Poppe, T. Brabec, F. Krausz, and T. W. Hänsch, Opt. Lett. 21, 2008–2010 (1996)] or adjusting the pump power. [See L.

Xu, C. Spielmann, A. Poppe, T. Brabec, F. Krausz, and T. W. Hänsch, Opt. Lett. 21, 2008–2010 (1996); R. Holzwarth, T. Udem, T. W. Hänsch, J. C. Knight, W. J. Wadsworth, and P. S. J. Russell, Phys. Rev. Lett. 85, 2264–2267 (2000)].

The amount of glass can be changed by moving a prism or introducing glass wedges. Changing the amount of glass changes the difference between group delay and phase delay due to the dispersion in the glass. It has the disadvantage of also changing the effective cavity length. Furthermore, rapid response time in a servo loop cannot be achieved because of the limitation of mechanical action on the relatively high mass of the glass prism or wedge.

Changing the pump power changes the power of the intracavity pulse. This has empirically been shown to change the pulse-to-pulse phase. [See. L. Xu, C. Spielmann, A. Poppe, T. Brabec, F. Krausz, and T. W. Hänsch, Opt. Lett. 21, 2008–2010 (1996)]. Intuitively, it might be expected that this would lead to a change in the nonlinear phase shift experienced by the pulses as they traverse the crystal. However, a careful derivation shows that the group velocity also depends on the pulse intensity in such a way as to mostly cancel the phase shift. [See H. A. Haus and E. P. Ippen, submitted for publication, (2001)]. Thus it is not too surprising that the correlation between power and phase shift is the opposite of what is expected from this simple picture. [See L. Xu, C. Spielmann, A. Poppe, T. Brabec, F. Krausz, and T. W. Hänsch, Opt. Lett. 21, 2008–2010 (1996)]. The phase shift is attributed to the shifting of the spectrum that accompanies changing the power. This will yield a changing group delay due to group velocity dispersion in the cavity. Such an effect is similar to the control of θ. Nevertheless, it is possible to achieve very tight locking due to the much larger servo bandwidth afforded by an optical modulator, as compared to physically moving an optical element. [See R. Holzwarth, T. Udem, T. W. Hänsch, J. C. Knight, W. J. Wadsworth, and P. S. J. Russell, Phys. Rev. Lett. 85, 2264–2267 (2000)]. Although the servo loop is stabilizing the frequency spectrum of the mode-locked laser, it also reduces amplitude noise, presumably because amplitude noise is converted to phase noise by nonlinear processes in the laser. More work is needed to fully understand the mechanism and exploit it for control of the comb.

The offset frequency of the comb can also be controlled externally to the laser cavity by using and acouto-optic modulator. This has been exploited to lock the comb to a reference cavity. [See R. J. Jones, J. C. Diels, J. Jasapara, and W. Rudolph, Opt. Commun. 175, 409–418 (2000)].

2. Direct Optical to Microwave Synthesis Using a Self Referenced Synthesizer. Direct optical synthesis from a microwave clock is possible using only a single mode-locked laser without an auxiliary single frequency laser. This is done by directly frequency doubling the long wavelength portion (near frequency f) of the octave-spanning spectrum and comparing to the short wavelength side (near frequency 2f). Thus it requires more power in the wings of the spectrum produced by the femtosecond laser than if an auxiliary single-frequency cw laser is used. However, the fact that many comb-lines contribute to the heterodyne signal means that a strong beat signal can be obtained even if the doubled light is weak.

A self referenced synthesizer was first demonstrated at JILA by Jones et al. [See D. J. Jones, S. A. Diddams, J. K. Ranka, A. Stentz, R. S. Windeler, J. L. Hall, and S. T. Cundiff, Science 288, 635–639 (2000)]. A diagram of the experiment is shown in FIGS. 13A and 13B.

Figure 13A:
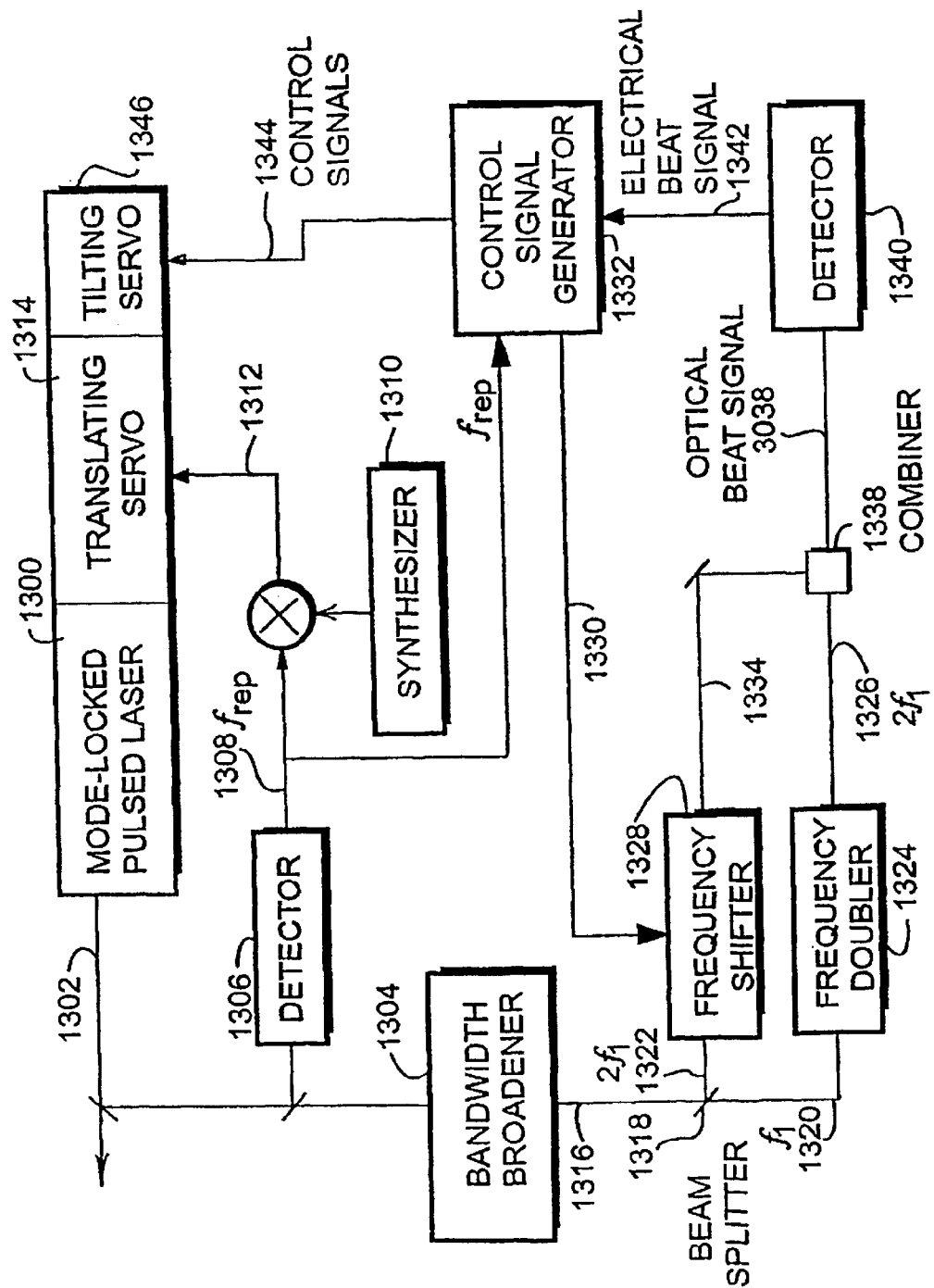
FIGS. 13A, 13B and 13C are schematic illustrations of implementations of the present invention.
Figure 13B:
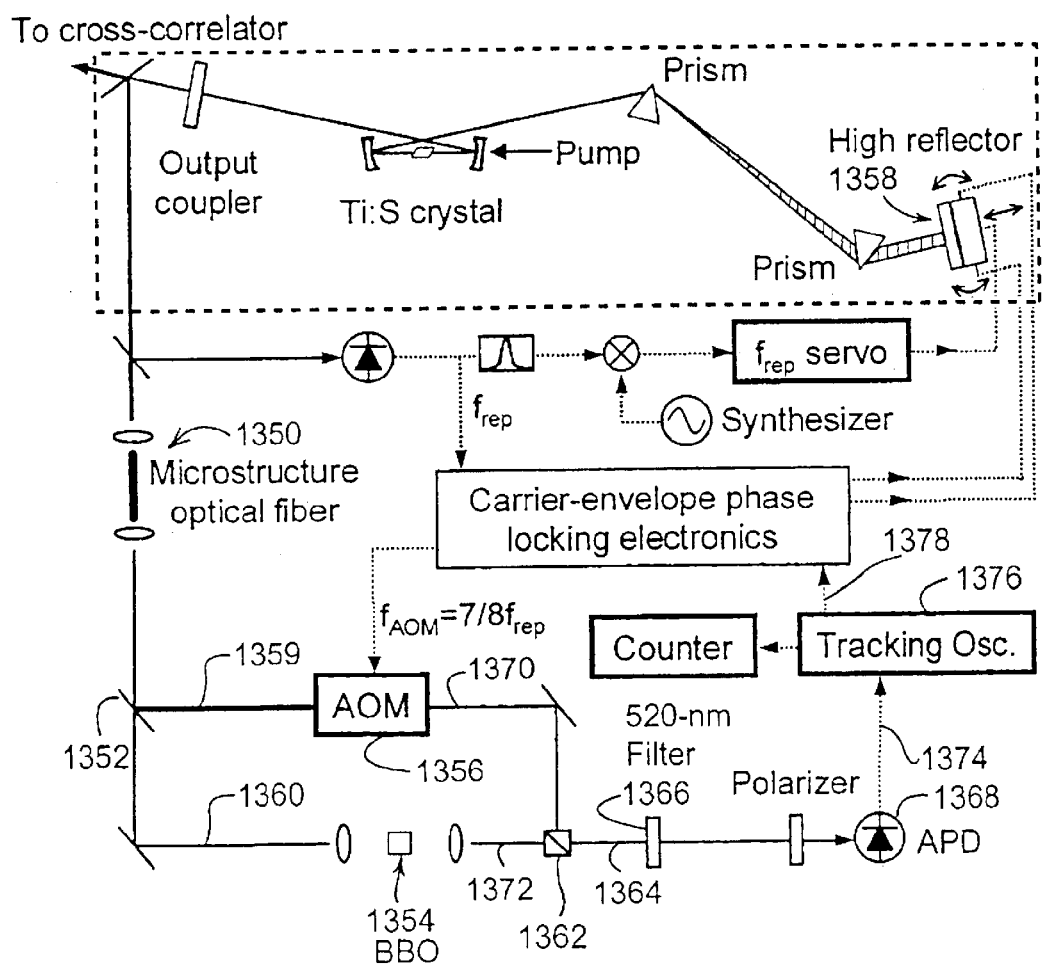

FIG. 13A is a schematic block diagram of a device for implementing the present invention. As shown in FIG. 13A, a pulsed laser 1300 may comprise a mode-locked pulsed laser that generates an output 1302 that produces pulses having a wide bandwidth and an envelope that is on the order of femtoseconds wide. The output 1302 is applied to a bandwidth broadener 1304 that further broadens the bandwidth of the mode-locked pulses. The bandwidth broadener 1304 may be eliminated if the output of the pulsed laser 1300 has a bandwidth that is sufficiently wide to cover at least one octave. Detector 1306 also detects the pulses of the output 1302 and generates an electrical output signal 1308 that is representative of the frequency of the repetition of the pulse envelope. A synthesizer 1310 is combined with the detector output 1308 to produce a control signal 1312 that is applied to the translating servo 1314 that translates at least one of the mirrors in the mode-locked pulse laser 1300 to control the overall length of the optical cavity of the pulsed mode-lock laser 1300. The broadened optical output signal 1316 from the bandwidth broadener 1304 is applied to a beam splitter 1318 that splits the optical signal 1316 into a first frequency output signal 1320 having a first frequency $f_1$ and a second frequency output signal 1322 having a second frequency $f_2$ which is twice the frequency of the first frequency output signal. The first frequency output signal 1320 is applied to a frequency doubler 1324 that doubles the frequency of the first output signal to produce a frequency doubled first output 1326. Frequency shifter 1328 shifts the frequency of the second frequency output signal by a predetermined amount under the control of control signal 1330 produced by control signal generator 1332 to produce a second frequency shifted output signal 1334. Optical combiner 1336 combines the frequency doubled first output signal 1326 and the second frequency shifted output signal 1334 to produce a beat frequency signal 1338. Detector 1340 detects the optical beat frequency signal 1338 and produces an electronic beat frequency signal 1342 that is applied to the control signal generator 1332. The control signal generator 1332 generates control signals 1330 and 1344. As indicated above, control signal 1330 causes the second frequency output signal 1322 to be shifted by a predetermined amount under the control of control signal 1330. As disclosed below, the amount that the second frequency output signal 1322 is shifted an integer fraction of the repetition frequency 1308. This is done so that the phase of the carrier signal and the envelope can be adjusted so that δ can be made to be equal to zero. Control signal generator 1332 also generates control signals 1344 as indicated below to drive the tilting servo 1346. The tilting servo 1346 functions to adjust the speed of the envelope relative to the carrier signal in the laser cavity by modifying the spatially dispersed spectrum that is produced by prisms located within the laser cavity of the pulsed mode laser 1300.

The frequency of the electrical signal 1342, $f_{ele}$, produced by the detector 1340 results from the heterodyne difference between the two optical signals 1326 and 1334. This produces a series of signals with frequencies such as $f_{ele}=f_{1334}-f_{1326}=m_1 f_{rep}+\delta+f_{shift}-2(m_2 f_{rep}+\delta)=\delta+f_{shift}$, where the last step occurs because $m_1=2\,m_2$ for frequencies separated by an octave, $f_{shift}$ is the frequency of the shift imposed by the frequency shifter 1328. The other frequencies arise from the opposite ordering of the optical frequencies and $m_1$ and $2\,m_2$ differing by a small integer (i.e. not an exact octave). Thus the electrical signal contains the frequency δ, which is needed to determine the absolute optical frequency of all of the comb lines and the pulse-to-pulse carrier-envelope phase shift.

The octave-spanning spectrum can be obtained by external broadening in microstructure fiber as generally described below and shown in FIG. 13B. The output is spectrally separated using a dichroic mirror. The long wavelength portion is frequency doubled using a β-barium-borate crystal. Phase matching selects a portion of the spectrum near 1100 nm for doubling. The short wavelength portion of the spectrum is passed through an acoustic-optic modulator (AOM). The AOM shifts the frequencies of all of the comb lines. This allows the offset frequency, δ, to be locked to zero, which would not otherwise be possible due to degeneracy in the RF spectrum between the f-2f heterodyne beat signal and the repetition rate comb. The resulting heterodyne beat directly measures δ and is used in a servo loop to fix the value of δ. The repetition rate is also locked to a frequency synthesizer 1310 which in turn is referenced to an atomic clock. The end result is that the absolute frequencies of all of the comb lines are known with an accuracy limited only by the rf standard.

A more detailed discussion of the experimental implementation of the f-2f heterodyne system of the present invention with respect to FIG. 13B is given below. The continuum output by the microstructure fiber 1350 is spectrally separated into two arms by a dichroic beam splitter 1352. The visible portion of the continuum 1358 (500–900 nm, containing $f_{2n}$) is directed through one arm that contains an acousto-optic modulator 1356 (AOM). The near-infrared portion of the continuum 1360 (900–1100 nm, containing $f_n$) traverses the other arm of the apparatus, passing through a 4 mm thick β-Barium-Borate frequency-doubling crystal 1354. The crystal is angle-tuned to efficiently double at 1040 nm. The beams from the two arms are then mode-matched and recombined by combiner 1362. The combined beam 1364 is filtered with a 10-nm bandwidth interference filter 1366 centered at 520 nm and focused onto an avalanche photo diode 1368 (APD). Approximately 5 μW are incident on the APD 1368 from the arm 1370 containing the AOM, while the frequency doubling arm 1372 provides about 1 μW. The resulting RF beats 1374 are equal to $\pm(\delta - f_{AOM})$ where $f_{AOM}$ is the drive frequency of the AOM and is generated to be $7/8 f_{rep}$. The RF beats 1374 are then fed into a tracking oscillator 1376 that phase locks a voltage-controlled oscillator to the beat to enhance the signal to noise ratio by significantly reducing the noise bandwidth. From the tracking oscillator output 1378, an error signal is generated that is programmable to be $$\frac{m}{16} f_{rep},$$

thus allowing the relative carrier-envelope phase to be locked from 0 to 2 π in 16 steps of π/8 for m=0,1, . . . 15.

Figure 14A:
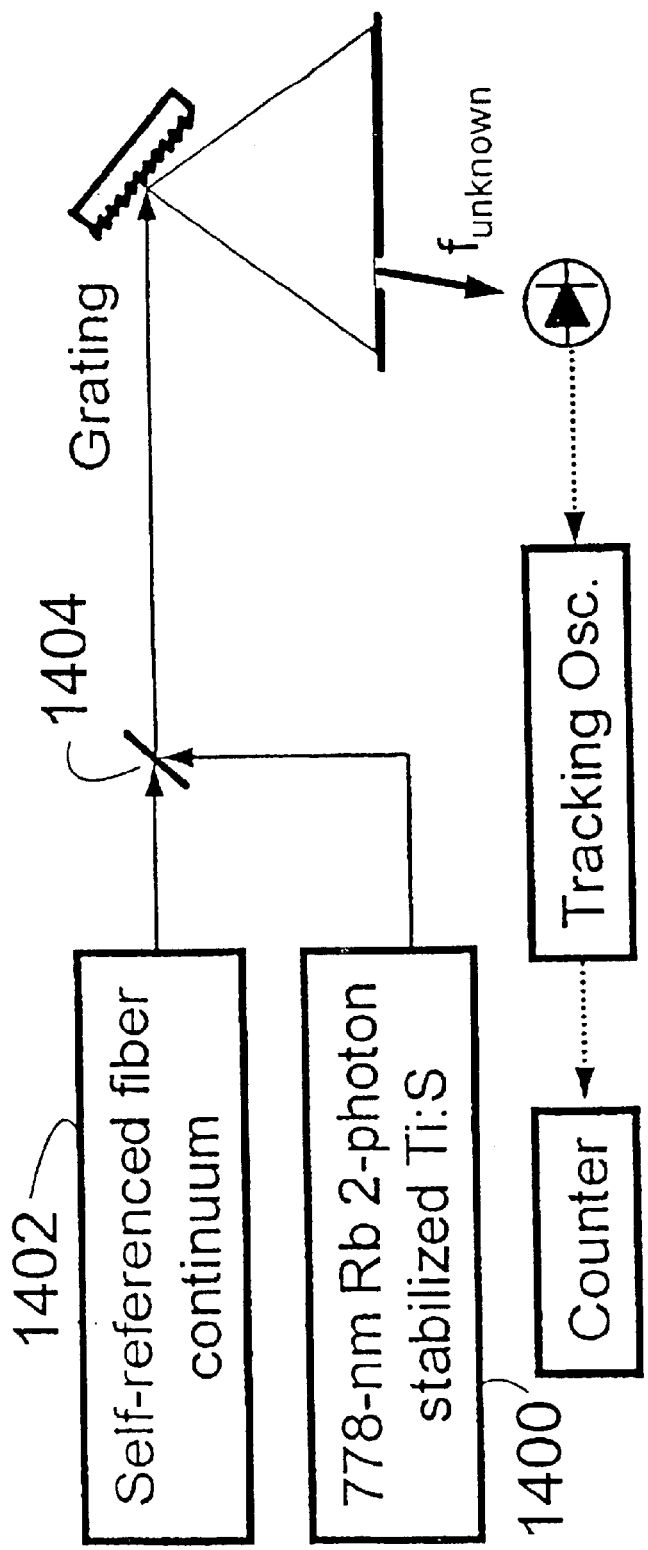
FIG. 14A is the experimental configuration illustrating a frequency measurement using a self referenced comb.
Figure 14B:
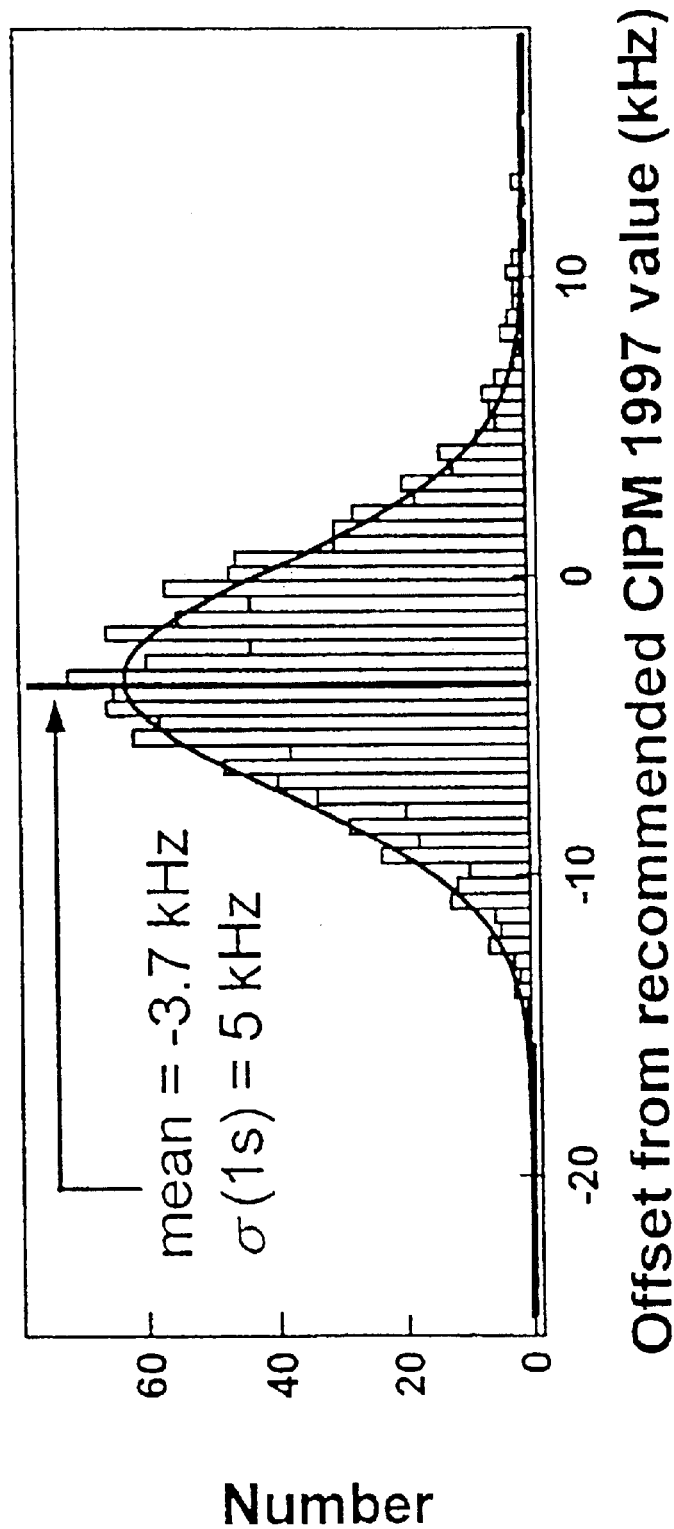
FIG. 14B illustrates the experimental results of the experiment illustrated in FIG. 14A.

The resulting comb was then used to measure the frequency of a 778 nm single frequency ti:sapphire laser 1400 that was locked to the $5S_{1/2}$ (F=3) $5D_{5/2}$ (F=5) two-photon transition in $^{85}$Rb. This was done by combining the comb of a self referenced fiber continuum 1402 with the single frequency laser using a 50–50 beam splitter 1404 as shown in FIG. 14A. A small portion of the spectrum near 778 nm is selected and the beat between the comb and the single frequency laser measured. A histogram of the measured frequencies is shown in FIG. 14B. Averaging over several days yielded a value of −4.2±1.3 kHZ from the CIPM recommended value.

As indicated above, the present invention uses a titanium-doped sapphire (Ti:S) laser (shown in FIG. 13B) that is pumped with a single frequency, frequency-doubled $Nd:YVO_4$ laser operating at 532 nm. The Ti:S laser generates a 90 MHz pulse train with pulse widths as short as 10 fs using Kerr lens mode-locking (KLM). [See M. T. Asaki et al., Opt. Lett. 18, 977 (1993)]. The output pulse spectrum is typically centered at 830 nm with a width of 70 nm. To generate a 10 fs pulse, the normal dispersion of the Ti:S crystal is compensated by incorporating a pair of fused silica prisms inside the cavity. [See R. L. Fork, O. E. Martinez, J. P. Gordon, Opt. Lett. 5, 150 (1984)]. It is important to note that after the second prism, the optical frequencies of the pulse are spatially resolved across the high-reflector mirror; this property will be utilized to stabilize the absolute frequency of the laser.

As also indicated above, the relative carrier-envelope phase (Δφ) in successive pulses generated by mode-locked lasers is not constant due to a difference between the group and phase velocities inside the cavity. As shown in FIG. 7, this is represented by the frequency offset, δ, of the frequency comb from $f_{n=0}=0$. Denoting the pulse repetition rate as $f_{rep}$, the relative phase is related to the offset frequency via $2\pi\delta = \Delta\phi f_{rep}$. Thus, by stabilizing both $f_{rep}$ and δ, Δφ can be controlled. Toward this end, as shown in FIG. 13B, the high-reflector mirror 1358 (behind the prism) is mounted on a piezo-electric transducer (PZT) tube that allows both tilt and translation. By comparing a high harmonic of the pulse repetition rate with the output of a high stability RF synthesizer, a feedback loop can lock the repetition rate, $f_{rep}$, by translating the mirror. Because the pulse spectrum is spatially dispersed across the mirror, tilting of this mirror provides a linear phase change with frequency (i.e., a group delay for the pulse), thereby controlling both the repetition rate and the offset frequency. [See J. Reichert, R. Holzwarth, Th. Udem. T. W. Hänsch, Opt. Commun. 172, 59 (1999)]. The maximum required tilt angle is $10^{-4}$ rad, substantially less than the beam divergence, so cavity misalignment is negligible.

To stabilize the offset frequency of a single mode-locked laser, without external information, it is useful to generate a full optical octave, although other methods and structures can be used that do not require a full octave, as explained herein. The typical spectral output generated by the Ti:S laser used in these experiments spans 70 nm or 30 THz, while the center frequency is approximately 350 THz, i.e., the spectrum spans much less than a full octave. Propagation through optical fiber is commonly used to broaden the spectrum of mode-locked lasers via the nonlinear process of self-phase modulation (SPM), based on the intrinsic intensity dependence of the refractive index (the Kerr effect). Optical fiber offers a small mode size and a relatively long interaction length, both of which enhance the width of the generated spectrum. However, chromatic dispersion in the optical fiber rapidly stretches the pulse duration, thereby lowering the peak power and limiting the amount of generated spectra. While zero dispersion optical fiber at 1300 nm and 1550 nm has existed for years, optical fiber that supports a single spatial mode and with zero dispersion near 800 nm has been available only in the last year. In this work we employ a recently developed air-silica microstructure fiber that has zero group velocity dispersion at 780 nm. [See J. Ranka, R. Windeler, A. Stentz, Opt. Lett. 25, 25 (2000)]. The sustained high intensity (hundreds of $GW/cm^2$) in the fiber generates a stable, phase coherent continuum that stretches from 510 to 1125 nm (at −20 dB) as shown in FIG. 9. Through four-wave mixing processes, the original spectral comb in the mode-locked pulse is transferred to the generated continuum. As described above, the offset frequency, δ, is obtained by taking the difference between $2f_n$ and $f_{2n}$. FIG. 13B details this process of frequency doubling $f_n$ in a nonlinear crystal and combining the doubled signal with $f_{2n}$ on a photo-detector. The resulting RF heterodyne beat is equal to δ. In actuality, the beat arises from a large family of comb lines, which greatly enhances the signal-to-noise ratio. After suitable processing (described below) this beat is used to actively tilt the high-reflector mirror, allowing us to stabilize δ to a rational fraction of the pulse repetition rate.

Figure 13C:
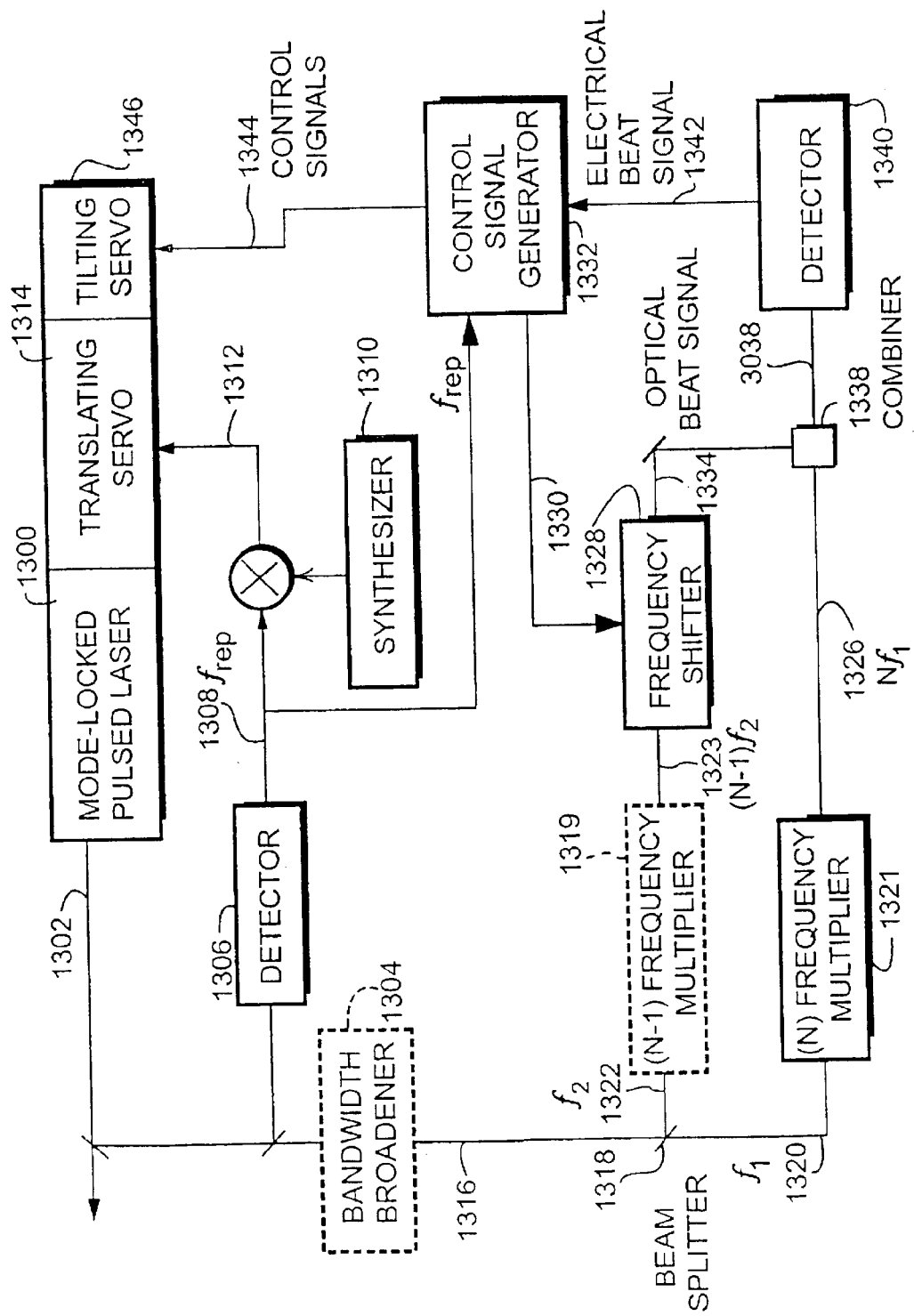

FIG. 13C is similar to FIG. 13A but further illustrates other methods that can be used to decrease the amount of optical bandwidth that is required from the mode-locked pulse laser 1300 in accordance with the present invention. As shown in FIG. 13C, the bandwidth broadener 1304 can be eliminated if sufficient bandwidth is provided by the mode-locked laser 1300. Only a portion of a full octave will be required of the optical signal 1316. As shown in FIG. 13C, the optical signal 1316 is divided by beam splitter 1318 into a first signal ($f_1$) 1320 and a second signal ($f_2$) 1322. The first signal ($f_1$) 1320 is applied to a frequency multiplier 1321. The frequency multiplier 1321 multiplies the first signal ($f_1$) 1320 by an integer value N not less than 2. The second frequency signal ($f_2$) 1322 is applied to a frequency multiplier 1319. The second frequency signal ($f_2$) 1322 is multiplied by an integer value N−1. The output 1323 of the frequency multiplier 1319 is (N−1)$f_2$. This output 1323 is then applied to the frequency shifter 1328. The process then proceeds in accordance with the description provided with respect to FIG. 13A. The output of the frequency multiplier 1321 is an output 1326 which is $Nf_1$. Well known electro optical materials can be used for the frequency multipliers 1319, 1321. An advantage of the device illustrated in FIG. 13C is that the device only requires a fraction of a full octave for optical signal 1316. This is because the ratio of the high frequency signal ($f_2$) 1322 to the low frequency signal ($f_1$) 1320 is (N−1)/N, which is less than a full octave.

As above, the frequencies of the electrical signal can be calculated. They is now given by $f_{ele}=f_{1334}-f_{1326}=(N-1)(m_1f_{rep}+\delta)+f_{shift}-N(m_2f_{rep}+\delta)=\delta+f_{shift}$, where the last step occurs because frequency $f_2$ 1322 is chosen such that $$f_2 \cong \frac{N-1}{N} f_1,$$

which means that $$m_2 = \frac{N-1}{N} m_1.$$

Again the electrical signal contains the frequency δ, which is needed to determine the absolute optical frequency of all of the comb lines and the pulse-to-pulse carrier-envelope phase shift.

Absolute Optical Frequency Metrology. In addition to applications in the time domain, the stabilized mode-locked laser system shown in FIGS. 13A and 13B has an immediate and revolutionary impact also in optical frequency metrology as explained above with respect to FIGS. 14A and 14B. As shown schematically in FIG. 7B, when both the $f_{rep}$ (comb spacing) and the offset frequency δ (comb position) are stabilized, lying underneath the broadband continuum envelope is a frequency comb with precisely defined intervals and known absolute frequencies. By stabilizing $f_{rep}$ in terms of the primary 9.193 GHz cesium standard, we can then use this frequency comb as a self-referenced "frequency ruler" to measure any optical frequency that falls within the bandwidth of the comb. With this technique, a direct link between the microwave and optical domains is now possible using a single stabilized fs laser.

To demonstrate this application, results are presented using this procedure to measure a continuous wave (CW) Ti:S laser operating at 778 nm and locked to the $5S_{1/2}$ (F=3) $5D_{5/2}$(F=5) two-photon transition in [85]Rb. The experimental setup is shown in FIG. 14A. A portion of the stabilized frequency comb is combined with the 778-nm stabilized Ti:S laser and spectrally resolved using a 1200 lines/mm grating. The heterodyne beat between the frequency comb and the CW stabilized Ti:S laser is measured using a PIN diode positioned behind a slit that passes ~1 nm of bandwidth about 778 nm. By counting both the offset frequency, δ, and the heterodyne beat signal between the CW Ti:S and the comb ($f_{beat}$), the unknown frequency is determined by $f_{unknown}=\pm\delta+nf_{rep}\pm f_{beat}$. The sign ambiguity of $f_{beat}$ arises because it is not known a priori whether the individual frequency comb member closest to the 778-nm laser is at a higher or lower frequency. A similar ambiguity exists for δ. As the 778-nm frequency is already known within much better than $f_{rep}/2$=45 MHz, $f_{unknown}$ is found by simply incrementing or decrementing n and using the appropriate sign of $f_{beat}$ and δ. FIG. 14B displays one set of measurement results relative to the CIPM (1997) recommended value of 385,285,142,378±5.0 kHz for the Rb transition. [See T. Quinn, Metrologia, 36, 211 (1999)]. The first demonstration of this technique was within the uncertainty of the CIPM (1997) value. The width of the Gaussian distribution leads one to suspect the measurement scatter is most likely due to phase noise in the Rb atomic clock used to stabilize the repetition rate of the laser. Only minimal environmental stabilization of the laser cavity was performed. With a higher quality reference clock, improved environmental isolation of the mode-locked laser cavity and higher bandwidth servo loops, lower amounts of scatter are expected, not only for data such as that presented in FIG. 14B, but also for time domain data presented below with respect to FIG. 15B.

The average of the frequency measurements over several days, giving −4.2±1.3 kHz from the CIPM (1997) value, agrees quite well with a previous measurement of the JILA rubidium 2-photon stabilized reference laser, in which an offset was measured of −3.2±3.0 kHz. In this previous work, the position of the broadened fs comb was not locked but rather the comb position was calibrated with the fundamental and second harmonic of a secondary, stabilized cw laser, which itself was measured with the octave-spanning comb.

These results demonstrate absolute optical frequency measurements with a single mode-locked laser. This technique represents an enormous simplification over conventional frequency metrology techniques including multiplier chains, and even other fs methods, described earlier. The tools described in this letter should make absolute optical frequency synthesis and measurement a common laboratory practice, instead of the heroic effort it has been heretofore.

Figure 17:
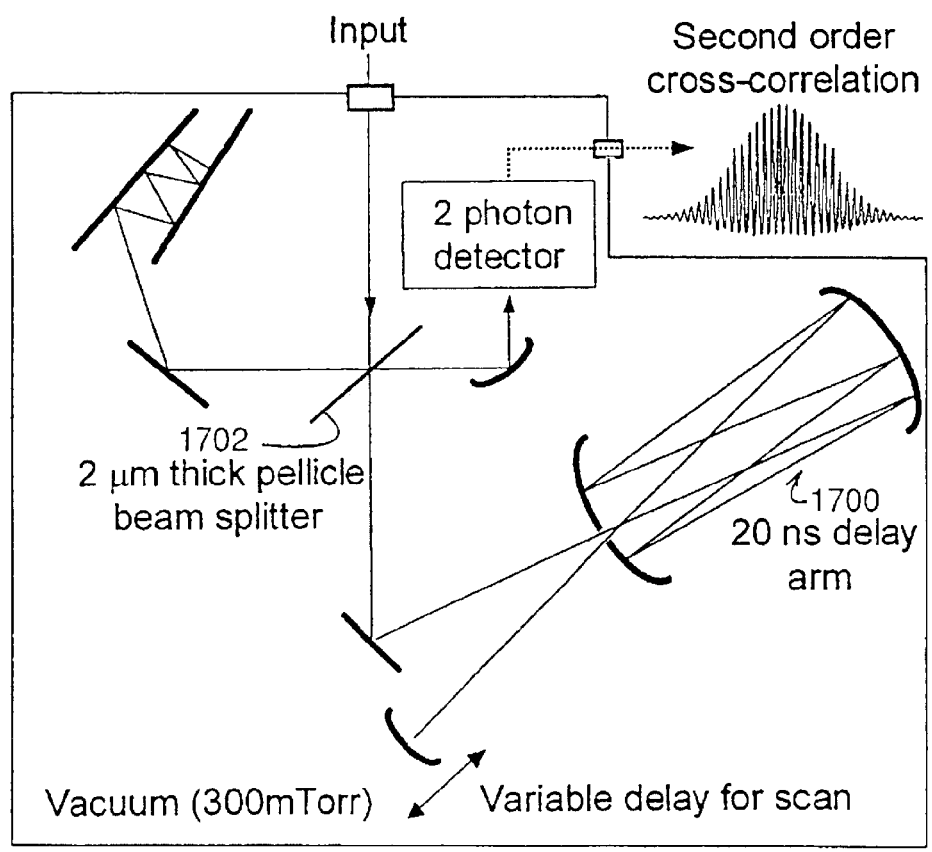
FIG. 17 is a schematic illustration of a cross correlator.

Temporal Cross-Correlation. Verification of control of Δφ in the time domain is obtained by interferometric cross correlation between two different, not necessarily adjacent, pulses in the pulse train. [See L. Xu, Ch. Spielmann, A. Poppe, T. Brabec, F. Krausz, T. W. Hänsch, Opt. Lett. 21, 2008 (1996)]. In fact, we performed a time-averaged cross-correlation between pulses i and i+2 using the correlator shown in FIG. 17. A multi-pass cell 1700 in one arm of the correlator is used to generate the required 20 ns delay. To minimize dispersion, the beam splitter 1702 is a 2 μm thick polymer pellicle with a thin gold coating. To obtain a well-formed interferogram, the mirror curvatures and their separations were chosen to mode-match the output from both arms. The entire correlator is in a vacuum chamber held below 300 m Torr to minimize the effect of the dispersion of air. The second order cross-correlation is measured using a two-photon technique [J. K. Ranka, A. L. Gaeta, A.

Baltuska, M. S. Pschenichnikov, D. A. Wiersma, Opt. Lett. 22, 1344 (1997)] by focusing the recombined beam with a spherical mirror onto a windowless GaAsP photo-diode. The band gap of GaAsP is large enough and the material purity high enough so that appreciable single photon absorption does not occur. This yields a pure quadratic intensity response with a very short effective temporal resolution.

Figure 15A:
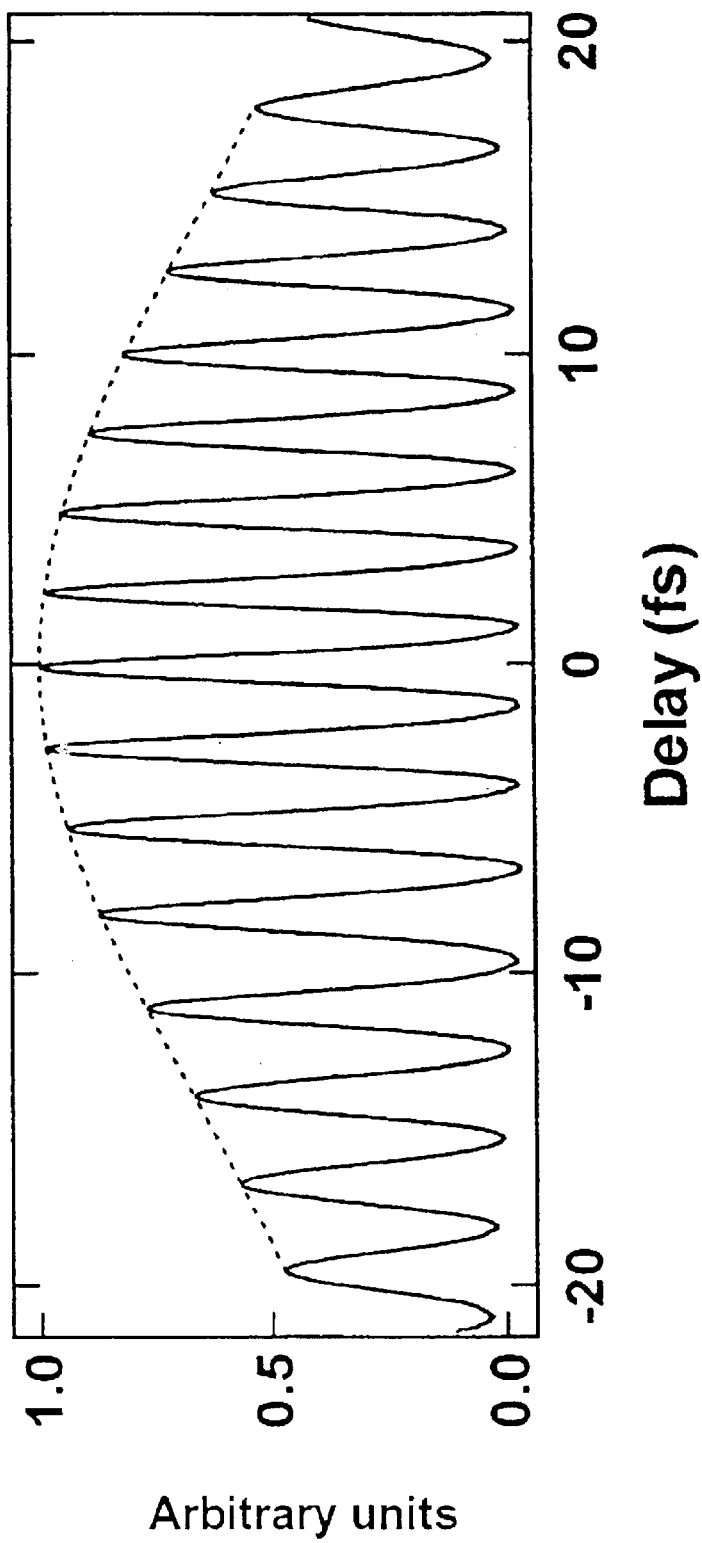
FIGS. 15A and 15B illustrate the results of a time domain cross correlation.

A typical cross correlation is shown in FIG. 15A. To determine $\Delta\phi$, the fringe peaks of the interferogram are fit to a correlation function assuming a Gaussian pulse envelope. From the fit parameters, the center of the envelope is determined and compared with the phase of the underlying fringes to find $\Delta\phi$. A fit of the fringe peaks assuming a hyperbolic secant envelope produced nearly identical results. A plot of the experimentally determined relative phases for various offset frequencies, along with a linear fit of the averaged data, is given in FIG. 15B. These results show a small offset of 0.7±0.35 rad from the theoretically expected relationship $\Delta\phi=4\pi\delta/f_{rep}$ (the extra factor of 2 results because the cross-correlator compares pulse i and i+2). The experimental slope is within 5% of the theoretically predicted value and clearly demonstrates our control of the relative carrier-envelope phase. Despite our extensive efforts to match the arms of the correlator, we attribute the phase offset between experiment and theory to a phase imbalance in the correlator. The number of mirror bounces in each arm is the same, and mirrors with the same coatings were used for 22 of the 23 bounces in each arm. Nevertheless, because of availability issues, there is a single bounce that is not matched. Furthermore, the large number of bounces necessary to generate the delay means that a very small phase difference per bounce can accumulate and become significant. In addition, the pellicle beam splitter will introduce a small phase error because of the different reflection interface for the two arms. Together, these effects can easily account for the observed offset. The group-phase dispersion due to the residual air only accounts for a phase error of $\sim\pi/100$. We believe this correlation approach represents the best measurement strategy that can be made short of demonstration of a physical process that is sensitive to the phase.

Figure 15B:
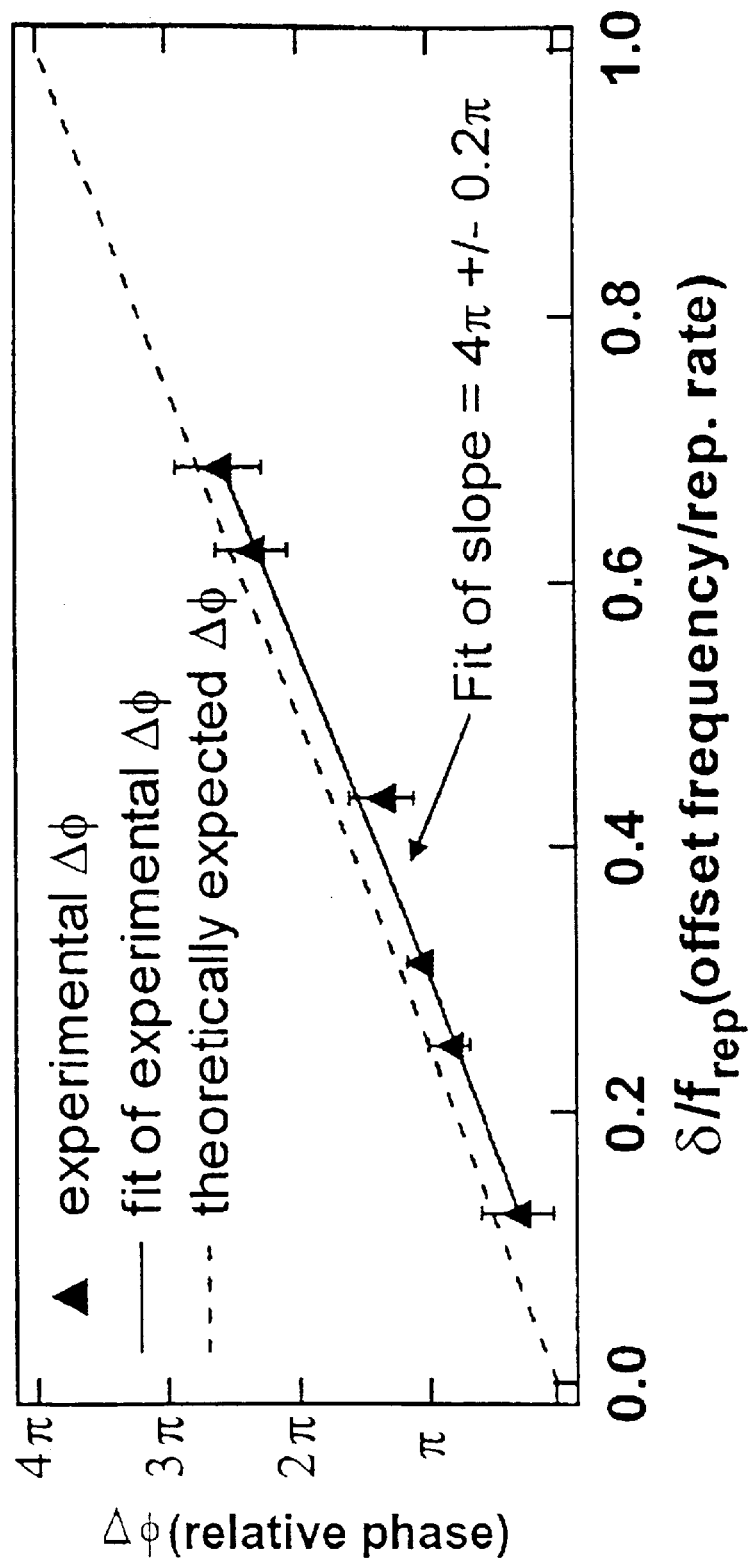

The uncertainty in the individual phase measurements shown in FIG. 15B apparently arises both from the cross-correlation measurement itself and from environmental perturbations of the laser cavity that are presently beyond the bandwidth of our stabilizing servo loops. Indeed a measurement in the frequency domain by counting a locked offset frequency $\delta=19$ MHz with 1-second gate time revealed a standard deviation of 143 Hz, corresponding to a relative phase uncertainty of 13.7 $\mu$rad. The correlator uses a shorter effective gate time, which decreases the averaging and hence increases the standard deviation. Nevertheless, the uncertainty in the time domain is $10^3$ to $10^4$ times larger than that in the frequency domain (see below), indicating that the correlator itself contributes to the measurement uncertainty.

With pulses generated by mode-locked lasers now approaching the single cycle regime [U. Morgner et al., Opt. Lett. 24, 411 (1999); D. H. Sutter et al., Opt. Lett 24, 631 (1999)], the control of the carrier-envelope relative phase that has been demonstrated in accordance with the present invention is expected to dramatically impact the field of extreme nonlinear optics. This includes above-threshold ionization and high harmonic generation/x-ray generation with intense femtosecond pulses. Above threshold ionization using circularly polarized light has recently been proposed as a technique for determining the absolute phase. [See D. Dietrich, F. Krausz, P. B. Corkum, Opt. Lett. 25, 16 (2000)]. Measurements of x-ray generation efficiency also show effects that are attributed to the evolution of the pulse-to-pulse phase. [See C. G. Durfee et al., Phys. Rev. Lett. 83, 2187 (1999)].

High Precision Atomic and Molecular Spectroscopy and Coherent Control. A phase stable femtosecond comb represents a major step towards ultimate control of light fields as a general laboratory tool. Many dramatic possibilities are ahead. For high resolution laser spectroscopy, the precision frequency comb provides a tremendous opportunity for improved measurement accuracy. For example in molecular spectroscopy, different electronic, vibrational, and rotational transitions can be studied simultaneously with phase coherent light of various wavelengths, leading to determination of molecular structure and dynamics with unprecedented precision. For sensitive absorption spectroscopy, multiple absorption or dispersion features can be mapped out efficiently with coherent multi-wavelength light sources. A phase-coherent wide-bandwidth optical comb can also induce the desired multi-path quantum interference effect for a resonantly enhanced two-photon transition rate. [See T. H. Yoon, A. Marian, J. L. Hall, and J. Ye, Phys. Rev. A 63, 011402 (2000)]. This effect can be understood equally well from the frequency domain analysis and the time domain Ramsey-type interference. The multi-pulse interference in the time domain gives an interesting variation and generalization of the two-pulse based temporal coherent control of the excited state wavepacket.

Figure 16A:
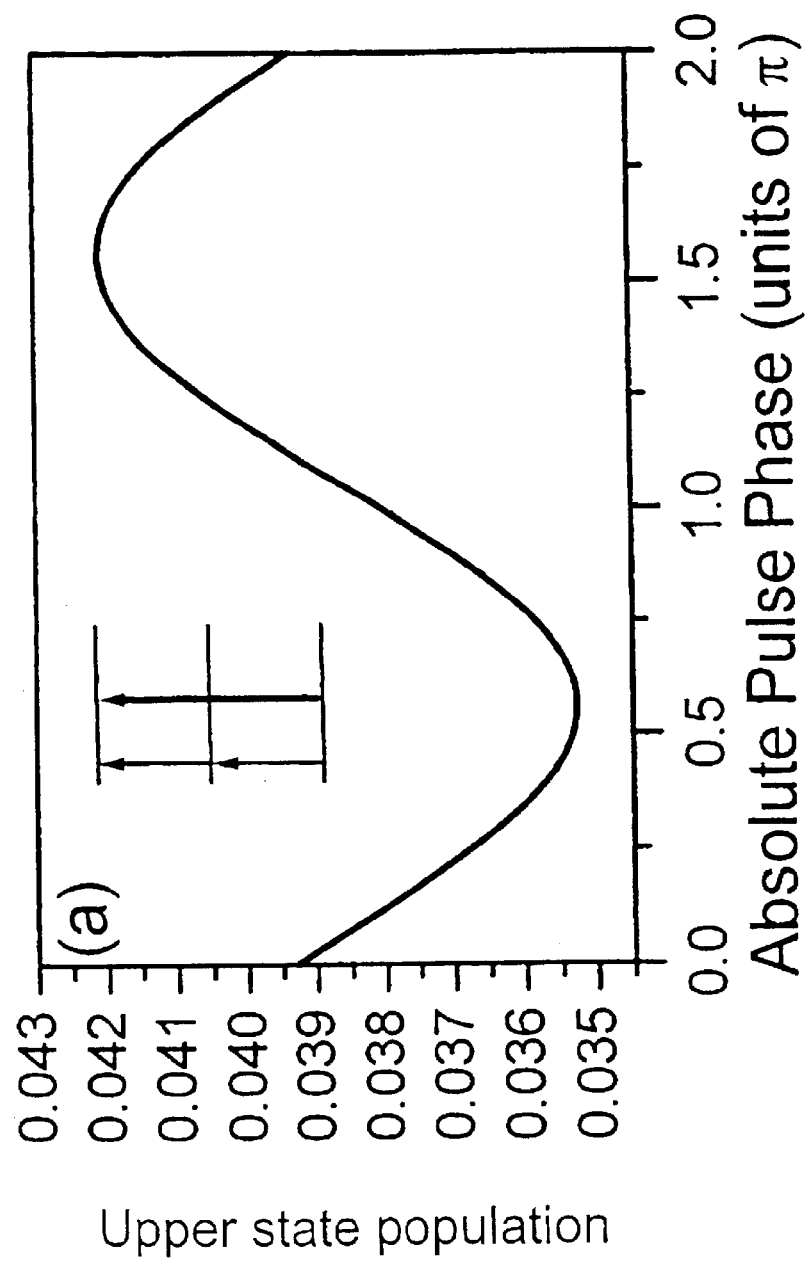
FIG. 16A illustrates phase dependence.
Figure 16B:
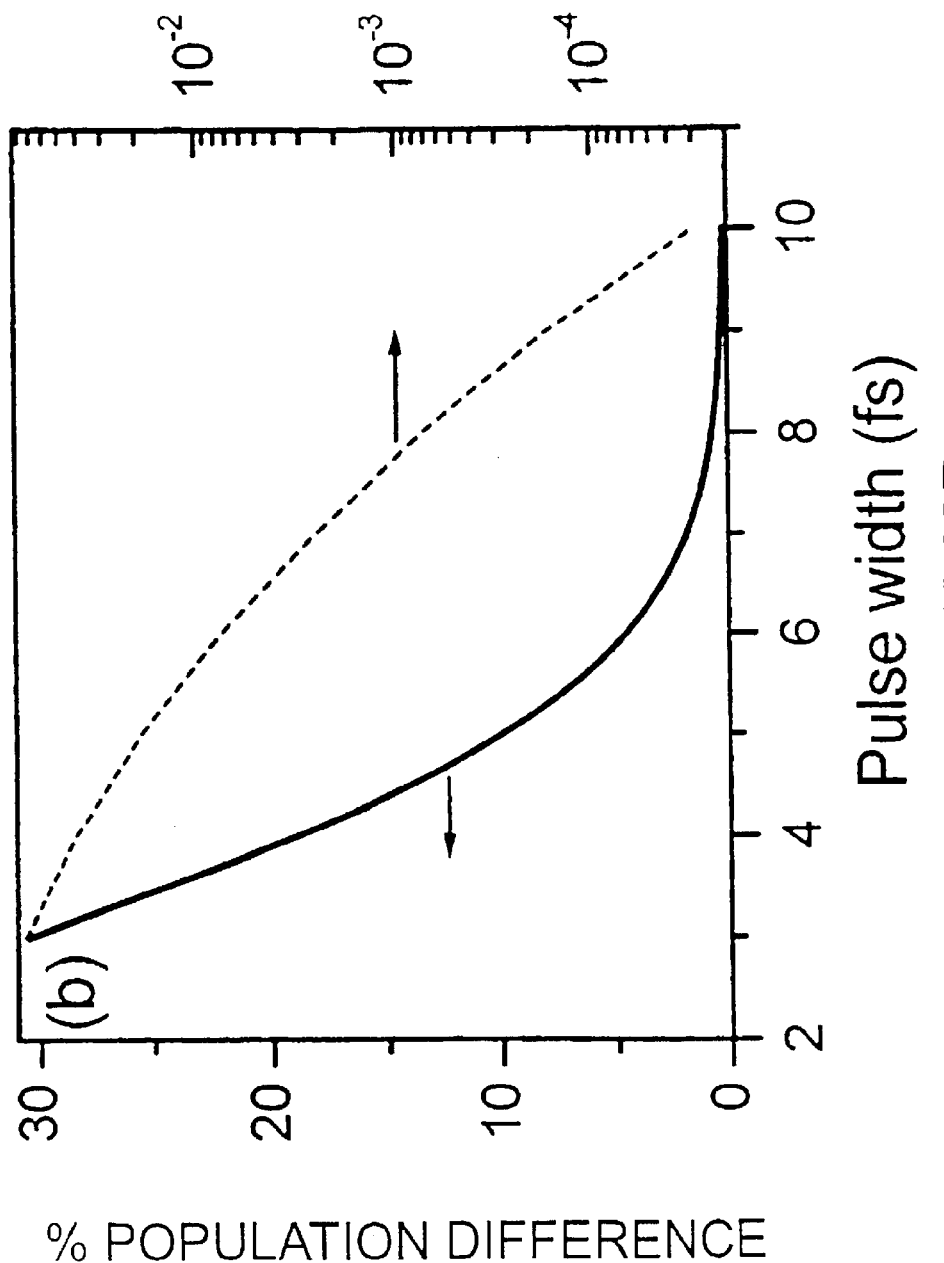
FIG. 16B illustrates dependence on the pulsewidth.

Stabilization of the relative phase between the pulse envelope and the optical carrier should lead to more precise control of the pulse shape and timing, opening the door for many interesting experiments in the areas of extreme nonlinear optics and quantum coherent control. Coherent control of atomic or molecular excited state populations is usually achieved by controlling the relative phase of pairs or multiplets of pulses. If the phase of the pulse(s) that arrive later in time is the same as the excited state-ground state atomic phase, the excited state population is increased, whereas if the pulse is anti-phased, the population is returned to the ground state. With ultrashort pulses, it is possible to achieve coherent control by interference between pathways of different nonlinear order, for example between 3 photon and 4 photon absorption. Such interference between pathways is sensitive to the absolute phase. This has been discussed for multiphoton ionization. [See E. Cormier and P. Lambropoulos, Euro. Phys. J. D 2, 15–20 (1998)]. For a pulse with a bandwidth that is close to spanning an octave, interference between 1 and 2 photon pathways will be possible, thereby lessening the power requirements. A simulation of this is shown in FIG. 16A, where the upper state population is plotted as a function of absolute phase for the ideal 3-level system as shown in the inset. In FIG. 16B, the dependence on pulse width is shown. The effect is measurable for pulses that are far from spanning an octave. However real atoms do not have perfectly spaced levels, which will reduce the effect, and this simple simulation ignores selection rules.

Optical Clocks. Measurement of absolute optical frequencies has suddenly become a rather simple and straightforward task. Established standards can now be easily re-calibrated [J. Ye, T. H. Yoon, J. L. Hall, A. A. Madej, J. E. Bernard, K. J. Siemsen, L. Marmet, J.-M. Chartier, and A. Chariter, Phys. Rev. Lett. 85, 3797 (2000)], and measurement precision has reached an unprecedented level. [See M. Niering, R. Holzwarth, J. Reichert, P. Pokasov, T. Udem, M. Weitz, T. W. Hansch, P. Lemonde, G. Santarelli, M. Abgrall, P. Laurent, C. Salomon, and A. Clairon, Phys. Rev. Lett. 84, 5496–5499 (2000)]. What is the next step? With the stability of the optical frequency comb currently limited by the microwave reference used for phase locking $f_{rep}$, direct stabilization of comb components based on ultrastable optical references holds great promise. The initial demonstration of precision phase control of the comb shows that a single cw laser (along with its frequency doubled companion output) can stabilize all comb lines (covering one octave of the optical frequency spectrum) to a level of 1 Hz to 100 Hz at 1-s. [See J. Ye, J. L. Hall, and S. A. Diddams, Opt. Lett. 25, 1675 (2000)]. With control orthogonalization, we expect the system will be improved so that every comb line is phase locked to the cw reference below 1 Hz level. Now we can generate a stable microwave frequency directly from a laser stabilized to an optical transition, essentially realizing an optical atomic clock. At the same time, an optical frequency network spanning an entire optical octave (>300 THz) is established, with millions of frequency marks stable at the Hz level repeating every 100 MHz, forming basically an optical frequency synthesizer. The future looks very bright, considering the superior stability ($10^{-15}$ at 1 s) offered by the optical oscillators based on a single mercury ion and cold calcium atoms developed at NIST. [See K. R. Vogel, S. A. Diddams, C. W. Oates, E. A. Curtis, R. J. Rafac, J. C. Pergquist, R. W. Fox, W. D. Lee, and L. Hollberg, submitted for publication, (2000)]. Indeed, within the next few years it will be amusing to witness friendly competitions between the Cs and Rb fountain clocks and various optical clocks based on $Hg^+$, Ca or another suitable system.

Conclusion. The present invention has demonstrated stabilization of the carrier phase with respect to the pulse envelope of ultrashort pulses produced by a mode-locked laser using a self-referencing technique that does not require any external optical input. The phase can either be locked so every pulse has the identical phase, or made to vary so that every $i^{th}$ pulse has the same phase. In the frequency domain, this means that the broad spectral comb of optical lines have known frequencies, namely a simple (large) multiple of the pulse repetition frequency plus a user-defined offset. This is particularly convenient if the repetition rate of the laser is locked to an accurate microwave or RF clock because then the absolute optical frequencies of the entire comb of lines are known. These results will impact extreme nonlinear optics [C. G. Durfee et al., Phys. Rev. Lett. 83, 2187 (1999); Ch. Spielmann et al., Science 278, 661 (1997)], which is expected to display exquisite sensitivity to electric field of the pulse.

The self-referencing technique also represents a dramatic advance in optical frequency metrology making measurement of absolute optical frequencies possible using a single laser. A mode-locked laser is used which emits a stable train of pulses at repetition rate $f_{rep}$. Corresponding to the temporal shortness of the pulse, there is a corresponding spectral bandwidth. If the laser spectrum is sufficiently broad, either as directly emitted or utilizing an external broadening device, such that the spectral extremes are separated by a factor of 2 in frequency, the optical spectrum emitted by the laser can be completely determined in terms of rf frequencies. This allows easy comparison to the cesium started, which has heretofore been extremely difficult.

If the laser spectrum does not extend over a factor of two in frequency, but is still significantly broad, for example 28% or more, a modified self-referencing technique can be used. An optical harmonic generator, capable of generating the 4-th harmonic of its input, can be provided with the red end of the spectrum of the laser beam. Another optical harmonic generator, designed to generate another useful harmonic, such as the 3-rd harmonic, can be provided with the blue end of the spectrum of the laser beam. Either of these beams can be frequency-shifted, either before or after the harmonic generation. The two harmonic beams, one having been shifted, are combined for optical heterodyne detection using a suitable fast photodetector. The detected beat frequency contains the frequency offset of the mode-locked laser system, along with its aliases with the repetition frequency, as well as the repetition frequency and its harmonics. Suitable electronics provide phase-coherent locking of the offset frequency as a rational fraction of the repetition rate. The resultant laser field has two useful properties: 1) the carrier-envelope phase evolves in a deterministic manner from one pulse to the next; 2) the optical spectrum is a comb of harmonics of the repetition frequency as shifted by the (stabilized) offset frequency.

Other combinations of intrinsic optical bandwidth and harmonic multiplications may be used: the principle is to multiply frequencies from the spectral ends of the laser system's bandwidth by different harmonic numbers so as to arrive at the same harmonic frequency (in the uv for the case of visible lasers) which enables heterodyne detection. The rf output is the laser offset frequency. According to the invention, a frequency shifter is used somewhere in this comparison chain to displace the spectral region in which the heterodyne beat appears. Phase knowledge of the repetition rate signal and the frequency offset allows the imposition of useful phase coherence on the laser.

The foregoing description of the invention has been presented for purposes of illustration and description. It is not intended to be exhaustive or to limit the invention to the precise form disclosed, and other modifications and variations may be possible in light of the above teachings. The embodiment was therefore chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of stabilizing the phase of a carrier wave signal with respect to an envelope of the pulses emitted by a mode-locked pulsed laser comprising:

obtaining an optical output from said pulsed laser that has a bandwidth that spans at least one octave;

separating a first frequency output from said optical output having a first frequency;

separating a second frequency output from said optical output, said second frequency output having a second frequency that is twice the frequency of said first frequency;

doubling said-first frequency output of said pulsed laser to produce a frequency doubled first output;

shifting said second frequency output by a predetermined amount to produce a second frequency shifted output;

combining said frequency doubled first output and said second frequency shifted output to obtain a beat frequency signal;

detecting said beat frequency signal;

generating said beat frequency signal to phase coherently stabilize said phase of said carrier wave signal relative to said envelope of said pulsed laser.

2. The method of claim 1 wherein said step of shifting said second frequency output by a predetermined amount to produce a second frequency shifted output further comprises applying an adjustable frequency input signal to an acousto-optic modulator that adjusts said second frequency shifted output by a fractional portion of the repetition frequency of said envelope.

3. The method of claim 1 wherein said step of shifting said second frequency output by a predetermined amount to produce a second frequency shifted output further comprises applying an adjustable electric signal to an electro optic modulator.

4. A method of stabilizing the phase of a carrier wave signal with respect to an envelope of the pulses emitted by a mode-locked pulsed laser comprising:
   obtaining an optical output from said pulsed laser that has a bandwidth that spans at least one octave;
   separating a first frequency output from said optical output having a first frequency;
   separating a second frequency output from said optical output, said second frequency output having a second frequency that is twice the frequency of said first frequency;
   doubling said first frequency output of said pulsed laser to produce a frequency doubled first output;
   shifting said frequency doubled first output by a predetermined amount to produce a frequency doubled and shifted first output;
   combining said second frequency output and said frequency doubled and shifted first output to obtain a beat frequency signal;
   detecting said beat frequency signal;
   generating said beat frequency signal to phase coherently stabilize said phase of said carrier wave signal relative to said envelope of said pulsed laser.

5. The method of claim 4 wherein said step of shifting said frequency doubled first output by a predetermined amount to produce a frequency doubled and shifted first output further comprises applying an adjustable acoustic signal to an acousto-optic modulator.

6. The method of claim 4 wherein said step of shifting said frequency doubled first output by a predetermined amount to produce a frequency doubled and shifted first output further comprises applying an adjustable electric signal to an electro optic modulator.

7. A method of stabilizing the phase of a carrier wave signal with respect to an envelope of the pulses emitted by a mode-locked pulsed laser comprising:
   obtaining an optical output from said pulsed laser that has a bandwidth that spans at least one octave;
   separating a first frequency output from said optical output having a first frequency;
   separating a second frequency output from said optical output, said second optical frequency output having a second frequency that is twice the frequency of said first frequency;
   doubling said first frequency output of said pulsed laser to produce a frequency doubled first output;
   shifting one of said frequency doubled first output and said second frequency, output by a predetermined amount to produce a frequency shifted output;
   combining one of said frequency doubled first output and said second frequency output with said frequency shifted output to obtain a beat frequency signal;
   detecting said beat frequency signal;
   generating said beat frequency signal to stabilize said phase of said carrier wave signal relative to said envelope of said pulsed laser.

8. A method of stabilizing the phase of a carrier wave signal with respect to an envelope of the pulses emitted by a mode-locked pulsed laser comprising:
   obtaining an optical output from said pulsed laser that has a bandwidth that spans at least one octave;
   separating a first frequency output from said optical output having a first frequency;
   separating a second frequency output from said optical output, said second frequency output having a second frequency that is twice the frequency of said first frequency;
   shifting said first frequency output by a predetermined amount to produce a frequency shifted first output;
   doubling said frequency shifted first output of said pulsed laser to produce a frequency shifted and doubled first output;
   combining said second frequency output and said frequency shifted and doubled first output to obtain a beat frequency signal;
   detecting said beat frequency signal;
   generating said beat frequency signal to phase coherently stabilize said phase of said carrier wave signal relative to said envelope of said pulsed laser.

9. A mode-locked pulsed laser system that stabilizes the phase of a carrier wave signal with respect to an envelope of the pulses emitted by said mode-locked pulsed laser system comprising:
   a mode-locked pulsed laser that generates an optical output said pulsed laser having optical cavity;
   a beam splitter that separates a first frequency signal from said optical output, said first frequency signal having a first frequency, from a second frequency signal of said optical output, said second frequency signal having a second frequency that is twice the frequency of said first frequency;
   a frequency doubler aligned with said first frequency signal that produces a frequency doubled first signal;
   a frequency shifter aligned with said second frequency signal that frequency shifts said second frequency signal by a predetermined amount to produce a second frequency shifted signal;
   a beam combiner that combines said frequency doubled first signal and said second frequency shifted signal to obtain a beat frequency signal;
   a detector aligned to detect said beat frequency signal;
   a control signal generator that generates control signals in response to said beat frequency signal;
   a servo-controller that modifies the optical cavity of said pulsed laser in response to said control signals to change the relative velocity of said envelope and said carrier wave signal in said optical cavity.

10. The system of claim 9 further comprising:
   a non-linear self-phase modulator that broadens the bandwidth of said optical output of said pulsed laser to a bandwidth that spans at least one octave.

11. The system of claim 9 or 10 wherein said non-linear self-phase modulator comprises an air-silica micostructure optical fiber.

12. The system of claim 9 or 10 wherein said frequency doubler comprises:
   a β-barium-borate frequency doubling crystal.

13. The system of claim 9 wherein the mode-locked pulsed laser generates an optical output that has bandwidth that spans at least one octave.

14. A method of stabilizing the phase of a carrier wave signal with respect to an envelope of the pulses emitted by a mode-locked pulsed laser comprising:

obtaining an optical output from said pulsed laser that has a bandwidth that spans less than one octave;

separating a first frequency output from said optical output having a first frequency;

separating a second frequency output from said optical output, having a second frequency;

multiplying said first frequency output of said pulsed laser by an integer value N that is at least equal to 2 to produce a frequency multiplied first output;

multiplying said second frequency output of said pulsed laser by N−1 to produce a frequency multiplied second output;

shifting said frequency multiplied second output by a predetermined amount to produce a frequency multiplied second frequency shifted output;

combining said frequency multiplied first output and said frequency multiplied second frequency shifted output to obtain a beat frequency signal;

detecting said beat frequency signal;

generating said beat frequency signal to phase coherently stabilize said phase of said carrier wave signal relative to said envelope of said pulsed laser.

15. The method of claim 1, 4, or 14 wherein said step of using said beat frequency signal to stabilize said phase of said carrier wave signal relative to said envelope of said pulsed laser further comprises:

generating control signals in response to said beat frequency to modify the optical cavity of said pulsed laser to change the velocity of said envelope and said carrier wave signal in said optical cavity.

16. The method of claim 15 wherein said step of modifying said optical cavity of said pulsed laser further comprises:

inserting prisms in said optical cavity that spatially disperse the spectrum of said carrier wave signal;

translating at least one of the mirrors of said laser cavity in response to said control signals;

tilting the mirror in said laser cavity that reflects said spatially dispersed spectrum in response to said control signal.

17. The method of claim 1, 4, or 14 wherein said predetermined amount is coherently derived from the repetition frequency of said pulsed laser.

18. The method of claim 1, 4, or 14 wherein said step of obtaining an optical output from said pulsed laser further comprises broadening said optical output from said pulsed laser using an optical fiber located externally from said optical cavity of said pulsed laser.

19. The method of claim 1, 4, or 14 wherein said step of obtaining an optical output from said pulsed laser further comprises generating a broadened optical output from said pulsed laser.

20. The method of claim 14 wherein said step of shifting said frequency multiplied second frequency output by a predetermined amount to produce a frequency multiplied second frequency shifted output further comprises applying an adjustable frequency input signal to an acousto-optic modulator that adjusts said frequency multiplied second frequency shifted output by a fractional portion of the repetition frequency of said envelope.

21. The method of claim 14 wherein said step of shifting said frequency multiplied second frequency output by a predetermined amount to produce a frequency multiplied second frequency shifted output further comprises applying an adjustable electric signal to an electro optic modulator.

22. A mode-locked pulsed laser system that stabilizes the phase of a carrier wave signal with respect to an envelope of the pulses emitted by said mode-locked pulsed laser system comprising:

a mode-locked pulsed laser that generates an optical output said pulsed laser having an optical cavity;

a beam splitter that separates a first frequency signal from said optical output, said first frequency signal having a first frequency, from a second frequency signal of said optical output, said second frequency signal having a second frequency;

a first frequency multiplier aligned with said first frequency signal that multiplies said first frequency signal by an integer value N that is at least equal to 2 to produce a frequency multiplied first signal;

a second frequency multiplier aligned with said second frequency signal that multiplies said second frequency signal by N−1 to produce a frequency multiplied second signal;

a frequency shifter aligned with said frequency multiplied second frequency signal that frequency shifts said frequency multiplied second frequency signal by a predetermined amount to produce a frequency multiplied second frequency shifted signal;

a beam combiner that combines said frequency multiplied first signal and said frequency multiplied second frequency shifted signal to obtain a beat frequency signal;

a detector aligned to detect said beat frequency signal;

a control signal generator that generates control signals in response to said beat frequency signal;

a servo-controller that modifies an optical cavity of said pulsed laser in response to said control signals to change relative velocity between said envelope and said carrier wave signal in said optical cavity.

23. The system of claim 22 further comprising a non-linear self-phase modulator that broadens the bandwidth of said optical output to produce said predetermined bandwidth.

24. The system of claim 9, 10, or 22 wherein said beam splitter comprises:

a dichroic mirror.

25. The system of claim 9, 10, or 22 wherein said frequency shifter comprises:

an acousto-optic modulator.

26. The system of claim 9, 10, or 22 wherein said control device comprises:

carrier-envelope phase locking electronics.

27. The system of claim 9, 10, or 22 wherein said detector comprises:

an avalanche photodiode.

28. The system of claim 9, 10, or 22 wherein said servo-controller comprises:

a piezoelectric transducer tube that provides both tilt and translation.

* * * * *